(12) United States Patent
Tsubata

(10) Patent No.: US 8,952,949 B2
(45) Date of Patent: Feb. 10, 2015

(54) ACTIVE MATRIX SUBSTRATE, LIQUID CRYSTAL PANEL, LIQUID CRYSTAL DISPLAY DEVICE, LIQUID CRYSTAL DISPLAY UNIT, AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 458 days.

(21) Appl. No.: 13/376,412

(22) PCT Filed: Mar. 15, 2010

(86) PCT No.: PCT/JP2010/001822
§ 371 (c)(1),
(2), (4) Date: Dec. 6, 2011

(87) PCT Pub. No.: WO2010/146747
PCT Pub. Date: Dec. 23, 2010

(65) Prior Publication Data
US 2012/0086687 A1 Apr. 12, 2012

(30) Foreign Application Priority Data
Jun. 19, 2009 (JP) ................................. 2009-146353

(51) Int. Cl.
*G02F 1/136* (2006.01)
*G02F 1/1343* (2006.01)
(Continued)

(52) U.S. Cl.
CPC .. *G09G 3/3659* (2013.01); *G02F 2001/134354* (2013.01); *G09G 3/3677* (2013.01);
(Continued)

(58) Field of Classification Search
CPC .............. G09G 2320/0209; G09G 2320/0257; G02F 1/1368

USPC ...................................................... 257/59, 72
See application file for complete search history.

(56) References Cited

U.S. PATENT DOCUMENTS

| 2005/0225525 A1* | 10/2005 | Wu et al. ......................... 345/89 |
| 2006/0022201 A1* | 2/2006 | Kim et al. ....................... 257/72 |

(Continued)

FOREIGN PATENT DOCUMENTS

| JP | 06-265939 A | 9/1994 |
| JP | 2006-039290 A | 2/2006 |

(Continued)

OTHER PUBLICATIONS

Official Communication issued in International Patent Application No. PCT/JP2010/001822, mailed on Apr. 27, 2010.

(Continued)

*Primary Examiner* — Kent Chang
*Assistant Examiner* — Herbert L Hagemeier
(74) *Attorney, Agent, or Firm* — Keating & Bennett, LLP

(57) ABSTRACT

Pixel electrodes (17a and 17b) are provided in a pixel (101), and the pixel (101) is associated with a data signal line (15x), scanning signal lines (16a and 16b), and transistors (12a and 12b). One pixel electrode (17a) is connected to the data signal line (15x) via the transistor (12a). The other pixel electrode (17b) is connected to the pixel electrode (17a) via a capacitor (C101) and is connected to the data signal line (15x) via the transistor (12b). Storage capacitance (Cha and Chb) is formed between the pixel electrodes (17a and 17b) of the pixel (101) and a scanning signal line (16d) associated with a pixel (100). Thus, a configuration of a liquid crystal display device of a capacitively coupled pixel division mode is proposed in which a decline in display quality caused by image sticking of a sub-pixel is less likely to occur.

37 Claims, 47 Drawing Sheets

(51) Int. Cl.
  *G09G 5/00* (2006.01)
  *G09G 3/36* (2006.01)
  *G02F 1/1362* (2006.01)

(52) U.S. Cl.
  CPC ...... *G09G3/3688* (2013.01); *G09G 2300/0426* (2013.01); *G09G 2300/0443* (2013.01); *G09G 2300/0447* (2013.01); *G09G 2300/0876* (2013.01); *G09G 2310/0251* (2013.01); *G09G 2320/0204* (2013.01); *G09G 2320/028* (2013.01); *G02F 1/13624* (2013.01)
  USPC .............. 345/209; 349/44; 349/54; 349/142; 349/143; 345/90

(56) References Cited

U.S. PATENT DOCUMENTS

| | | | |
|---|---|---|---|
| 2006/0023137 A1* | 2/2006 | Kamada et al. | 349/44 |
| 2006/0208984 A1* | 9/2006 | Kim et al. | 345/90 |
| 2006/0231838 A1* | 10/2006 | Kim | 257/59 |
| 2007/0064190 A1* | 3/2007 | Kim | 349/142 |
| 2007/0109452 A1 | 5/2007 | Kosugi et al. | |
| 2007/0132690 A1 | 6/2007 | Nakanishi et al. | |
| 2007/0176178 A1* | 8/2007 | Lee et al. | 257/59 |
| 2008/0158464 A1* | 7/2008 | Chang et al. | 349/48 |
| 2009/0279034 A1 | 11/2009 | Shoraku et al. | |
| 2010/0118010 A1 | 5/2010 | Shibasaki et al. | |
| 2010/0309417 A1 | 12/2010 | Kosugi et al. | |
| 2010/0328198 A1 | 12/2010 | Tsubata | |
| 2011/0019114 A1 | 1/2011 | Tsubata | |

FOREIGN PATENT DOCUMENTS

| | | |
|---|---|---|
| JP | 2006-330499 A | 12/2006 |
| JP | 2006-330609 A | 12/2006 |
| WO | 2008/069181 A1 | 6/2008 |
| WO | 2009/107271 A1 | 9/2009 |
| WO | 2009/130922 A1 | 10/2009 |

OTHER PUBLICATIONS

Huang et al., "18.3: Additional Refresh Technology (ART) of Advanced-MVA(AMVA) Mode for High Quality LCDs", SID 07 Digest, 2007, pp. 1010-1013.

* cited by examiner

ACTIVE MATRIX SUBSTRATE, LIQUID CRYSTAL PANEL, LIQUID CRYSTAL DISPLAY DEVICE, LIQUID CRYSTAL DISPLAY UNIT, AND TELEVISION RECEIVER

TECHNICAL FIELD

The present invention relates to an active matrix substrate including a plurality of pixel electrodes in a pixel region, and a liquid crystal display device (pixel division mode) that uses the same.

BACKGROUND ART

As a measure for improving viewing angle dependence of gamma characteristics in liquid crystal display devices (for example, holding down excess brightness and the like in a screen), a liquid crystal display device has been proposed which controls a plurality of sub-pixels in a pixel to have different brightness, so as to display a halftone by an area coverage modulation of these sub-pixels (pixel division mode; for example, see Patent Literature 1).

As illustrated in FIG. 48, an active matrix substrate disclosed in Patent Literature 1 has a pixel region provided between two adjacent gate bus lines 112; a pixel electrode 121a is disposed on an upper end (part adjacent to the gate bus line) of the pixel region, a pixel electrode 121b is disposed midway of the pixel region; and a pixel electrode 121c is disposed on a lower end (adjacent to a following adjacent gate bus line) of the pixel region. The pixel electrode 121a and pixel electrode 121c are connected to a source draw-out wire 119 that is drawn out from a source electrode 116s of a transistor 116. The source draw-out wire 119 is connected to a control electrode 118; the control electrode 118 is overlapped by the pixel electrode 121b via an insulating layer. The middle pixel electrode 121b is capacitively coupled with the pixel electrodes 121a and 121c (capacitively coupled pixel division mode). In a liquid crystal display device that uses this active matrix substrate, sub-pixels corresponding to the pixel electrodes 121a and 121c serve as bright sub-pixels, and sub-pixels corresponding to the pixel electrode 121b serve as dark sub-pixels. Hence, a halftone is displayed by area coverage modulation of the bright sub-pixels (2 sub-pixels) and dark sub-pixel (1 sub-pixel).

It is known that, in such a liquid crystal display device of a capacitively coupled pixel division mode, image sticking occurs in the sub-pixel including the pixel electrode 121b due to an influence of an electric charge accumulated in the capacitively coupled pixel electrode 121b.

Specifically, as shown in FIG. 49, a pixel electrode 61b which is directly connected to a source line 55 via a transistor 56 is electrically connected to the source line 55 every time the transistor 56 is turned ON per 1 frame. This allows an electric charge accumulated in the pixel electrode 61b during an OFF period of the transistor 56 to flow into the source line 55 during the ON period. Accordingly, there remains almost no direct current voltage component in the pixel electrode 61b, and therefore image sticking hardly occurs. Meanwhile, an electric charge accumulated in a pixel electrode 61a that is capacitively coupled with the pixel electrode 61b is preserved even if the transistor 56 is turned ON. Accordingly, there remains a direct current voltage component in the pixel electrode 61a. This causes image sticking in a sub-pixel including the pixel electrode 61a. As an example of a method for solving the image sticking problem, in the active matrix substrate disclosed in Patent Literature 1, the pixel electrode 121b that is capacitively coupled with the pixel electrode 121a is disposed to be away from the gate bus line 112 as shown in FIG. 48. That is, by disposing the pixel electrode 121b between the pixel electrode 121a and the pixel electrode 121c, it is possible to prevent a flow of an electric charge into the pixel electrode 121b caused by a direct current voltage component of a signal flowing through the gate bus line 112. In this way, it is possible to suppress occurrence of image sticking.

However, according to the arrangement, the pixel electrode 121b is still in a floating state. It is therefore impossible to completely prevent the inflow of the electric charge, thereby making it difficult to achieve high-quality display.

Non-Patent Literature 1 discloses an arrangement in which a pixel electrode that is in a floating state as described above is directly connected to a source line via a transistor. FIG. 50 is an equivalent circuit diagram illustrating part of a liquid crystal panel disclosed in Non-Patent Literature 1. As shown in FIG. 50, this liquid crystal panel has a pixel region (main pixel region (Main region) and a sub-pixel region (Sub region)) between two adjacent gate bus lines. A main pixel electrode corresponding to the main pixel region is connected to a source line (Data line) via a first transistor (Main-TFT), and a sub-pixel electrode corresponding to the sub-pixel region is connected to the source line via a second transistor (Sub-TFT). The first and second transistors are connected to an identical gate bus line (Gate line).

According to the arrangement, the source line and the sub-pixel electrode are electrically connected to each other when the first and second transistors are turned ON. This discharges (refreshes) an electric charge accumulated in the sub-pixel electrode. It is thus possible to suppress occurrence of image sticking of a sub-pixel including a pixel electrode that is in a floating state.

CITATION LIST

Patent Literature 1
Japanese Patent Application Publication, Tokukai, No. 2006-39290 A (Publication Date: Feb. 9, 2006)
Non-Patent Literature 1
"SID 07 DIGEST pp. 1010-1013"

SUMMARY OF INVENTION

Technical Problem

However, according to the arrangement of Non-Patent Literature 1, the main pixel electrode and the sub-pixel electrode are connected to an identical gate bus line and an identical source line via the first and second transistors, respectively. Accordingly, an ON time (gate ON time) of the first transistor is equal to that of the second transistor.

In the pixel division mode, in a case where transistors have the same gate ON time, an electric potential supplied to a pixel electrode is defined by a ratio of transistor characteristics, i.e., a channel W/L ratio (ratio of a channel width W to a channel length L) of a transistor. That is, in the above arrangement, in order to form a bright sub-pixel and a dark sub-pixel, it is necessary to cause a channel W/L ratio (ratio of a channel width W to a channel length L) of the first transistor connected to the main pixel electrode to be different from that of the second transistor.

Consequently, in a case where such a liquid crystal panel is manufactured, it is necessary to design transistors having different channel sizes in advance. This may complicate design of the liquid crystal panel. Further, adjustment such as changing of a write-in time into each pixel electrode is difficult after completion of the liquid crystal panel. That is, flexibility of a product declines. Further, since line widths of the source line and the gate bus line are shifted, a channel W/L ratio of a transistor changes. This may cause characteristics of the first transistor to be different from those of the second transistor within a display surface, thereby causing a reduction in display quality.

Further, in a case where a bright sub-pixel and a dark sub-pixel are formed by causing transistors to have different channel sizes, liquid crystal panels having different driving frequencies (e.g., a liquid crystal panel driven at 60 Hz and a liquid crystal panel driven at 120 Hz) may be different from each other in effect of suppressing so-called excess brightness. Consequently, it is difficult to make the liquid crystal panels uniform.

The present invention proposes an arrangement in which a decline in display quality caused by image sticking of a sub-pixel is less likely to occur in a liquid crystal display device of the capacitively coupled pixel division mode.

Solution to Problem

The present active matrix substrate includes first and second pixel electrodes provided in a pixel region; a data signal line; first and second scanning signal lines; a first transistor connected to the data signal line and the first scanning signal line; and a second transistor connected to the data signal line and the second scanning signal line, the data signal line, the first and second scanning signal lines, the first transistor, and the second transistor being associated with the pixel region, the first pixel electrode being connected to the data signal line via the first transistor, the second pixel electrode being connected to the first pixel electrode via a capacitor and being connected to the data signal line via the second transistor, and storage capacitance being formed between at least one of the first and second pixel electrodes provided in the pixel region and at least one of the first and second scanning signal lines that are associated with a pixel region of a previous stage provided previously to the pixel region.

In a liquid crystal display device using the present active matrix substrate, pixel electrodes provided in a pixel region are connected to a data signal line via respective transistors connected to different scanning signal lines. This makes it possible to supply signal electric potentials to the pixel electrodes at different timings. Accordingly, before a signal electric potential for regular writing is supplied to one pixel electrode, a signal electric potential (e.g., Vcom) can be supplied to the other pixel electrode capacitively coupled to the one pixel electrode by causing the other pixel electrode to be electrically connected to the data signal line via the transistor.

Before regular writing is carried out, a signal electric potential can be thus supplied, not via a capacitor, from the data signal line to a pixel electrode (capacitively coupled electrode) capacitively coupled to a pixel electrode that is connected to the data signal line via a transistor. This allows an electric charge accumulated in the capacitively coupled electrode to be discharged (refreshed). It is therefore possible to suppress occurrence of image sticking of a sub-pixel including this pixel electrode. Further, according to the configuration, it is unnecessary to adjust channel W/L ratios of transistors, and an active matrix substrate can be configured such that transistors have an identical channel size. Consequently, it is possible to suppress a decline in display quality caused by variation in transistor characteristics and to make liquid crystal panels uniform.

Moreover, according to the configuration, storage capacitance is formed between a pixel electrode provided in a pixel region and a scanning signal line (at least one of the first and second scanning signal lines) associated with a pixel region of a previous stage that has already been scanned. This makes it possible to increase a value of the storage capacitance and to suppress fluctuation in value of the storage capacitance, thereby allowing an improvement in display quality.

The present liquid crystal display device includes any of the active matrix substrates, the second scanning signal line being selected at least once during display.

Accordingly, the second pixel electrode capacitively coupled to the first pixel electrode that is connected to the data signal line via the first transistor can be electrically connected to the data signal line via the second transistor at least once during display. This allows an electric charge accumulated in the second pixel electrode to be discharged (refreshed). Consequently, it is possible to suppress occurrence of image sticking of a sub-pixel including the second pixel electrode and to suppress a decline in display quality.

The present liquid crystal panel includes the active matrix substrate. The present liquid crystal display unit includes the liquid crystal panel and a driver. The present liquid crystal display device includes the liquid crystal display unit and a light source unit. The present television receiver includes the liquid crystal display device and a tuner section for receiving television broadcast.

Advantageous Effects of Invention

As described above, in a liquid crystal display device using the present active matrix substrate, it is possible to discharge (refresh) an electric charge accumulated in a pixel electrode capacitively coupled to a pixel electrode that is connected to a data signal line via a transistor. This makes it possible to suppress occurrence of image sticking of a sub-pixel including this pixel electrode and to suppress a decline in display quality.

BRIEF DESCRIPTION OF DRAWINGS

FIG. 23 is a plan view illustrating a configuration (specific example 1-4) of the liquid crystal panel 5a.

FIG. 25 is a circuit diagram illustrating another configuration of the liquid crystal panel 5a.

FIG. 26 is a plan view illustrating a configuration (specific example 1-5) of the liquid crystal panel 5a.

FIG. 28 is a plan view illustrating a configuration (specific example 1-6) of the liquid crystal panel 5a.

DESCRIPTION OF EMBODIMENTS

Exemplary embodiments of the present invention are described below with reference to FIGS. 1 through 47. Note that, for convenience of description, a direction in which scanning signal lines extend is hereinafter referred to as a row direction. Needless to say, however, the scanning signal lines may extend in a horizontal direction or in a vertical direction depending on how the liquid crystal display device (or a liquid crystal panel or an active matrix substrate used in the liquid crystal display device) is used (viewed). Further, a channel characteristic (n-type or p-type) of each transistor shown in the present embodiment is not limited in particular.

[Embodiment 1]

Figure 1:
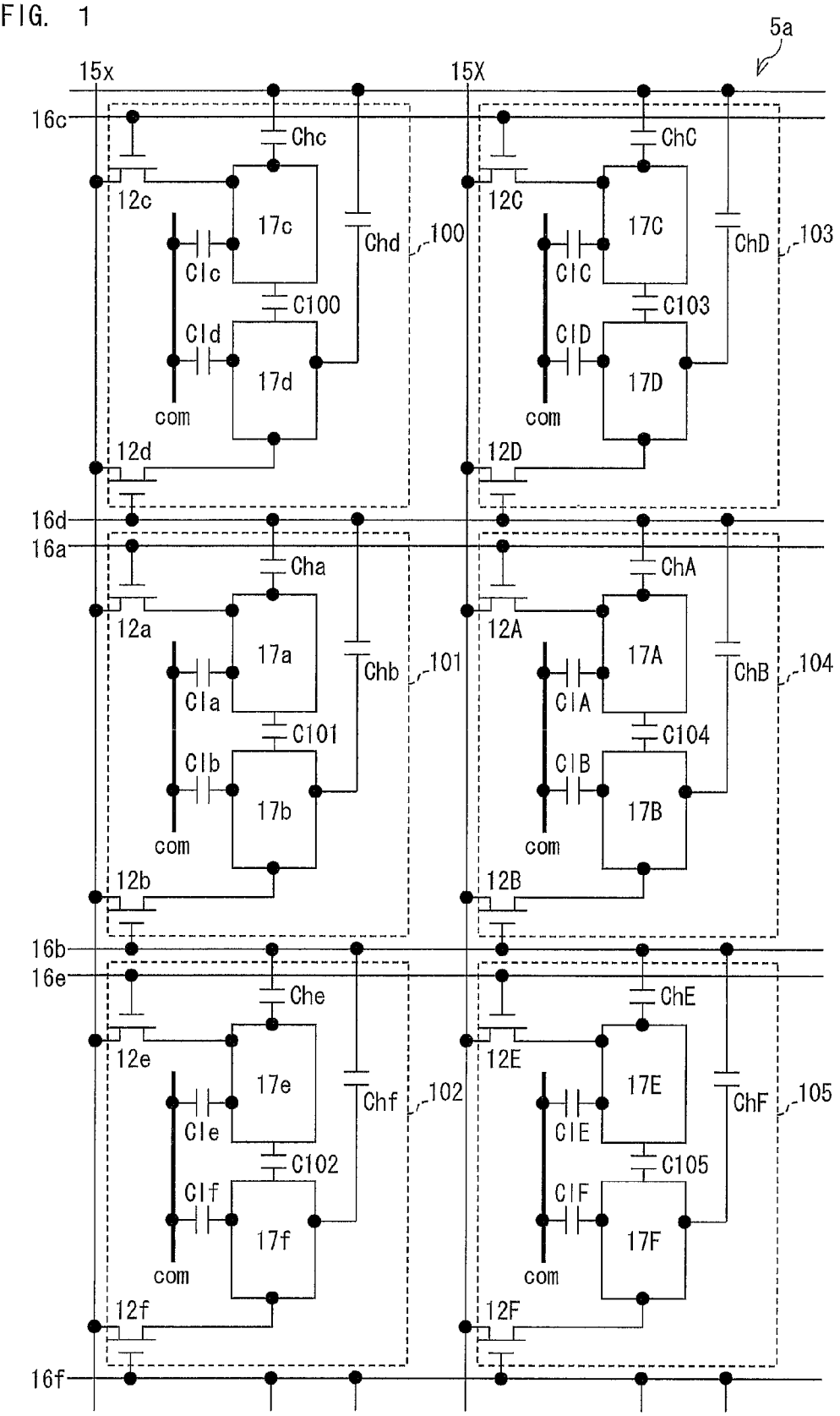
FIG. 1 is a circuit diagram illustrating a configuration of a liquid crystal panel 5*a*.

FIG. 1 is an equivalent circuit diagram illustrating part of the liquid crystal panel of the present Embodiment 1. As shown in FIG. 1, a liquid crystal panel 5a includes data signal lines (15x and 15X) that extend in a column direction (top-to-bottom direction of FIG. 1), scanning signal lines (16a to 16f) that extend in a row direction (left-to-right direction of FIG. 1), pixels (100 to 105) that are disposed in the row and column directions, and a common electrode (counter electrode) com. The pixels have an identical configuration. A pixel array including the pixels 100 through 102 and a pixel array including the pixels 103 through 105 are adjacent each other.

In the liquid crystal panel 5a, one pixel is associated with one data signal line and two scanning signal lines. Two pixel electrodes 17c and 17d disposed in the pixel 100, two pixel electrodes 17a and 17b disposed in the pixel 101, and two pixel electrodes 17e and 17f disposed in the pixel 102 are arranged in one line; and two pixel electrodes 17C and 17D disposed in the pixel 103, two pixel electrodes 17A and 17B disposed in the pixel 104, and two pixel electrodes 17E and 17F disposed in the pixel 105 are arranged in one line. The pixel electrodes 17c and 17C are disposed adjacent to each other in the row direction, the pixel electrodes 17d and 17D are disposed adjacent to each other in the row direction, the pixel electrodes 17a and 17A are disposed adjacent to each other in the row direction, the pixel electrodes 17b and 17B are disposed adjacent to each other in the row direction, the pixel electrodes 17e and 17E are disposed adjacent to each other in the row direction, and the pixel electrodes 17f and 17F are disposed adjacent to each other in the row direction.

Since the pixels have an identical configuration, the following description is made by mainly taking the pixel 101 as an example.

In the pixel 101, the pixel electrodes 17a and 17b (first and second pixel electrodes) are connected to each other via a coupling capacitor C101. The pixel electrode 17a is connected to the data signal line 15x via a transistor 12a (first transistor) that is connected to the scanning signal line 16a (first scanning signal line), and the pixel electrode 17b is connected to the data signal line 15x via a transistor 12b (second transistor) that is connected to the scanning signal line 16b (second scanning signal line). Storage capacitance Cha is provided between the pixel electrode 17a and the scanning signal line 16d of a previous stage, and storage capacitance Chb is provided between the pixel electrode 17b and the scanning signal line 16d of a previous stage. Liquid crystal capacitance Cla is provided between the pixel electrode 17a and the common electrode com, and liquid crystal capacitance Clb is provided between the pixel electrode 17b and the common electrode com. The transistors 12a and 12b have an almost identical channel W/L ratio (a ratio of a channel width W to a channel length L (hereinafter referred to as "W/L ratio"). That is, the transistors of the liquid crystal panel 5a have an almost identical size. Accordingly, characteristics of the transistors are substantially the same.

According to the arrangement, the pixel electrode 17b is capacitively coupled to the pixel electrode 17a into which a regular signal electric potential is written. This causes an electric potential of the pixel electrode 17b achieved after the transistor 12a is turned off to be: Va×(Cα/(Cα+Co)), where Cla=Clb=Cl, Cha=Chb=Ch, Co=Cl+Ch, a capacitance value of C101 is Cα, and an electric potential of the pixel electrode 17a achieved after the transistor 12a is turned off is Va. As a result, a sub-pixel including the pixel electrode 17a becomes a bright sub-pixel (hereinafter referred to as "bright"), and a sub-pixel including the pixel electrode 17b becomes a dark sub-pixel (hereinafter referred to as "dark"). Thus, it is possible to provide a liquid crystal display device of a pixel division mode.

Further, in the liquid crystal display device of the pixel division mode which includes the liquid crystal panel 5a, the pixel electrode 17a and 17b disposed in the pixel 101 are connected to the data signal line 15x via the transistors 12a and 12b, respectively, which are connected to the different scanning signal lines 16a and 16b, respectively. Accordingly, an identical signal electric potential or different signal electric potentials can be directly supplied to the pixel electrodes 17a and 17b via the transistors 12a and 12b, respectively. That is, a signal electric potential can be supplied, not via a capacitor, from the data signal line 15x to the pixel electrode 17b (hereinafter also referred to as "capacitively coupled electrode") capacitively coupled to the pixel electrode 17a that is connected to the data signal line 15x via the transistor 12a. Further, since the transistors 12a and 12b that are respectively connected to the pixel electrodes 17a and 17b are connected to the different scanning signal lines 16a and 16b, respectively, timings at which signal electric potentials are supplied to the pixel electrodes 17a and 17b can be freely set.

According to the arrangement of the present invention, it is thus possible to electrically connect the capacitively coupled electrode (the pixel electrode 17b) to the data signal line (15x) by turning the transistor 12b on. Accordingly, it is possible to supply a signal electric potential from the data signal line 15x to the pixel electrode 17b via the transistor 12b.

Here, for example in a case where a regular signal electric potential is written into the pixel electrode 17a, a signal electric potential (e.g., a Vcom signal) is supplied from the data signal line 15x to the pixel electrode 17b via the transistor 12b before the writing. This signal electric potential (Vcom) may be supplied by using charge sharing or may be supplied to all the data signal lines by turning all the transistors on. Since the signal electric potential (Vcom) is written into the capacitively coupled pixel electrode 17b, an electric charge accumulated in the pixel electrode can be discharged (refreshed). This makes it possible to suppress occurrence of image sticking of a sub-pixel including this pixel electrode.

Further, according to the arrangement, it is unnecessary to adjust a channel W/L ratio of a transistor unlike the conventional art, and an active matrix substrate can be configured such that transistors have an identical channel size. This makes it possible to suppress a decline in display quality caused by variation in transistor characteristics.

The liquid crystal display device of the present invention has the above arrangement which mainly produces the special effects. The following describes specific examples of the liquid crystal panel 5a constituting the liquid crystal display device of the present embodiment and methods for driving the liquid crystal panel 5a.

(Specific Example 1-1 of Liquid Crystal Panel)

Figure 2:
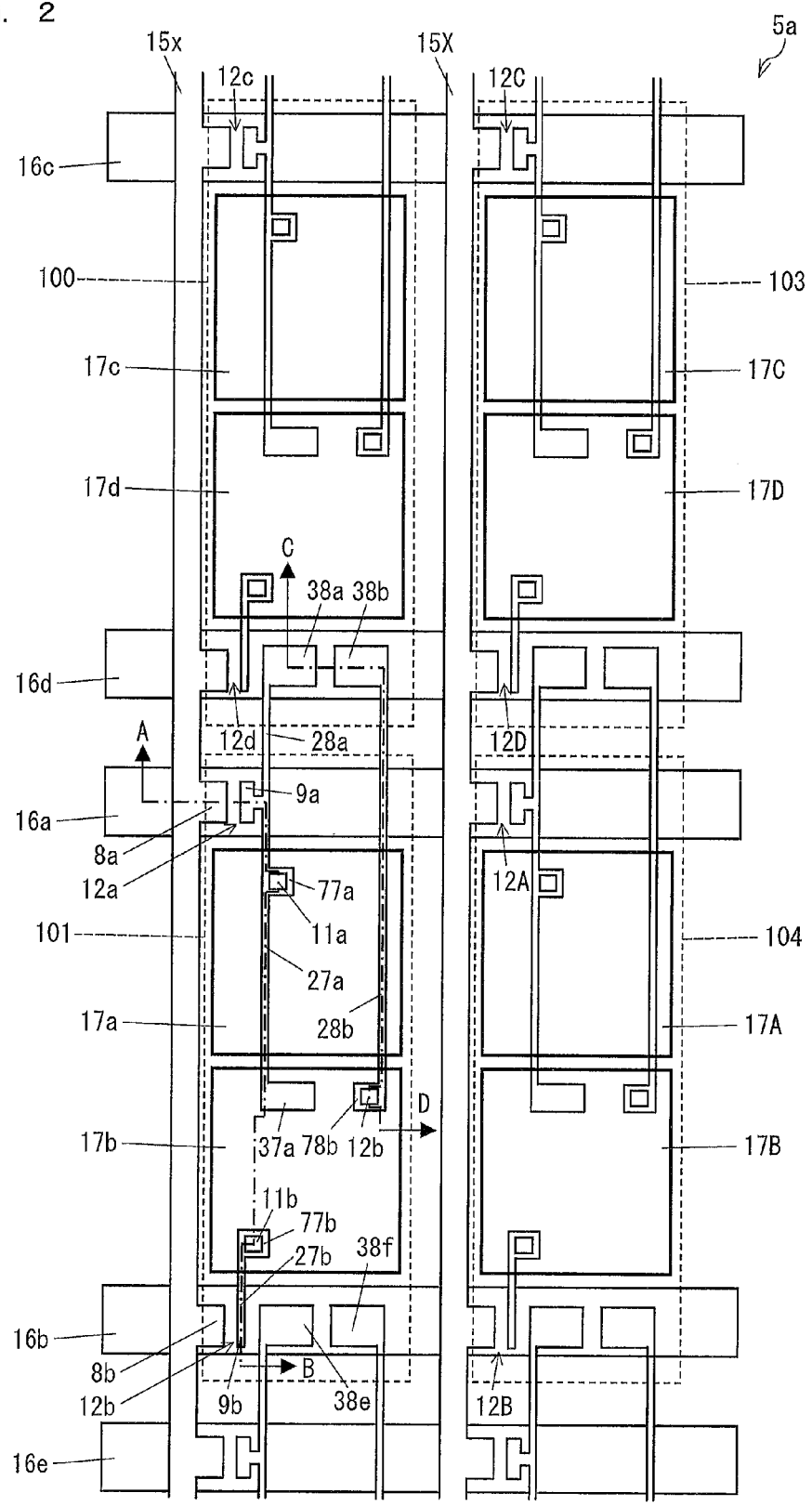
FIG. 2 is a plan view illustrating a configuration (specific example 1-1) of the liquid crystal panel 5*a*.

FIG. 2 illustrates a specific example 1-1 of the liquid crystal panel 5a. In the liquid crystal panel 5a of FIG. 2, a data signal line 15x is provided along a pixel 100 and a pixel 101, and a data signal line 15X is provided along a pixel 103 and a pixel 104.

A scanning signal line 16c is disposed so as to overlap one of two edge sections of the pixel 100, which two edge sections run along the row direction, and a scanning signal line 16d is disposed so as to overlap the other one of these two edge sections of the pixel 100. From a plan view, pixel electrodes 17c and 17d are aligned in a column direction, between the scanning signal lines 16c and 16d. The scanning signal line 16c also overlaps one of two edge sections of the pixel 103, which two edge sections run along the row direction, and the scanning signal line 16d overlaps the other one of these two edge sections of the pixel 103. From a plan view, pixel electrodes 17C and 17D are aligned in the column direction, between the scanning signal lines 16c and 16d.

A scanning signal line 16a is disposed so as to overlap one of two edge sections of the pixel 101, which two edge sections run along the row direction, and a scanning signal line 16b is disposed so as to overlap the other one of these two edge sections of the pixel 101. From a plan view, pixel electrodes 17a and 17b are aligned in the column direction, between the scanning signal lines 16a and 16b. The scanning signal line 16a also overlaps one of two edge sections of the pixel 104, which two edge sections run along the row direction, and the scanning signal line 16b overlaps the other one of these two edge sections of the pixel 104. From a plan view, pixel electrodes 17A and 17B are aligned in the column direction, between the scanning signal lines 16a and 16b.

In the pixel 101, a source electrode 8a of a transistor 12a and a drain electrode 9a of the transistor 12a are provided on the scanning signal line 16a, and a source electrode 8b of a transistor 12b and a drain electrode 9b of the transistor 12b are provided on the scanning signal line 16b. The source electrode 8a is connected to the data signal line 15x. The drain electrode 9a is connected to a drain draw-out wire 27a. The drain draw-out wire 27a is connected to a contact electrode 77a and a coupling capacitor electrode 37a. The contact electrode 77a is connected to the pixel electrode 17a via a contact hole 11a. The coupling capacitor electrode 37a overlaps the pixel electrode 17b via an interlayer insulating film. As a result, a coupling capacitor C101 (see FIG. 1) between the pixel electrodes 17a and 17b is formed. Moreover, the drain electrode 9a is connected to a drain draw-out wire 28a. The drain draw-out wire 28a is connected to a storage capacitor electrode 38a that is formed in an identical layer to the coupling capacitor electrode 37a. The storage capacitor electrode 38a overlaps the scanning signal line 16d via a gate insulating film. As a result, storage capacitance Cha (see FIG. 1) is formed.

The source electrode 8b of the transistor 12b is connected to the data signal line 15x. The drain electrode 9b is connected to a drain draw-out wire 27b. The drain draw-out wire 27b is connected to a contact electrode 77b. The contact electrode 77b is connected to the pixel electrode 17b via a contact hole 11b. A storage capacitor electrode 38b that is formed in an identical layer to the storage capacitor electrode 38a overlaps the scanning signal line 16d via the gate insulating film and is connected to a draw-out wire 28b. The draw-out wire 28b is connected to a contact electrode 78b. The contact electrode 78b is connected to the pixel electrode 17b via a contact hole 12b. As a result, storage capacitance Chb (see FIG. 1) is formed. Note that the other pixels each have a configuration (shape and arrangement of members and their connection relationship) identical to that of the pixel 101.

According to the arrangement, a sub-pixel including the pixel electrode 17a becomes "bright", and a sub-pixel including the pixel electrode 17b becomes "dark".

Figure 3:
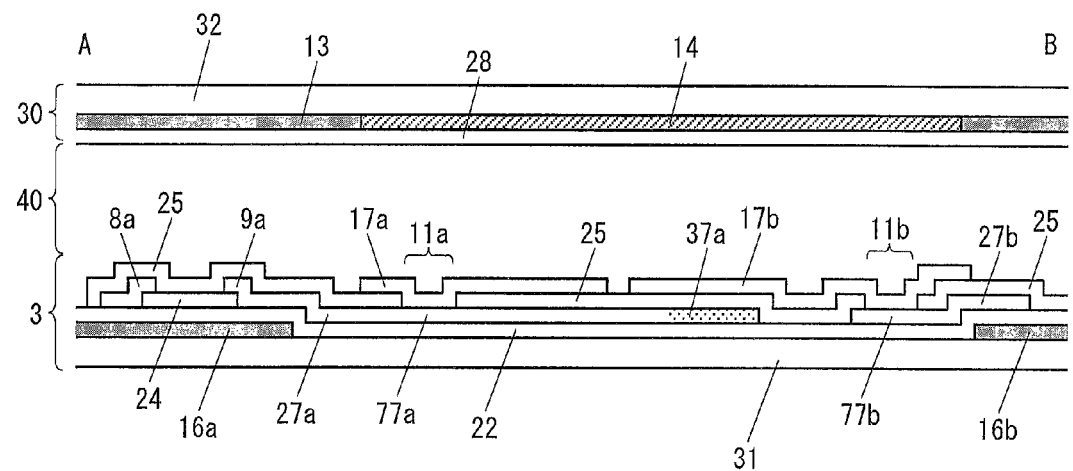
FIG. 3 is a cross-sectional view illustrating a specific example taken along the line A-B of FIG. 2.

FIG. 3 is a cross-sectional view taken along the line A-B of FIG. 2. As shown in FIG. 3, the liquid crystal panel 5a includes an active matrix substrate 3, a color filter substrate 30 facing the active matrix substrate 3, and a liquid crystal layer 40 sandwiched between the two substrates (3 and 30).

The active matrix substrate 3 has the scanning signal lines 16a and 16b provided on a glass substrate 31, and on these members, an inorganic gate insulating film 22 is provided so as to cover these members. On the inorganic gate insulating film 22, a semiconductor layer 24 (i layer and n+ layer), the source electrode 8a that is in contact with the n+ layer, the drain electrode 9a, the drain draw-out wires 27a and 27b, the contact electrodes 77a and 77b, and the coupling capacitor electrode 37a are provided. Further, an inorganic interlayer insulating film 25 is formed thereon so as to cover these members. The n+ layer is removed, by etching or the like, from a part (typically, a channel section of a transistor) of the semiconductor layer 24 which part does not overlap the source electrode 8a and the drain electrode 9a, so that the part of the semiconductor layer 24 has only the i layer. The pixel electrodes 17a and 17b are formed on the inorganic interlayer insulating film 25, and further an alignment film (not illustrated) is formed so as to cover these members (pixel electrodes 17a and 17b). In this example, the inorganic interlayer insulating film 25 is hollowed out at the contact holes 11a and 11b, thereby allowing connection of the pixel electrode 17a and the contact electrode 77a and connection of the pixel electrode 17b and the contact electrode 77b. Moreover, the coupling capacitor electrode 37a connected to the drain draw-out wire 27a overlaps the pixel electrode 17b via the inorganic interlayer insulating film 25. As a result, the coupling capacitor C101 (see FIG. 1) is formed.

Meanwhile, the color filter substrate 30 includes a black matrix 13 and a colored layer 14 provided on a glass substrate 32. A common electrode (com) 28 is provided on an upper layer of the black matrix 13 and colored layer 14. Further, an alignment film (not illustrated) is formed on the common electrode 28 so as to cover the common electrode (com) 28.

Figure 4:
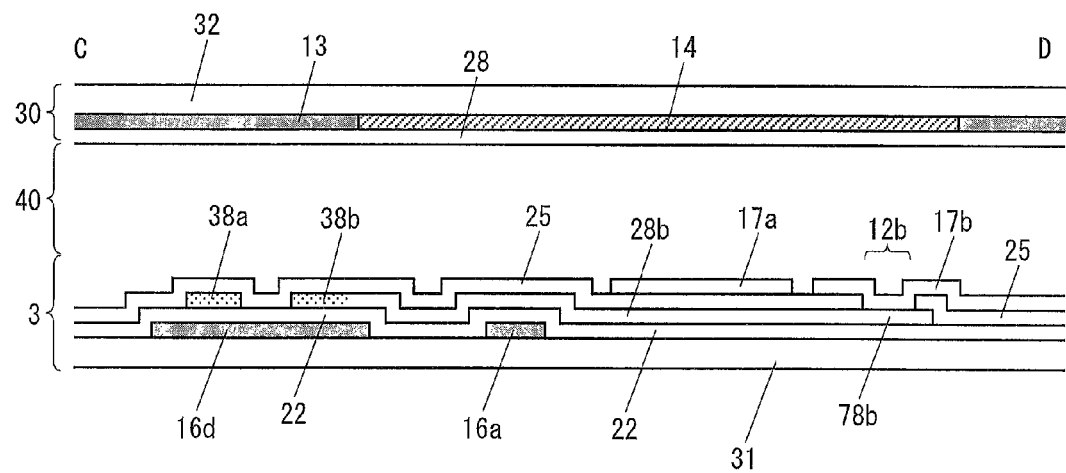
FIG. 4 is a cross-sectional view illustrating the specific example taken along the line C-D of FIG. 2.

FIG. 4 is a cross-sectional view taken along the line C-D of FIG. 2. The liquid crystal panel 5a includes the active matrix substrate 3, the color filter substrate 30 facing the active matrix substrate 3, and the liquid crystal layer 40 sandwiched between the two substrates (3 and 30), as in FIG. 3.

The active matrix substrate 3 has the scanning signal lines 16d and 16a provided on the glass substrate 31, and on these members, the inorganic gate insulating film 22 is provided so as to cover these members. On the inorganic gate insulating film 22, the storage capacitor electrodes 38a and 38b, the draw-out wire 28b, and the contact electrode 78b are provided. Further, the inorganic interlayer insulating film 25 is formed thereon so as to cover these members. The pixel electrodes 17a and 17b are formed on the inorganic interlayer insulating film 25, and further an alignment film (not illustrated) is formed so as to cover these members (pixel electrodes 17a and 17b). In this example, the inorganic interlayer insulating film 25 is hollowed out at the contact hole 12b, thereby allowing connection of the pixel electrode 17b and the contact electrode 78b. Moreover, the storage capacitor electrode 38a connected to the drain draw-out wire 28a (see FIG. 2) overlaps the scanning signal line 16d via the inorganic gate insulating film 22. As a result, storage capacitance Cha (see FIG. 1) is formed. Moreover, a storage capacitor electrode 38b connected to the drain draw-out wire 28b overlaps the scanning signal line 16d via the inorganic gate insulating film 22. As a result, storage capacitance Chb (see FIG. 1) is formed.

Meanwhile, the color filter substrate 30 includes the black matrix 13 and the colored layer 14 provided on the glass substrate 32. The common electrode (com) 28 is provided on an upper layer of the black matrix 13 and colored layer 14. Further, an alignment film (not illustrated) is formed on the common electrode 28 so as to cover the common electrode (com) 28.

The following describes an example of a method for manufacturing the active matrix substrate 3.

First, a metal film made of a metal such as titanium, chromium, aluminum, molybdenum, tantalum, tungsten or copper, an alloy film of these metals, or a laminated film of these metals is formed on a transparent insulating substrate (the glass substrate 31 in FIG. 3) made of a material such as glass or plastic so as to have a thickness of 1000 Å to 3000 Å by a method such as sputtering. The film thus formed is patterned to a required shape by photoetching so that scanning signal lines (which function as gate electrodes of transistors) etc. are formed.

Next, a silicon nitride film (SiNx) which serves as a gate insulating film, a high-resistance semiconductor layer made of a material such as amorphous silicon or polysilicon, and a low-resistance semiconductor layer made of a material such as n+ amorphous silicon are successively formed by plasma CVD (chemical vapor deposition), and are then patterned by photoetching. The silicon nitride film which serves as a gate insulating film is formed to have, for example, a thickness of approximately 3000 Å to 5000 Å, the amorphous silicon film which serves as the high-resistance semiconductor layer is formed to have, for example a thickness of approximately 1000 Å to 3000 Å, and the n+ amorphous silicon film which serves as the low-resistance semiconductor layer is formed to have, for example, a thickness of approximately 400 Å to 700 Å.

Next, a metal film made of a metal such as titanium, chromium, aluminum, molybdenum, tantalum, tungsten or copper, an alloy film of these metals, or a laminated film of these metals is formed so as to have a thickness of 1000 Å to 3000 Å by a method such as sputtering. The film thus formed is patterned to a required shape by a method such as photoetching. Thus, data signal lines, a source electrode, a drain electrode, etc. are formed.

Next, the patterns such as the data signal lines, source electrode, or drain electrode are used as masks to dry-etch the high-resistance semiconductor layer (i layer) such as an amorphous silicon film and the low-resistance semiconductor layer (n+ layer) such as a n+ amorphous silicon film. Thus, channel etching is carried out. This process optimizes a film thickness of the i layer, thereby forming transistors (channel regions). A part of the semiconductor layers which is not covered with the masks are removed by etching, so that an i layer required for performance of the transistors remains.

Next, an inorganic insulating film made of a material such as silicon nitride or oxide silicon is formed as an interlayer insulating film so as to cover the data signal lines, the source electrode, the drain electrode, etc. In the present embodiment, a silicon nitride film (passivation film) having a thickness of approximately 2000 Å to 5000 Å is formed by a method such as plasma CVD.

Next, the interlayer insulating film is etched on the basis of a position of a contact hole so as to form a hole. In the present embodiment, for example, a photo-sensitive resist is patterned by photolithography (exposure and development), and the interlayer insulating film is etched with the use of the photo-sensitive resist thus patterned.

Next, a conductive film having transparency such as ITO (indium-tin oxide), IZO, zinc oxide, or tin oxide is formed on the interlayer insulating film by a method such as sputtering so as to have a thickness of approximately 1000 Å to 2000 Å. By patterning the conductive film to a required shape by a method such as photoetching, first and second pixel electrodes are formed in each pixel region.

Next, an alignment film is applied by a method such as an ink-jet method so as to cover each pixel electrode.

The above method for manufacturing an active matrix substrate is applicable also to liquid crystal panels described later. For convenience of description, such methods are not explained in the following description.

Figure 5:
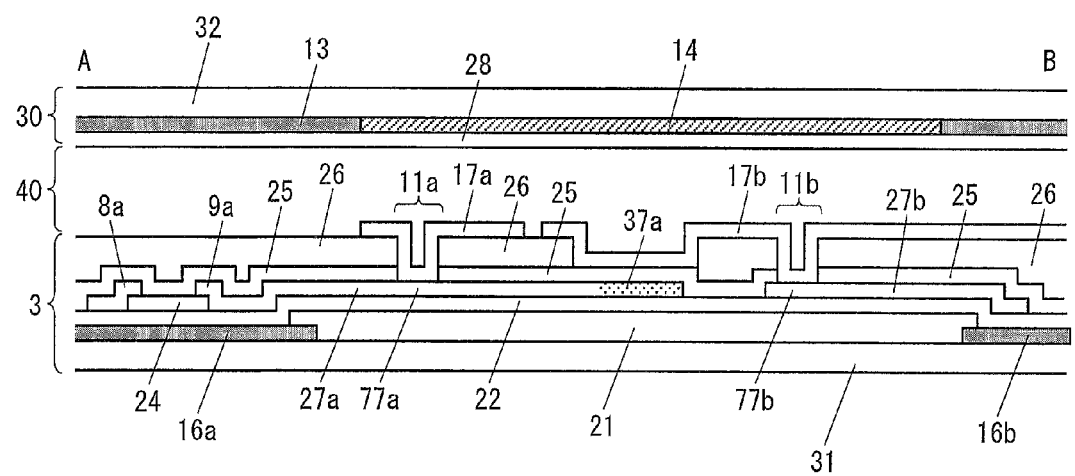
FIG. 5 is a cross-sectional view illustrating another specific example taken along the line A-B of FIG. 2.

The A-B cross section of FIG. 3 may be configured as in FIG. 5. That is to say, a thick organic gate insulating film 21 and a thin inorganic gate insulating film 22 are formed on the glass substrate 31, and a thin inorganic interlayer insulating film 25 and a thick organic interlayer insulating film 26 are formed in layers below the pixel electrodes. This attains an effect of preventing reduction in various parasitic capacitances and preventing short-circuiting of wires. In this case, as illustrated in FIG. 5, it is preferable that the organic interlayer insulating film 26 is hollowed at a part positioned above the coupling capacitor electrode 37a. This increases a capacitance value of the coupling capacitor C101.

The inorganic interlayer insulating film 25, organic interlayer insulating film 26, and contact holes 11a and 11b illustrated in FIG. 5 may be formed by a method as follows. Namely, after the transistor (TFT) is formed, an inorganic interlayer insulating film 25 (passivation film) made of SiNx having a thickness of approximately 3000 Å is formed by CVD with use of a mixed gas of $SiH_4$ gas, $NH_3$ gas and $N_2$ gas, so that the inorganic interlayer insulating film 25 covers an entire substrate surface. Thereafter, an organic interlayer insulating film 26 made of positive-type photosensitive acrylic resin is formed by spin coating or die coating, so as to have a thickness of approximately 3 μm. Subsequently, the hollowed part in the organic interlayer insulating film 26 and various contact patterns are formed by performing photolithography. Furthermore, the organic interlayer insulating film 26 that is patterned is used as a mask to dry etch the inorganic interlayer insulating film 25, by use of a mixed gas of $CF_4$ gas and $O_2$ gas. Specifically, for example, the hollowed part in the organic interlayer insulating film 26 is subjected to half exposure in the photolithography step so that a thin organic interlayer insulating film remains at the time of completion of development, whereas the contact hole part is subjected to full exposure in the photolithography step so that no organic interlayer insulating film remains at the time of completion of development. Here, by performing dry etching by use of a mixed gas of $CF_4$ gas and $O_2$ gas, the remaining part (of the organic interlayer insulating film) is removed from the hollowed part in the organic interlayer insulating film, and an inorganic interlayer insulating film below the organic interlayer insulating film is removed from the contact hole part. The organic gate insulating film 21 and the organic interlayer insulating film 26 may be an insulating film made of SOG (spin-on glass) material, for example, and the organic gate insulating film 21 and the organic interlayer insulating film 26 may include at least one of acrylic resin, epoxy resin, polyimide resin, polyurethane resin, novolac resin, and siloxane resin.

Figure 6:
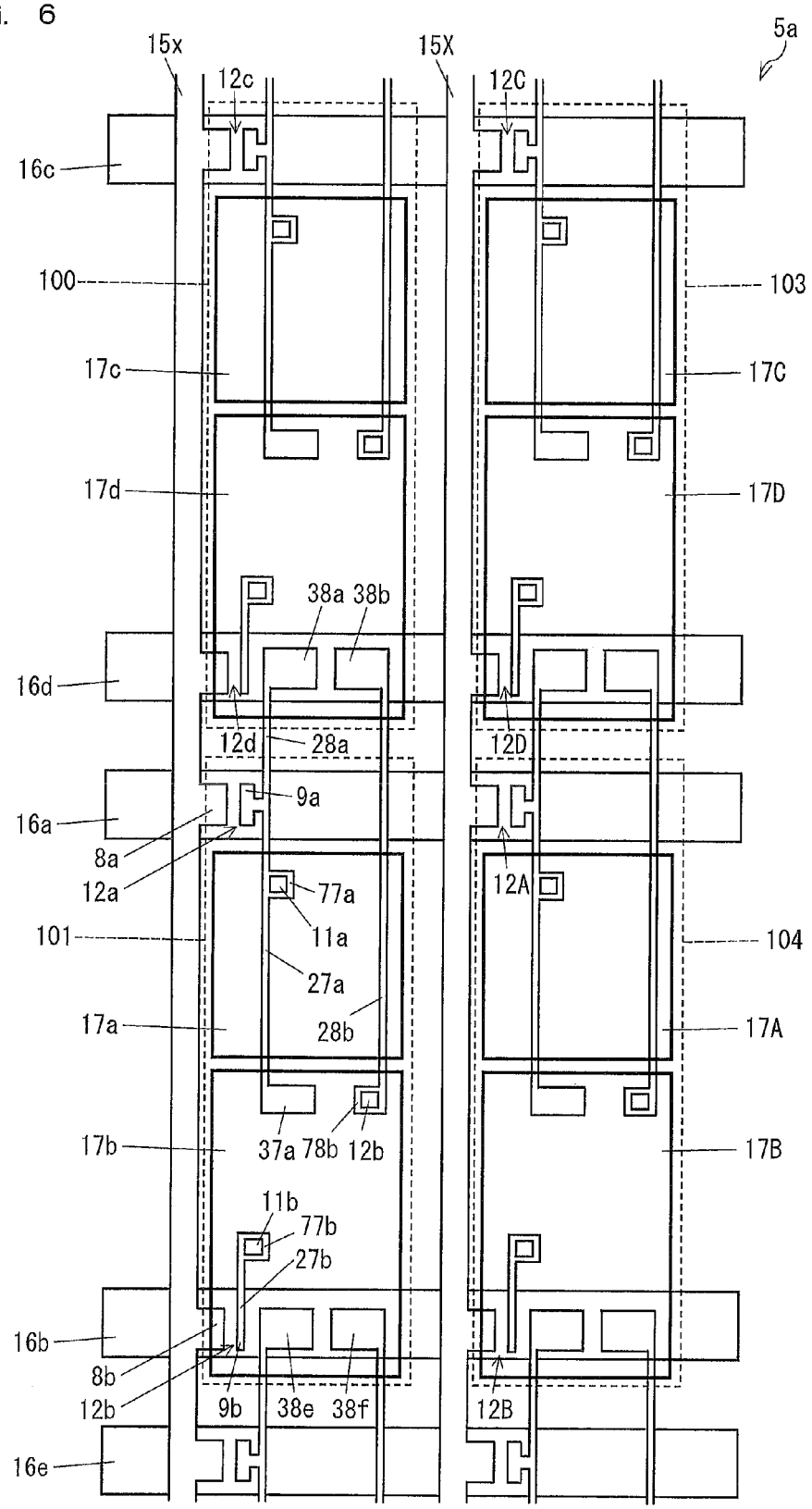
FIG. 6 is a plan view illustrating another configuration of the liquid crystal panel 5*a* of FIG. 2.

In a case where a thin inorganic interlayer insulating film 25 and a thick organic interlayer insulating film 26 are formed in layers below the pixel electrodes as shown in FIG. 5, the liquid crystal panel 5a may be configured as shown in FIG. 6. That is to say, the pixel electrode 17b is formed so as to overlap the scanning signal line 16b via the inorganic interlayer insulating film 25 and the thick organic interlayer insulating film 26. This makes it possible to reduce parasitic capacitance between the pixel electrode 17b and the scanning signal line 16b, thereby, in particular, allowing an improvement in aperture ratio while suppressing an increase in load on the scanning signal line 16b.

(Specific Example 1-2 of Liquid Crystal Panel)

Figure 7:
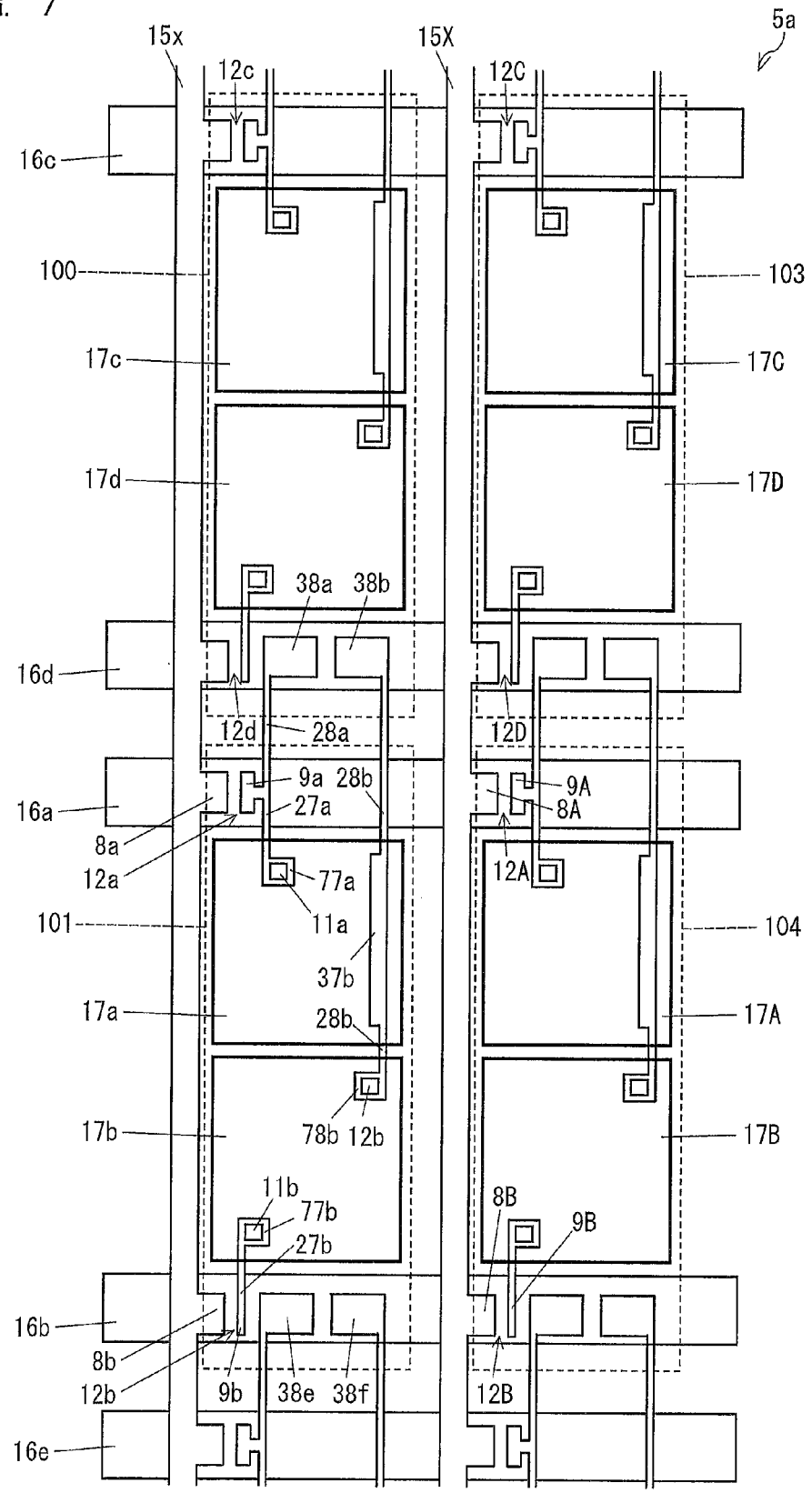
FIG. 7 is a plan view illustrating another configuration (specific example 1-2) of the liquid crystal panel 5*a*.

FIG. 7 illustrates a specific example 1-2 of the liquid crystal panel 5a. In the liquid crystal panel 5a of FIG. 7, members of the liquid crystal panel of FIG. 2, i.e., the coupling capacitor 37a and a part of the drain draw-out wire 27a connected to the coupling capacitor 37a are omitted. In the liquid crystal panel 5a of FIG. 7, a data signal line 15x is provided along a pixel 100 and a pixel 101, and a data signal line 15X is provided along a pixel 103 and a pixel 104, as in the liquid crystal panel of FIG. 2.

A scanning signal line 16c is disposed so as to overlap one of two edge sections of the pixel 100, which two edge sections run along the row direction, and a scanning signal line 16d is disposed so as to overlap the other one of these two edge sections of the pixel 100. From a plan view, pixel electrodes 17c and 17d are aligned in a column direction, between the scanning signal lines 16c and 16d. The scanning signal line 16c also overlaps one of two edge sections of the pixel 103, which two edge sections run along the row direction, and the scanning signal line 16d overlaps the other one of these two edge sections of the pixel 103. From a plan view, pixel electrodes 17C and 17D are aligned in the column direction, between the scanning signal lines 16c and 16d.

A scanning signal line 16a is disposed so as to overlap one of two edge sections of the pixel 101, which two edge sections run along the row direction, and a scanning signal line 16b is disposed so as to overlap the other one of these two edge sections of the pixel 101. From a plan view, pixel electrodes 17a and 17b are aligned in the column direction, between the scanning signal lines 16a and 16b. The scanning signal line 16a also overlaps one of two edge sections of the pixel 104, which two edge sections run along the row direction, and the scanning signal line 16b overlaps the other one of these two edge sections of the pixel 104. From a plan view, pixel electrodes 17A and 17B are aligned in the column direction, between the scanning signal lines 16a and 16b.

In the pixel 101, a source electrode 8a of a transistor 12a and a drain electrode 9a of the transistor 12a are provided on the scanning signal line 16a, and a source electrode 8b of a transistor 12b and a drain electrode 9b of the transistor 12b are provided on the scanning signal line 16b. The source electrode 8a is connected to the data signal line 15x. The drain electrode 9a is connected to a drain draw-out wire 27a. The drain draw-out wire 27a is connected to a contact electrode 77a. The contact electrode 77a is connected to the pixel electrode 17a via a contact hole 11a. Moreover, the drain electrode 9a is connected to a drain draw-out wire 28a. The drain draw-out wire 28a is connected to a storage capacitor electrode 38a. The storage capacitor electrode 38a overlaps the scanning signal line 16d via a gate insulating film. As a result, storage capacitance Cha (see FIG. 1) is formed.

The source electrode 8b of the transistor 12b is connected to the data signal line 15x. The drain electrode 9b is connected to a drain draw-out wire 27b. The drain draw-out wire 27b is connected to a contact electrode 77b. The contact electrode 77b is connected to the pixel electrode 17b via a contact hole 11b. A coupling capacitor electrode 37b that is formed in an identical layer to the storage capacitor electrode 38a overlaps the pixel electrode 17a via an interlayer insulating film and is connected to a draw-out wire 28b. The draw-out wire 28b is connected to a contact electrode 78b. The contact electrode 78b is connected to the pixel electrode 17b via a contact hole 12b. As a result, a coupling capacitor C101 (see FIG. 1) between the pixel electrodes 17a and 17b is formed. Moreover, the draw-out wire 28b drawn out from the coupling capacitor electrode 37b is connected to a storage capacitor electrode 38b. The storage capacitor electrode 38b overlaps the scanning signal line 16d via a gate insulating film. As a result, storage capacitance Chb (see FIG. 1) is formed. Note that the other pixels each have a configuration (shape and arrangement of members and their connection relationship) identical to that of the pixel 101.

According to the arrangement, a sub-pixel including the pixel electrode 17a becomes "bright", and a sub-pixel including the pixel electrode 17b becomes "dark".

According to this configuration example, the drain draw-out wire 27a can be shortened. This allows an improvement in aperture ratio.

(Specific Example 1-3 of Liquid Crystal Panel)

Figure 8:
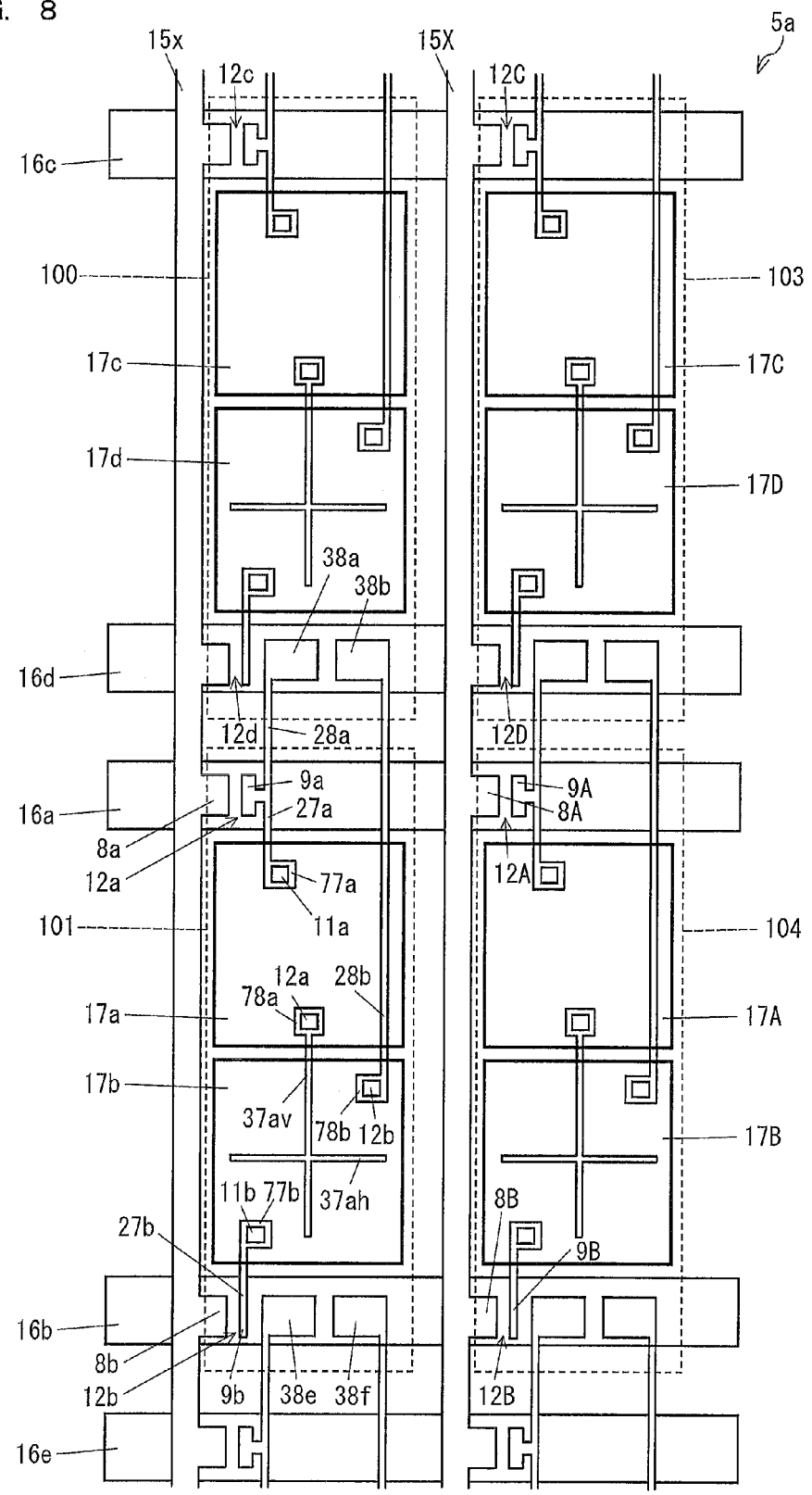
FIG. 8 is a plan view illustrating another configuration (specific example 1-3) of the liquid crystal panel 5*a*.
Figure 9:
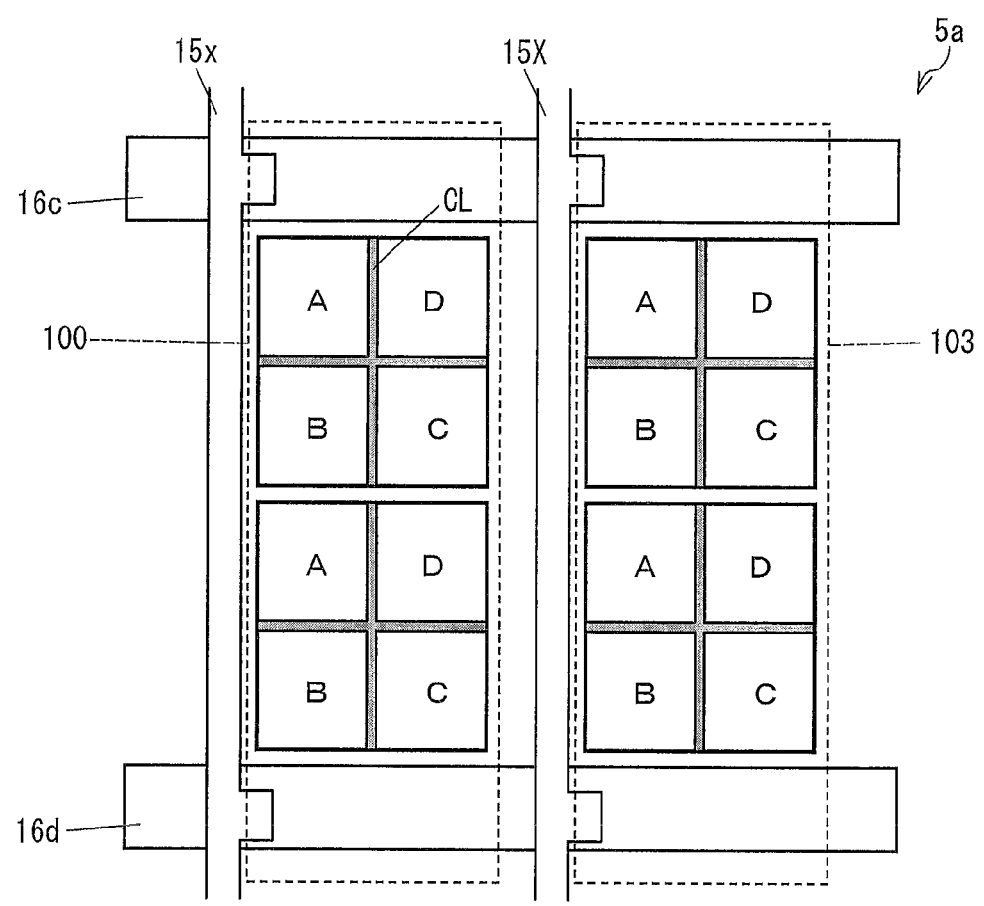
FIG. 9 is a plan view illustrating a state in which each sub-pixel region is divided into four liquid crystal domains A through D in the liquid crystal panel 5*a* of FIG. 8.

FIG. 8 illustrates a specific example 1-3 of the liquid crystal panel 5a. In the liquid crystal panel 5a of FIG. 8, coupling capacitor electrodes 37av and 37ah are disposed so as to form a cross-like shape in a central part of a dark sub-pixel region. This liquid crystal panel 5a is suitable especially for an alignment division structure in which a plurality of liquid crystal domains are formed in one pixel region (sub-pixel region). According to the alignment division structure, in which a plurality of domains which are different in alignment direction (tilt direction) are formed, it is possible to improve viewing angle characteristics. A technique for the alignment division structure is disclosed, for example, in WO2008/069181. FIG. 9 illustrates a state in which each sub-pixel region is divided into four liquid crystal domains A through D. Note that FIG. 9 illustrates a pixel 100 and a pixel 103, and transistors are omitted from FIG. 9. According to such an alignment division structure, a cross-shaped dark line indicated by the line CL is observed at a boundary between each of the liquid crystal domains A through D and another liquid crystal domain. In a case where a light-shielding member needs to be disposed in a pixel region, the light-shielding member is disposed so as to overlap the dark line. Thus, an effective aperture ratio of a pixel can be improved.

In view of this, the liquid crystal panel 5a of the present example is arranged such that the coupling capacitor electrodes 37av and 37ah are disposed so as to form a cross-like shape and to overlap the dark line in the central part of the sub-pixel region. Thus, a reduction in aperture ratio can be suppressed.

A configuration of the present liquid crystal panel 5a is described below in detail. In the liquid crystal panel 5a of FIG. 8, a data signal line 15x is provided along a pixel 100 and a pixel 101, and a data signal line 15X is provided along a pixel 103 and a pixel 104, as in the liquid crystal panel of FIG. 2.

A scanning signal line 16c is disposed so as to overlap one of two edge sections of the pixel 100, which two edge sections run along the row direction, and a scanning signal line 16d is disposed so as to overlap the other one of these two edge sections of the pixel 100. From a plan view, pixel electrodes 17c and 17d are aligned in a column direction, between the scanning signal lines 16c and 16d. The scanning signal line 16c also overlaps one of two edge sections of the pixel 103, which two edge sections run along the row direction, and the scanning signal line 16d overlaps the other one of these two edge sections of the pixel 103. From a plan view, pixel electrodes 17C and 17D are aligned in the column direction, between the scanning signal lines 16c and 16d.

A scanning signal line 16a is disposed so as to overlap one of two edge sections of the pixel 101, which two edge sections run along the row direction, and a scanning signal line 16b is disposed so as to overlap the other one of these two edge sections of the pixel 101. From a plan view, pixel electrodes 17a and 17b are aligned in the column direction, between the scanning signal lines 16a and 16b. The scanning signal line 16a also overlaps one of two edge sections of the pixel 104, which two edge sections run along the row direction, and the scanning signal line 16b overlaps the other one of these two edge sections of the pixel 104. From a plan view, pixel electrodes 17A and 17B are aligned in the column direction, between the scanning signal lines 16a and 16b.

In the pixel 101, a source electrode 8a of a transistor 12a and a drain electrode 9a of the transistor 12a are provided on the scanning signal line 16a, and a source electrode 8b of a transistor 12b and a drain electrode 9b of the transistor 12b are provided on the scanning signal line 16b. The source electrode 8a is connected to the data signal line 15x. The drain electrode 9a is connected to a drain draw-out wire 27a. The drain draw-out wire 27a is connected to a contact electrode 77a. The contact electrode 77a is connected to the pixel electrode 17a via a contact hole 11a. Moreover, the drain electrode 9a is connected to a drain draw-out wire 28a. The drain draw-out wire 28a is connected to a storage capacitor electrode 38a. The storage capacitor electrode 38a overlaps the scanning signal line 16d via a gate insulating film. As a result, storage capacitance Cha (see FIG. 1) is formed. The coupling capacitor electrode 37av that extends in the column direction and the coupling capacitor electrode 37ah that extends in the row direction are formed in an identical layer so as to form a cross-like shape and overlap the pixel electrode 17b via an interlayer insulating film. One end of the coupling capacitor electrode 37av is connected to a contact electrode 78a. The contact electrode 78a is connected to the pixel electrode 17a via a contact hole 12a. As a result, a coupling capacitor C101 (see FIG. 1) between the pixel electrodes 17a and 17b is formed.

The source electrode 8b of the transistor 12b is connected to the data signal line 15x. The drain electrode 9b is connected to a drain draw-out wire 27b The drain draw-out wire 27b is connected to a contact electrode 77b. The contact electrode 77b is connected to the pixel electrode 17b via a contact hole 11b. A storage capacitor electrode 38b that is formed in an identical layer to the storage capacitor electrode 38a overlaps the scanning signal line 16d via a gate insulating film and is connected to a draw-out wire 28b. The draw-out wire 28b is connected to a contact electrode 78b. The contact electrode 78b is connected to the pixel electrode 17b via a contact hole 12b. As a result, storage capacitance Chb (see FIG. 1) is formed. Note that the other pixels each have a configuration (shape and arrangement of members and their connection relationship) identical to that of the pixel 101.

According to the arrangement, a sub-pixel including the pixel electrode 17a becomes "bright", and a sub-pixel including the pixel electrode 17b becomes "dark".

(Method for Driving Liquid Crystal Display Device)

The following describes a method for driving the present liquid crystal display device including the liquid crystal panel 5a. The present driving method mainly has the following features.

The first feature lies in that the transistor 12b connected to the capacitively coupled electrode is turned ON at least once while the liquid crystal display device is in an ON state. This allows the capacitively coupled electrode (pixel electrode 17b) to be electrically connected to the data signal line 15x, thereby allowing an electric charge accumulated in the capacitively coupled electrode to be discharged (refreshed), as described above. It is thus possible to suppress occurrence of image sticking of a sub-pixel including the capacitively coupled electrode.

The second feature lies in that the transistor 12b is turned ON at least once while the liquid crystal display device is in an ON state and that the transistor 12b is turned OFF while Vcom is being supplied to the data signal line 15x. This makes it possible to set an electric potential of the pixel electrode 17b to Vcom. Consequently, in addition to the discharging effect, an effect of preventing a reduction in display quality can be produced.

In addition to the first and second features, the third feature lies in that the transistor 12b connected to the pixel electrode 17b is turned OFF while Vcom is being supplied from the data signal line 15x to the pixel electrodes 17a and 17b via the transistors 12a and 12b, respectively. That is, at the time when the transistor 12b is turned OFF, the transistor 12a is in an ON state and Vcom is being supplied to the pixel electrode 17a. This makes it possible to reset an electric potential of a pixel electrode in 1 pixel region before writing a regular signal electric potential into the pixel electrode 17a. That is, it is possible to fix an electric potential of the capacitively coupled pixel electrode 17b to Vcom. This allows an electric charge accumulated in the pixel electrode 17b to be surely discharged, thereby preventing a decline in display quality.

The following describes, in detail, specific driving methods having the above features and configurations of gate drivers realizing such driving methods. Note that each of the driving methods described below employs a charge sharing method, but is not limited to this.

(Driving Method 1)

Figure 10:
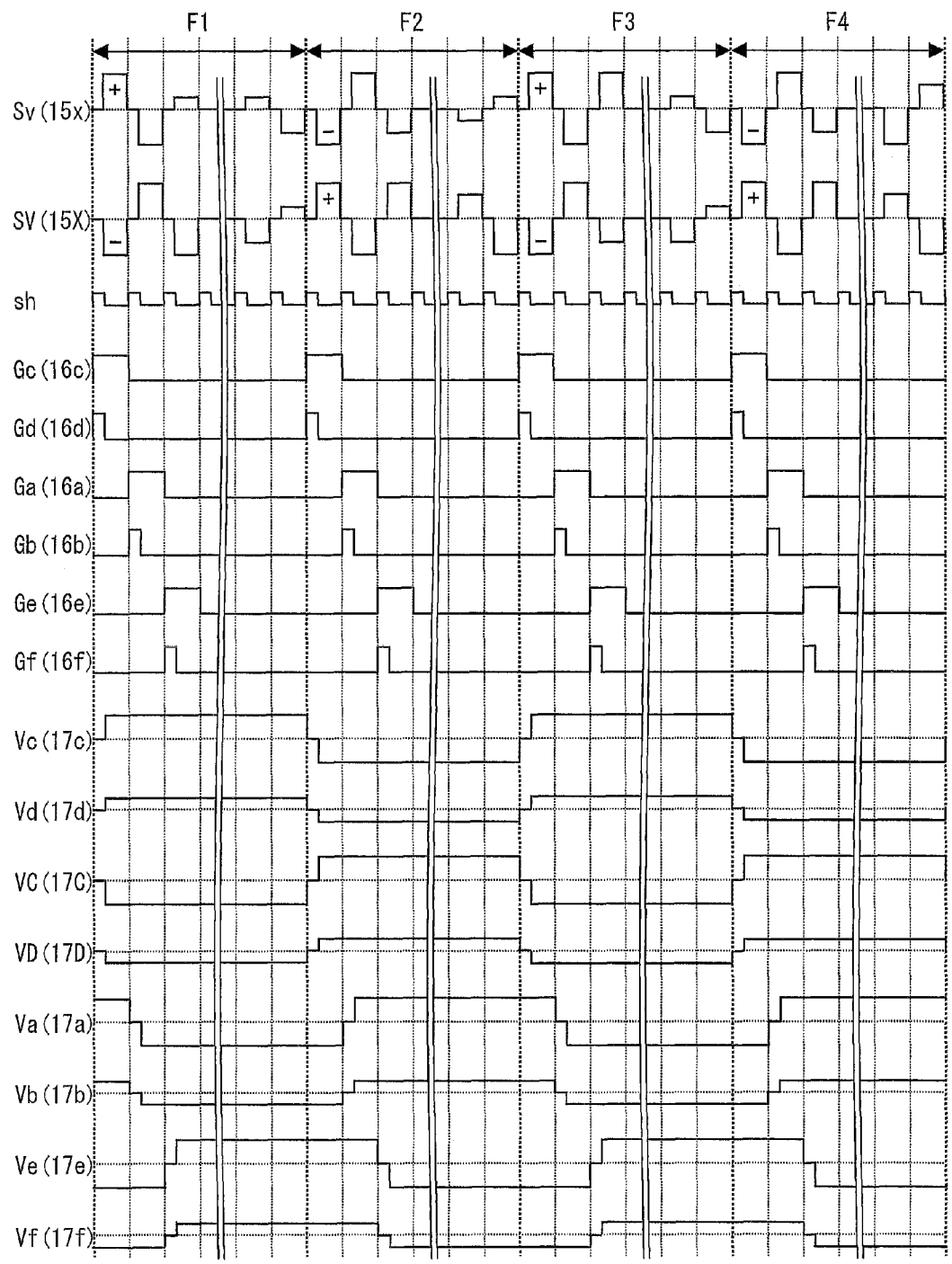
FIG. 10 is a timing chart showing a method for driving a liquid crystal display device including the liquid crystal panel 5*a* or 5*b*.
Figure 11:
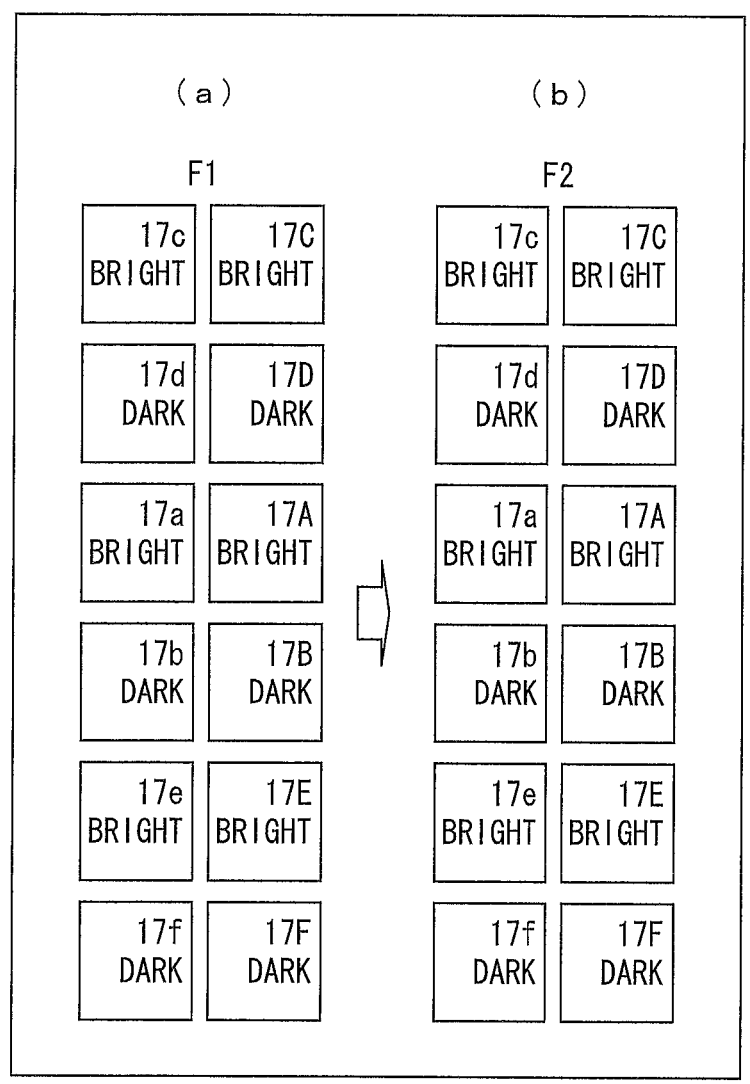
FIG. 11 is a diagram schematically showing a display state of each frame in a case where the driving method of FIG. 10 is used.

FIG. 10 is a timing chart showing a method for driving the present liquid crystal display device including the liquid crystal panel 5a. In FIG. 10, Sv and SV represent signal electric potentials to be supplied to two adjacent data signal lines (15x and 15X, for example), respectively, Ga to Gf represent gate on-pulse signals to be supplied to scanning signal lines 16a to 16f, respectively, Vc, Vd, Va, Vb, VC, and VD represent electric potentials of pixel electrodes 17c, 17d, 17a, 17b, 17C, and 17D, respectively, and sh represents a charge sharing signal. During a period in which the charge sharing signal is active ("H"), charge sharing occurs caused by having all of the data signal lines be short-circuited to each other, or by having an identical electric potential be supplied to all of the data signal lines from outside.

With this driving method, as illustrated in FIG. 10, a polarity of a signal electric potential to be supplied to the data signal line is inverted per one horizontal scanning period (1H), and a polarity of a signal electric potential that is supplied to each of horizontal scanning periods having an identical ordinal number in the respective frames is inverted per 1 frame. Further, signal electric potentials of opposite polarities are supplied to two adjacent data signal lines in the one identical horizontal scanning period, respectively, and charge sharing is carried out at the beginning of each of the horizontal scanning periods.

More specifically, in a case of consecutive frames F1 to F4, in F1, two upper and lower scanning signal lines that are associated with one a pixel are sequentially selected (for example, scanning signal lines 16c and 16d→scanning signal lines 16a and 16b→scanning signal lines 16e and 16f (see FIG. 1)). To one of two adjacent data signal lines (e.g., data signal line 15x), a signal electric potential of a positive polarity is supplied in a first horizontal scanning period (e.g., including a write-in period of the pixel electrodes 17c and 17d), a signal electric potential of a negative polarity is supplied in a second horizontal scanning period (e.g., including a write-in period of the pixel electrodes 17a and 17b), and a signal electric potential of a positive polarity is supplied in a third horizontal scanning period (e.g., including a write-in period of the pixel electrodes 17e and f). To the other one of the two data signal lines (e.g., data signal line 15X), a signal electric potential of a negative polarity is supplied in the first horizontal scanning period (e.g., including a write-in period of pixel electrodes 17C and 17D), a signal electric potential of a positive polarity is supplied in the second horizontal scanning period (e.g., including a write-in period of the pixel electrodes 17A and 17B), and a signal electric potential of a negative polarity is supplied in the third horizontal scanning period (e.g., including a write-in period of the pixel electrodes 17E and 17F). Note that a charge sharing electric potential (Vcom) is supplied at the beginning of each of the horizontal scanning periods.

Write-in periods into pixel electrodes connected to respective two scanning signal lines that are associated with 1 pixel are set to be different from each other. Specifically, in FIG. 1, a period in which the scanning signal line 16c is selected so that a signal electric potential of a positive polarity is written into the pixel electrode 17c is longer than a period in which the scanning signal line 16d is selected so that a signal electric potential of Vcom is written into the pixel electrode 17d, and a period in which the scanning signal line 16a is selected so that a signal electric potential of a negative polarity is written into the pixel electrode 17a is longer than a period in which the scanning signal line 16b is selected so that a signal electric potential of Vcom is written into the pixel electrode 17b. Further, write-in operations into pixel electrodes in 1 pixel are carried out within an identical horizontal scanning period, and a write-in operation (active period) into a pixel electrode for which a write-in period is short finishes earlier than a write-in operation (active period) into a pixel electrode for which a write-in period is long. Specifically, a write-in operation into the pixel electrode 17d finishes earlier than a write-in operation into the pixel electrode 17c, a write-in operation into the pixel electrode 17D finishes earlier than a write-in operation into the pixel electrode 17C, and a write-in operation into the pixel electrode 17b finishes earlier than a write-in operation into the pixel electrode 17a.

A gate on-pulse signal (second gate on-pulse signal) supplied to a scanning signal line connected to a capacitively coupled pixel electrode has a pulse width that is smaller than a pulse width of a gate on-pulse signal (first gate on-pulse signal) supplied to a scanning signal line connected to a pixel electrode to which a regular signal electric potential is written. The pulse width of the second gate on-pulse signal is set so that the second gate on-pulse signal becomes non-active before the first gate on-pulse signal becomes non-active. As a result, a sub-pixel including the pixel electrode 17c (positive polarity) becomes "bright", a sub-pixel including the pixel electrode 17d (positive polarity) becomes "dark", a sub-pixel including the pixel electrode 17C (negative polarity) becomes "bright", a sub-pixel including the pixel electrode 17D (negative polarity) becomes "dark", a sub-pixel including the pixel electrode 17a (negative polarity) becomes "bright", and a sub-pixel including the pixel electrode 17b (negative polarity) becomes "dark". As a whole, the sub-pixels become as illustrated in (a) of FIG. 11.

In F2, polarities of the pixel electrodes are reverse to those of F1. That is, a sub-pixel including the pixel electrode 17c (negative polarity) becomes "bright", a sub-pixel including the pixel electrode 17d (negative polarity) becomes "dark", a sub-pixel including the pixel electrode 17C (positive polarity) becomes "bright", a sub-pixel including the pixel electrode 17D (positive polarity) becomes "dark", a sub-pixel including the pixel electrode 17a (positive polarity) becomes "bright", and a sub-pixel including the pixel electrode 17b (positive polarity) becomes "dark". As a whole, the sub-pixels become as illustrated in (b) of FIG. 11. In the subsequent frames F3 and F4, the operations in F1 and F2 are repeated.

As described above, according to the present driving method, in each frame, at a timing different from a timing at which a signal electric potential is supplied to a pixel electrode (17c, 17a, 17C or 17A) to which regular writing is carried out, a signal electric potential can be supplied to a pixel electrode (the pixel electrodes 17d, 17b, 17D or 17B) capacitively coupled to the pixel electrode (17c, 17a, 17C or 17A) that is connected to a data signal line (15x or 15X) via a transistor (12c, 12a, 12C or 12A in FIGS. 1 and 2). This makes it possible to provide a liquid crystal display device of a pixel division mode.

According to the present driving method, a Vcom signal is supplied to all pixel electrodes within 1 pixel region at the beginning of each horizontal scanning period. Accordingly, an electric potential of the pixel electrode can be reset to Vcom before a regular signal electric potential is written. This allows an electric charge accumulated in the capacitively coupled pixel electrode to be discharged (refreshed), thereby making it possible to suppress occurrence of image sticking of a sub-pixel including a capacitively coupled pixel electrode and to prevent a decline in display quality. Further, according to the present driving method, it is unnecessary to adjust a channel W/L ratio of a transistor unlike the conventional art, and an active matrix substrate can be configured such that transistors have substantially the same channel size. Consequently, it is possible to suppress a decline in display quality that is caused by variation of transistor characteristics.

Figure 12:
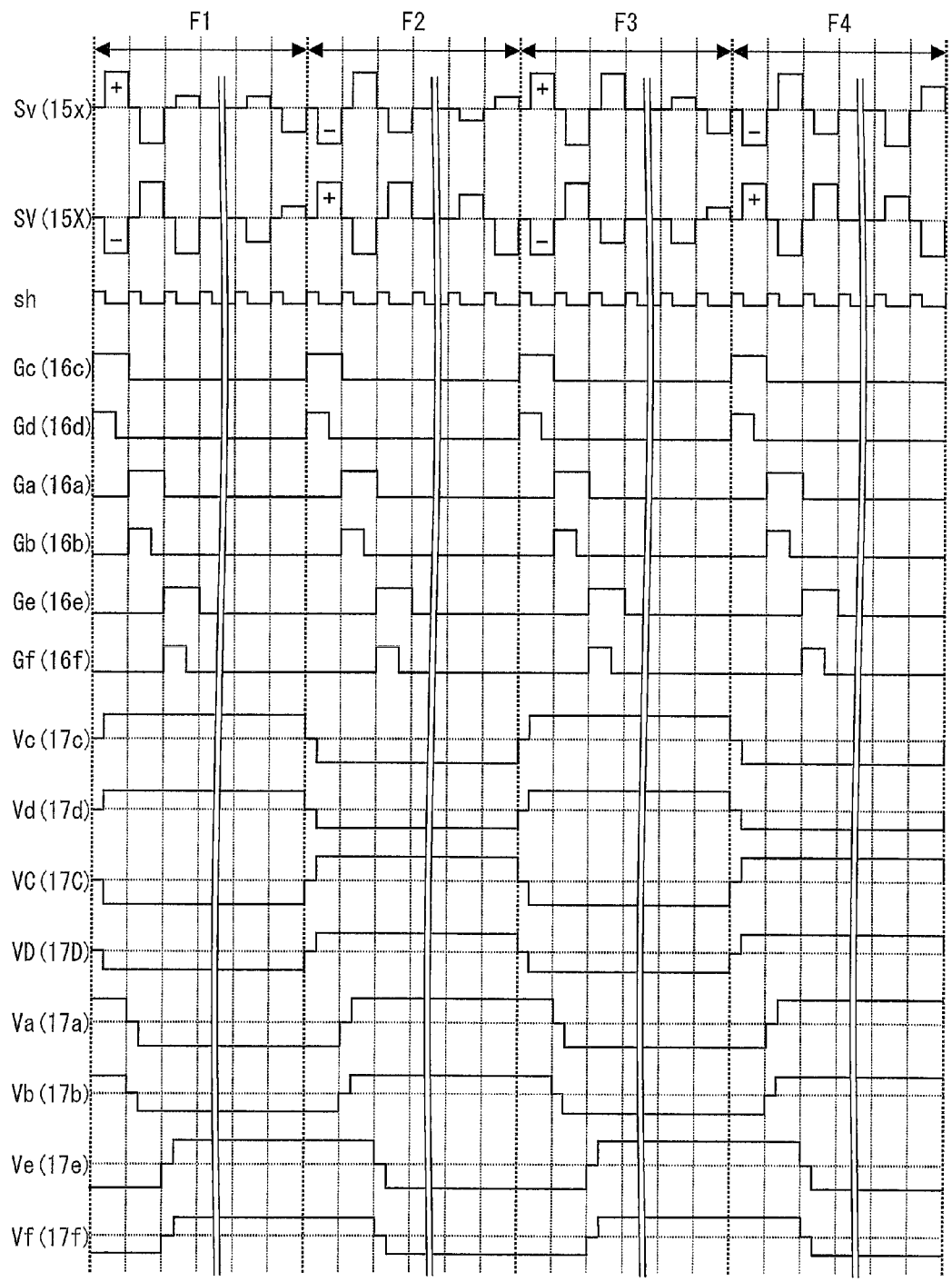
FIG. 12 is a timing chart showing another method for driving a liquid crystal display device including the liquid crystal panel 5*a* or 5*b*.

Instead of the driving method of FIG. 10, a driving method of FIG. 12 may be employed. Specifically, the pulse width of the second gate on-pulse signal (Gd, Gb, Gf) is set to be wider than a charge sharing period (pulse width of sh). According to this driving method, to a pixel electrode (17d, 17b or 17f) capacitively coupled to a pixel electrode (17c, 17a or 17e) to which regular writing is carried out, a signal electric potential of Vcom is written during a charge sharing period, and then a regular signal electric potential that is written into the pixel electrode (17c, 17a or 17e) is supplied only during a predetermined period. This makes it possible to adjust (improve) luminance especially during white display. According to the present arrangement, by adjusting the pulse width of the second gate on-pulse signal, luminance of a pixel electrode (17d, 17b or 17f; capacitively coupled electrode) connected to a pixel electrode (17c, 17a or 17e) that is connected to a data signal line via a transistor can be thus independently adjusted. This allows a liquid crystal display device to have desirable display luminance.

(Configuration 1 of Gate Driver)

Figure 13:
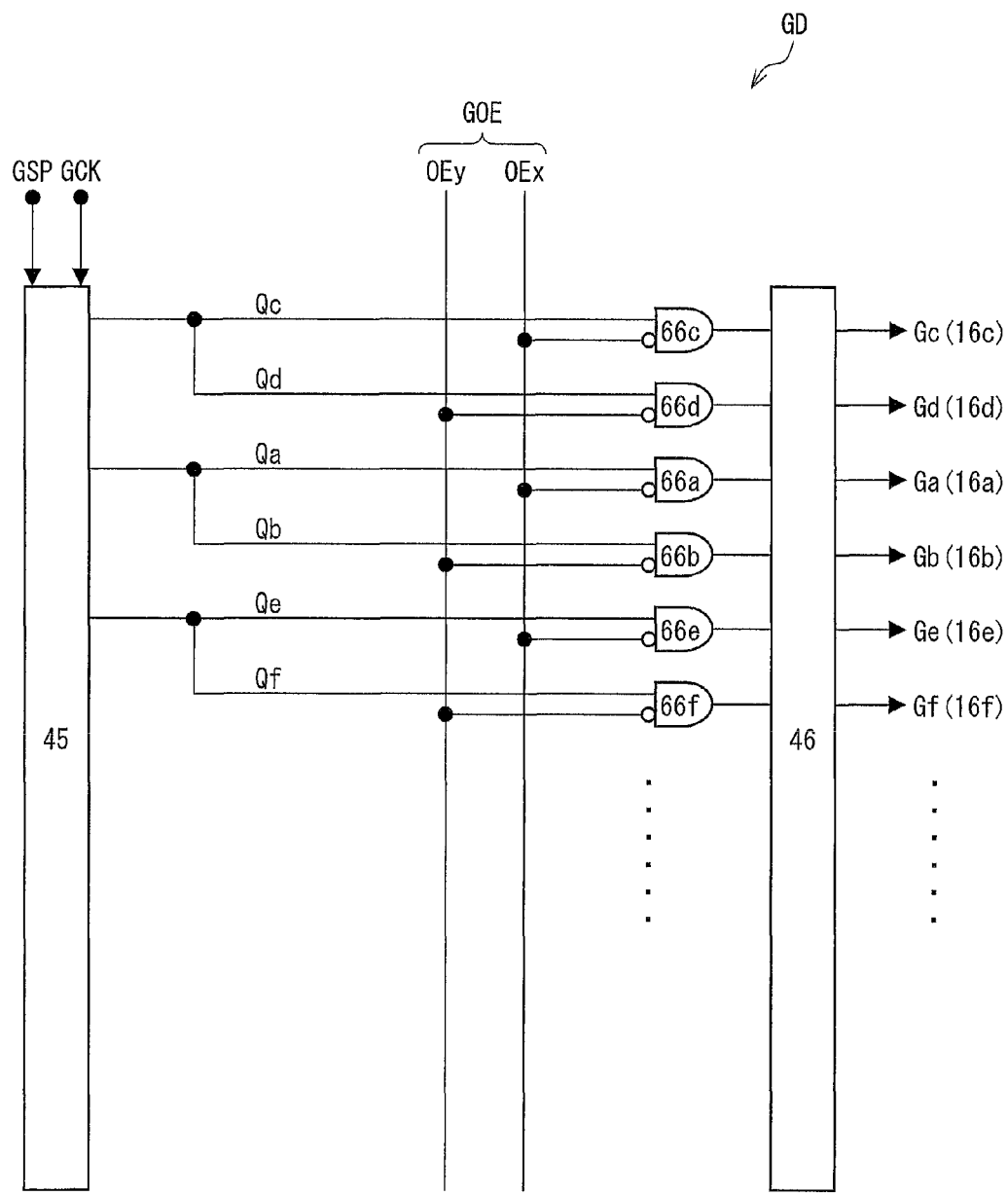
FIG. 13 is a circuit diagram illustrating a configuration of a gate driver for driving the liquid crystal panel 5a or 5b.

FIG. 13 is a circuit diagram illustrating a configuration of a gate driver of the present liquid crystal display device for accomplishing the driving shown in FIG. 10. As shown in FIG. 13, a gate driver GD includes a shift register 45, a plurality of AND circuits (66a to 66f) aligned in a column direction, and an output circuit 46. The shift register 45 receives a gate start pulse signal GSP and a gate clock signal GCK. Output in each stage of the shift register 45 is branched out into two systems; one of them is inputted into a respective odd-numbered AND circuit, and the other one of them is inputted to a respective even-numbered AND circuit that is disposed adjacent to the odd-numbered AND circuit. Moreover, a gate driver output control signal GOE is made up of signals of two systems (OEx and OEy); an inverted signal of the signal OEx is inputted into the odd-numbered AND circuits, and an inverted signal of the signal OEy is inputted into the even-numbered AND circuits. Further, an output of one AND circuit becomes a gate on-pulse signal via the output circuit 46, and this gate on-pulse signal is supplied to one scanning signal line.

For example, an output from a stage of the shift register 45 is branched out into two systems; one output Qc is inputted into the AND circuit 66c, and the other output Qd is inputted into the AND circuit 66d. Moreover, the inverted signal of the signal OEx is inputted into the AND circuit 66c, and the inverted signal of the signal OEy is inputted into the AND circuit 66d. Further, an output of the AND circuit 66c becomes a gate on-pulse signal Gc via the output circuit 46, and this gate on-pulse signal Gc is supplied to the scanning signal line 16c. Meanwhile, an output from the AND circuit 66d becomes a gate on-pulse signal Gd via the output circuit 46, and this gate on-pulse signal Gd is supplied to the scanning signal line 16d.

Similarly, output from another stage of the shift register 45 is branched out into two systems; one output Qa is inputted into a AND circuit 66a, and the other output Qb is inputted to a AND circuit 66b. Moreover, the inverted signal of the signal OEx is inputted into the AND circuit 66a, and the inverted signal of the signal OEy is inputted into the AND circuit 66b. Thereafter, an output from the AND circuit 66a becomes a gate on-pulse signal Ga via the output circuit 46, and this gate on-pulse signal Ga is supplied to the scanning signal line 16a. Meanwhile, the output from the AND circuit 66b becomes a gate on-pulse signal Gb via the output circuit 46, and this gate on-pulse signal Gb is supplied to the scanning signal line 16b.

Figure 14:
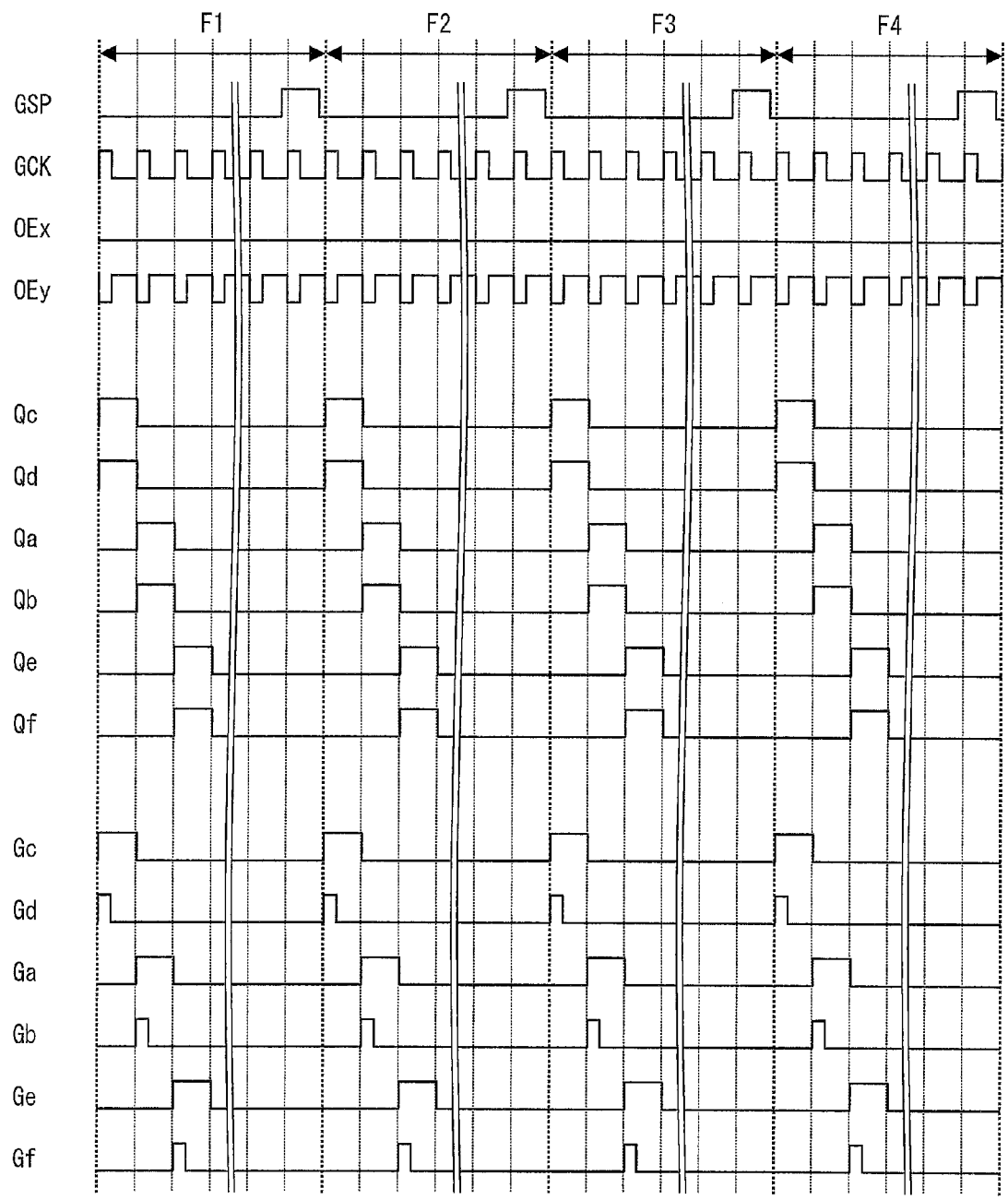
FIG. 14 is a timing chart of a driving method of the gate driver of FIG. 13.

FIG. 14 is a timing chart illustrating an operation of the gate driver illustrated in FIG. 13. As illustrated in FIG. 14, for example, the signal OEx is always "L" in each frame, whereas the signal OEy is "L" in former parts of each of the horizontal scanning periods. Note that the signal OEx need not to be always "L". For example, in a case where falling of a waveform of the gate on-pulse slows and overlaps a next horizontal scanning period, the signal OEx can be "H" in latter parts of each of the horizontal scanning periods.

Hence, it is possible to make the gate on-pulse signals Gc, Ga, and Ge successively "H" (active), and is possible to make the gate on-pulse signals Gd, Gb, and Gf successively "H" (active). Further, it is possible to make a width ("H" period (active period)) of a gate on-pulse (write-in pulse) of each of the gate on-pulse signals Gc, Ga, and Ge different from that of the gate on-pulse signals Gd, Gb, and Gf. As a result, a drive as illustrated in FIG. 10 is achieved.

The configuration of FIG. 14 produces an effect that a width of a gate on-pulse (write-in pulse) can be set as appropriate. In addition, the configuration of FIG. 14 produces an effect that gate on-pulse signals to be respectively provided to the two scanning signal lines that are associated with a pixel can be generated by use of an output outputted from a same stage of a shift register, thereby simplifying a driver configuration.

(Driving Method 2)

Figure 15:
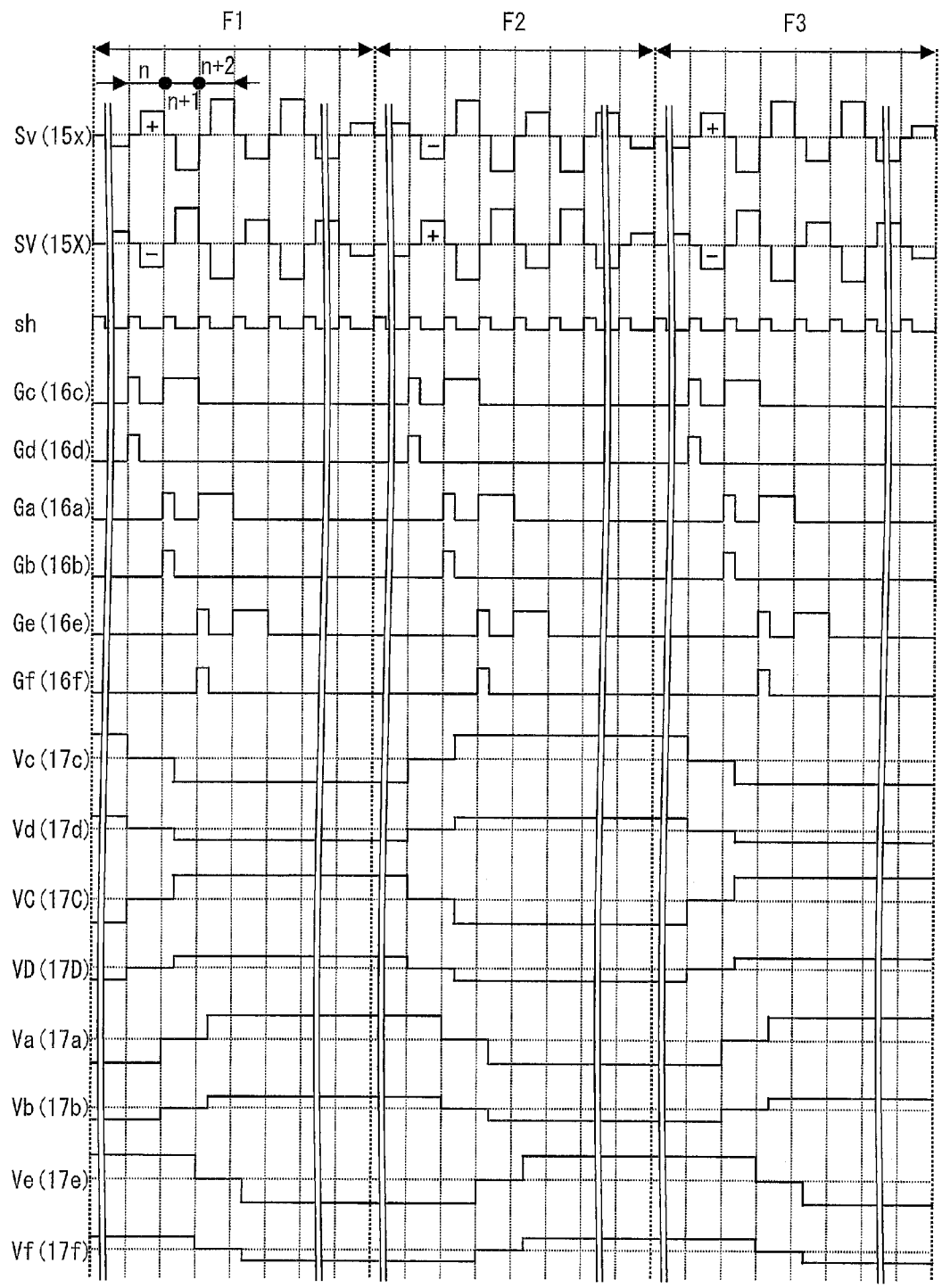
FIG. 15 is a timing chart showing another method for driving a liquid crystal display device including the liquid crystal panel 5a or 5b.

FIG. 15 is a timing chart showing another method for driving the present liquid crystal display device. The reference numerals shown in FIG. 15 are similar to the reference numerals shown in FIG. 10. Also in this driving method, as illustrated in FIG. 10, a polarity of a signal electric potential to be supplied to the data signal line is inverted per one horizontal scanning period (1H), and a polarity of a signal electric potential that is supplied to each of horizontal scanning periods having an identical ordinal number in the respective frames is inverted per 1 frame. Further, signal electric potentials of opposite polarities are supplied to two adjacent data signal lines in the one identical horizontal scanning period, respectively, and charge sharing is carried out at the beginning of each of the horizontal scanning periods.

In the present driving method, two upper and lower scanning signal lines that are associated with a pixel are concurrently selected before a horizontal scanning period for regular writing. Thus, Vcom is supplied to all pixel electrodes within 1 pixel region.

More specifically, in a case of consecutive frames F1 to F4, in F1, two upper and lower scanning signal lines that are associated with one a pixel are sequentially selected (for example, scanning signal lines 16c and 16d→scanning signal lines 16a and 16b (see FIG. 1)). To one of two adjacent data signal lines (e.g., data signal line 15x), a signal electric potential of a positive polarity is supplied in a n-th horizontal scanning period, a Vcom signal is supplied at the beginning of the n-th horizontal scanning period, a signal electric potential of a negative polarity is supplied in a (n+1)th horizontal scanning period (e.g., including a write-in period of the pixel electrode 17c), a Vcom signal is supplied at the beginning of the (n+1)th horizontal scanning period, a signal electric potential of a positive polarity is supplied in a (n+2)th horizontal scanning period (e.g., including a write-in period of the pixel electrode 17a), and a Vcom signal is supplied at the beginning of the (n+2)th horizontal scanning period. To the other one of the two data signal lines (e.g., data signal line 15X), a signal electric potential of a negative polarity is supplied in the n-th horizontal scanning period, a Vcom signal is supplied at the beginning of the n-th horizontal scanning period, a signal electric potential of a positive polarity is supplied in the (n+1)th horizontal scanning period (e.g., including a write-in period of the pixel electrode 17C), a Vcom signal is supplied at the beginning of the (n+1)th horizontal scanning period, a signal electric potential of a negative polarity is supplied in the (n+2)th horizontal scanning period (e.g., including a write-in period of the pixel electrode 17A), and a Vcom signal is supplied at the beginning of the (n+2)th horizontal scanning period.

As a result, a sub-pixel including the pixel electrode 17c (negative polarity) becomes "bright", a sub-pixel including the pixel electrode 17d (negative polarity) becomes "dark", a sub-pixel including the pixel electrode 17C (positive polarity) becomes "bright", a sub-pixel including the pixel electrode 17D (positive polarity) becomes "dark", a sub-pixel including the pixel electrode 17a (positive polarity) becomes "bright", and a sub-pixel including the pixel electrode 17b (positive polarity) becomes "dark".

As to the pixel 101, the transistors 12a and 12b are both turned ON in the horizontal scanning period (n+1) provided previously to the horizontal scanning period (n+2) in which regular writing is carried out, and Vcom is supplied to the pixel electrode 17a to which a regular signal electric potential is written and to the pixel electrode 17b capacitively coupled to the pixel electrode 17a. During a period in which Vcom is supplied, the transistors 12a and 12b are both turned OFF. As a result, a signal electric potential of a negative polarity to be supplied to the data signal line 15x in the (n+1)th horizontal scanning period is supplied, as a regular write-in signal, to the pixel electrode 17c of a preceding stage, but is not supplied to the pixel electrode 17a within the pixel 101. In the next (n+2)th horizontal scanning period, only the transistor 12a is turned ON so that Vcom is supplied to the pixel electrode 17a at the beginning of the (n+2)th horizontal scanning period, and then a signal electric potential of a positive polarity is supplied, as a regular write-in signal, to the pixel electrode 17a.

With this driving method, in F1, a sub-pixel including the pixel electrode 17c (negative polarity) becomes "bright", a sub-pixel including the pixel electrode 17d (negative polarity) becomes "dark", a sub-pixel including the pixel electrode 17C (positive polarity) becomes "bright", a sub-pixel including the pixel electrode 17D (positive polarity) becomes "dark", a sub-pixel including the pixel electrode 17a (positive polarity) becomes "bright", and a sub-pixel including the pixel electrode 17b (positive polarity) becomes "dark".

In F2, polarities of the pixel electrodes are reverse to those of F1. That is, a sub-pixel including the pixel electrode 17c (positive polarity) becomes "bright", a sub-pixel including the pixel electrode 17d (positive polarity) becomes "dark", a sub-pixel including the pixel electrode 17C (negative polarity) becomes "bright", a sub-pixel including the pixel electrode 17D (negative polarity) becomes "dark", a sub-pixel including the pixel electrode 17a (negative polarity) becomes "bright", and a sub-pixel including the pixel electrode 17b (negative polarity) becomes "dark". In the subsequent frames F3 and F4, the operations in F1 and F2 are repeated.

As described above, according to the present driving method, at a timing when the transistor 12b is turned OFF, Vcom is being supplied from the data signal line 15x to the pixel electrodes 17a and 17b. That is, before a regular signal electric potential is written into the pixel electrode 17a, an electric potential of the pixel electrodes 17a and 17b can be fixed (reset) to Vcom. This makes it possible to discharge an electric charge accumulated in the capacitively coupled electrode (the pixel electrode 17b) and to prevent a decline in display quality.

In the present driving method, the reset operation is carried out 1 horizontal scanning period (1H) before a horizontal scanning period in which regular writing is carried out. However, a timing at which the reset operation is carried out is not limited in particular, and the reset operation can be carried out 2H or more before the horizontal scanning period in which regular writing is carried out. Moreover, the number of reset operations is not limited to one, and can be more than one.

Figure 16:
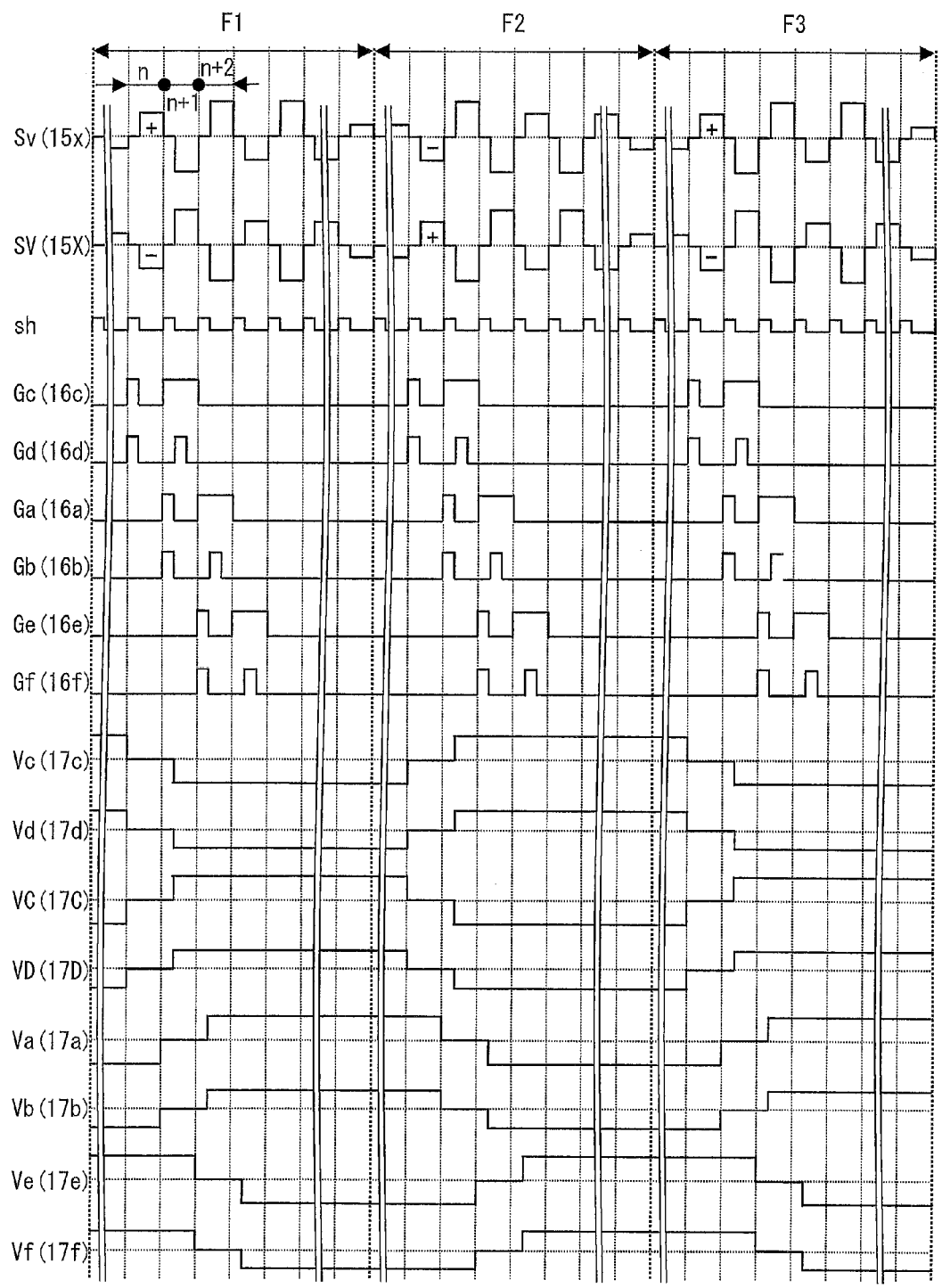
FIG. 16 is a timing chart showing another method for driving a liquid crystal display device including the liquid crystal panel 5a or 5b.

Instead of the driving method of FIG. 15, a driving method of FIG. 16 may be employed. That is, the second gate on-pulse signal (Gd, Gb or Gf) is set to become a High level (H level) only during a predetermined period in a horizontal scanning period in which regular writing is carried out. Specifically, in FIG. 16, the second gate on-pulse signal rises in synchronization with a timing at which a charge sharing signal (sh) becomes a Low level (L level), preserves a High level state only during a predetermined period, and falls before the first gate on-pulse signal (Gc, Ga or Ge) falls. According to this driving method, only during a predetermined period in a horizontal scanning period in which regular writing is carried out, a regular signal electric potential written into the pixel electrode (17c, 17a or 17e) is supplied to the pixel electrode (17d, 17b or 17f) capacitively coupled to the pixel electrode (17c, 17a or 17e) to which the regular writing is carried out. This makes it possible to adjust (improve) luminance especially in white display. According to the present arrangement, by adjusting a high level period of the second gate on-pulse signal, it is thus possible to independently adjust luminance of the pixel electrode (17d, 17b or 17f; capacitively coupled electrode) connected to the pixel electrode (17c, 17a or 17e) that is connected to the data signal line via a transistor. This allows the liquid crystal display device to have desired display luminance. Note that the High level period of the second gate on-pulse signal is not limited to the example shown in FIG. 16. It is only necessary that the High level period of the second gate on-pulse signal is shorter than a period in which the regular signal electric potential is written into the pixel electrode (17c, 17a or 17e) in a Low level period of the charge sharing signal.

(Configuration 2 of Gate Driver)

Figure 17:
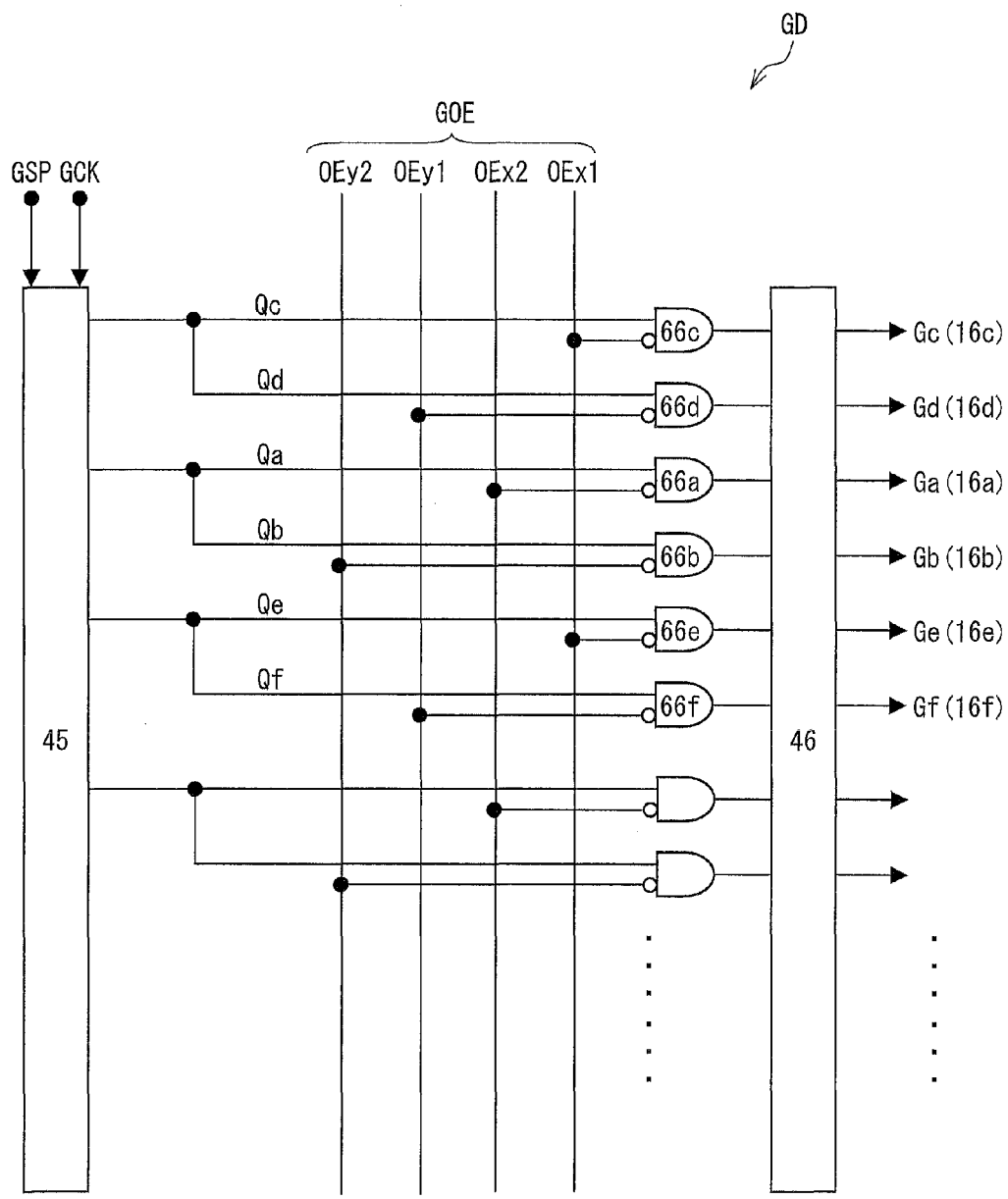
FIG. 17 is a circuit diagram illustrating another configuration of a gate driver for driving the liquid crystal panel 5a or 5b.

FIG. 17 is a circuit diagram illustrating a configuration of a gate driver of the present liquid crystal display device for accomplishing the driving shown in FIG. 15. As shown in FIG. 17, a gate driver GD includes a shift register 45, a plurality of AND circuits (66a to 66f) aligned in a column direction, and an output circuit 46. The shift register 45 receives a gate start pulse signal GSP and a gate clock signal GCK. Output in each stage of the shift register 45 is branched out into two systems; one of them is inputted into a respective odd-numbered AND circuit, and the other one of them is inputted to a respective even-numbered AND circuit that is disposed adjacent to the odd-numbered AND circuit. Moreover, a gate driver output control signal GOE is made up of signals of four systems (OEx1, OEx2, OEy1, and OEy2); inverted signals of the respective signals OEx1 and OEx2 are alternately inputted into the odd-numbered AND circuits, and inverted signals of the respective signals OEy1 and OEy2 are alternately inputted into the even-numbered AND circuits. Further, an output of one AND circuit becomes a gate on-pulse signal via the output circuit 46, and this gate on-pulse signal is supplied to one scanning signal line.

For example, an output from a stage of the shift register 45 is branched out into two systems; one output Qc is inputted into the AND circuit 66c, and the other signal output Qd is inputted into the AND circuit 66d. Moreover, an inverted signal of the signal OEx1 is inputted into the AND circuit 66c, and an inverted signal of the signal OEy1 is inputted into the AND circuit 66d. Further, an output of the AND circuit 66c becomes a gate on-pulse signal Gc via the output circuit 46, and this gate on-pulse signal Gc is supplied to the scanning signal line 16c. Meanwhile, an output from the AND circuit 66d becomes a gate on-pulse signal Gd via the output circuit 46, and this gate on-pulse signal Gd is supplied to the scanning signal line 16d.

Similarly, output from another stage of the shift register 45 is branched out into two systems; one output Qa is inputted into a AND circuit 66a, and the other output Qb is inputted to a AND circuit 66b. Moreover, an inverted signal of the signal OEx2 is inputted into the AND circuit 66a, and an inverted signal of the signal OEy2 is inputted into the AND circuit 66b. Thereafter, an output from the AND circuit 66a becomes a gate on-pulse signal Ga via the output circuit 46, and this gate on-pulse signal Ga is supplied to the scanning signal line 16a. Meanwhile, the output from the AND circuit 66b becomes a gate on-pulse signal Gb via the output circuit 46, and this gate on-pulse signal Gb is supplied to the scanning signal line 16b.

Figure 18:
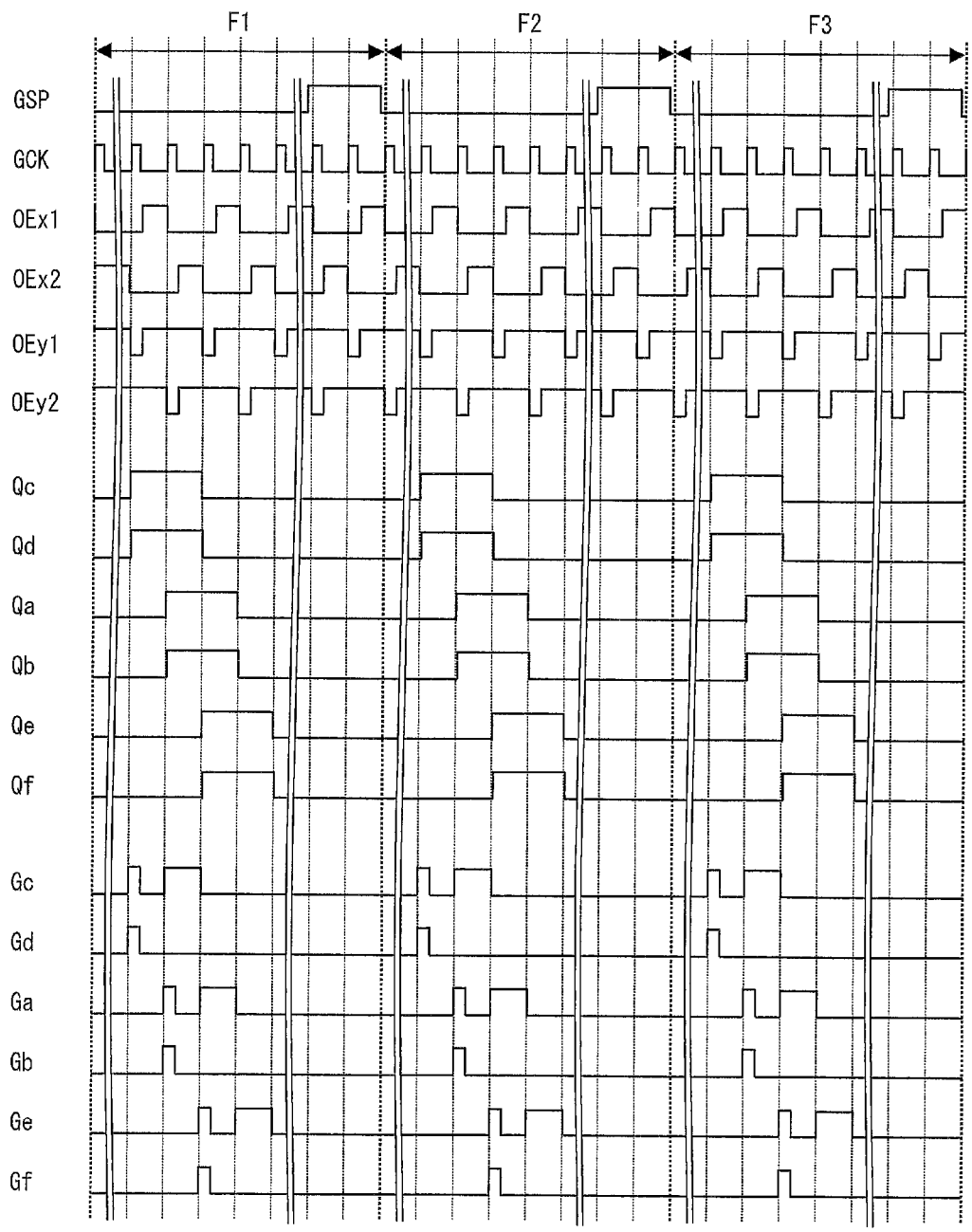
FIG. 18 is a timing chart of a driving method of the gate driver of FIG. 17.

FIG. 18 is a timing chart illustrating an operation of the gate driver illustrated in FIG. 17. As illustrated in FIG. 18, for example, each of the signals OEx1 and OEx2 has a cycle of 2 horizontal scanning periods (2H); each of the signals OEx1 and OEx2 becomes "L" in one of the 2 horizontal scanning periods, whereas each of the signals OEx1 and OEx2 becomes "L" in a former part of the other one of the 2 horizontal scanning periods and becomes "H" (active) in the remaining part. The signals OEx1 and OEx2 are shifted from each other by 1H. Each of the signals OEy1 and OEy2 has a cycle of 2 horizontal scanning periods (2H); each of the signals OEy1 and OEy2 becomes "L" in a former part of one of the 2 horizontal scanning periods and becomes "H" (active) in a remaining part of the one of the 2 horizontal scanning periods, whereas each of the signals OEy1 and OEy2 becomes "H" in the other one of the 2 horizontal scanning periods. The signals OEy1 and OEy2 are shifted from each other by 1H. As the output Q of the shift register 45, signals which become "H" for 2 horizontal scanning periods are sequentially outputted from the respective stages. As a result, a drive as illustrated in FIG. 15 is achieved.

(Driving Method 3)

Figure 19:
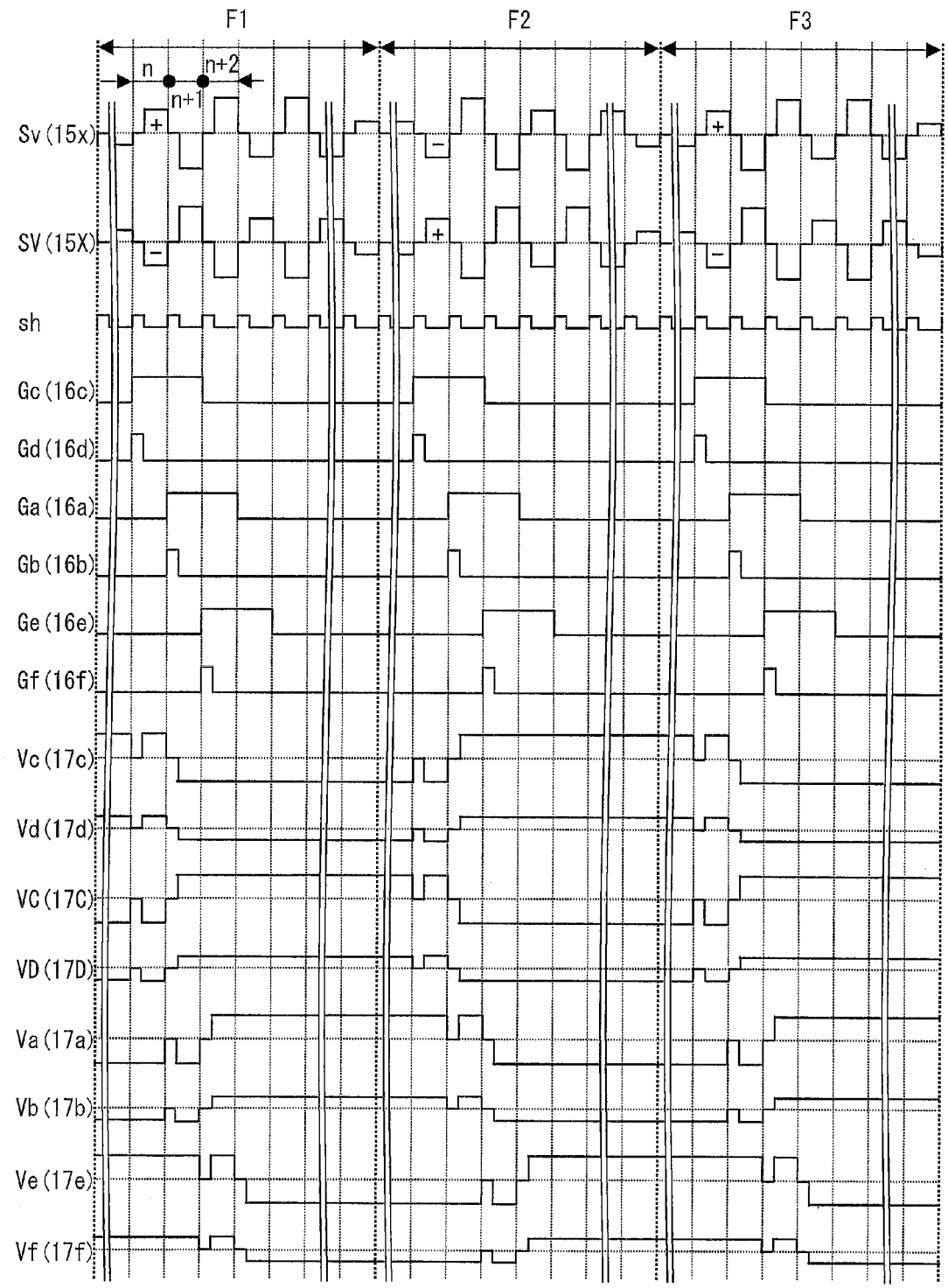
FIG. 19 is a timing chart showing another method for driving a liquid crystal display device including the liquid crystal panel 5a or 5b.

FIG. 19 is a timing chart showing another method for driving the present liquid crystal display device. According to the driving method 2, Vcom is supplied to the pixel electrodes 17a and 17b 1 horizontal scanning period before regular writing, and then the transistors 12a and 12b are both turned OFF until regular writing to the pixel electrode 17a is carried out. Meanwhile, according to the present driving method, Vcom is supplied to the pixel electrodes 17a and 17b 1 horizontal scanning period before regular writing, and then only the transistor 12b is turned OFF and a signal electric potential is supplied to the pixel electrode 17a while the transistor 12a is being turned ON. The following mainly explains differences from the driving method 2 by using the pixel 101 as an example, and similar descriptions are omitted.

As to the pixel 101, the transistors 12a and 12b are both turned ON in the horizontal scanning period (n+1) provided previously to the horizontal scanning period (n+2) in which regular writing is carried out. Thus, Vcom is supplied to the pixel electrode 17a to which a regular signal electric potential is written and to the pixel electrode 17b capacitively coupled to the pixel electrode 17a. During a period in which Vcom is supplied, only the transistor 12b is turned OFF. Accordingly, a signal electric potential of a negative polarity supplied to the data signal line 15x in the (n+1)th horizontal scanning period is supplied as a regular write-in signal to the pixel electrode 17c of a preceding stage, and the same signal electric potential is supplied also to the pixel electrode 17a within the pixel 101. That is, a data signal (signal electric potential) for the pixel electrode 17c of the preceding stage is written into the pixel electrode 17a 1H before the regular writing. Since the transistor 12a is still in an ON state, in the next (n+2)th horizontal scanning period, Vcom is supplied to the pixel electrode 17a at the beginning of the (n+2)th horizontal scanning period, and then a signal electric potential of a positive polarity is supplied as a regular write-in signal to the pixel electrode 17a.

As described above, also in the present driving method, Vcom is being supplied from the data signal line 15x to the pixel electrodes 17a and 17b at a timing when the transistor 12b is turned OFF, as in the driving method 2. That is, an electric potential of the pixel electrodes 17a and 17b can be fixed (reset) to Vcom before the regular signal electric potential is written into the pixel electrode 17a. Accordingly, even in a case where a signal electric potential which is not the regular signal electric potential is supplied to the pixel electrode 17a after the electric potentials of the pixel electrodes 17a and 17b become Vcom, the total sum of the capacitances in the pixel electrodes 17a and 17b does not change. As a result, it is possible to surely discharge an electric charge accumulated in the capacitively coupled electrode (the pixel electrode 17b) and to prevent a decline in display quality.

(Configuration 3 of Gate Driver)

Figure 20:
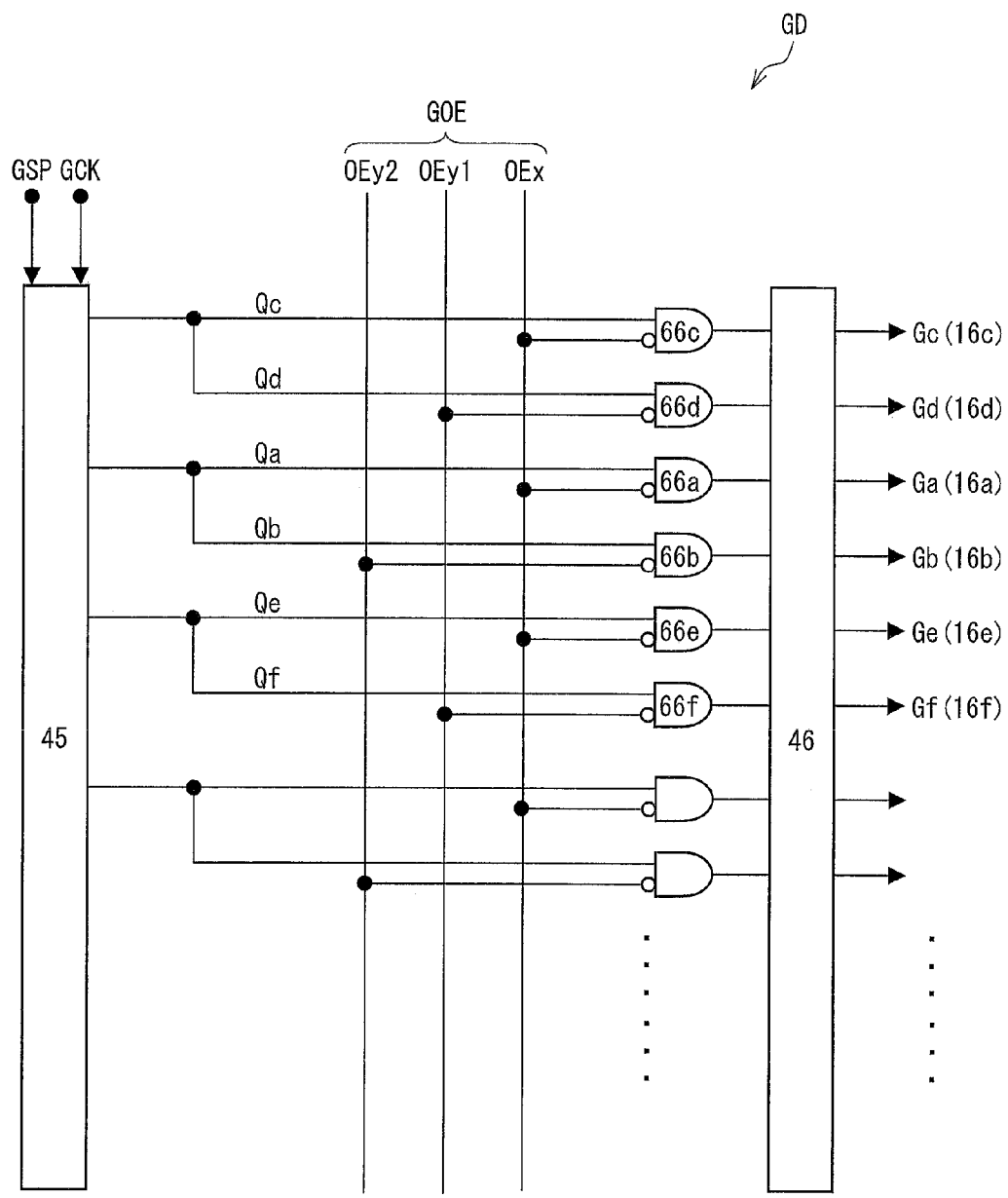
FIG. 20 is a circuit diagram illustrating another configuration of a gate driver for driving the liquid crystal panel 5a or 5b.

FIG. 20 is a circuit diagram illustrating a configuration of a gate driver of the present liquid crystal display device for accomplishing the driving shown in FIG. 19. As shown in FIG. 20, a gate driver GD includes a shift register 45, a plurality of AND circuits (66a to 66f) aligned in a column direction, and an output circuit 46. The shift register 45 receives a gate start pulse signal GSP and a gate clock signal GCK. Output in each stage of the shift register 45 is branched out into two systems; one of them is inputted into a respective odd-numbered AND circuit, and the other one of them is inputted to a respective even-numbered AND circuit that is disposed adjacent to the odd-numbered AND circuit. Moreover, a gate driver output control signal GOE is made up of signals of three systems (OEx, OEy1, and OEy2); an inverted signal of the signal OEx is inputted into the odd-numbered AND circuits, and inverted signals of the signals OEy1 and OEy2 are alternately inputted into the even-numbered AND circuits. Further, an output of one AND circuit becomes a gate on-pulse signal via the output circuit 46, and this gate on-pulse signal is supplied to one scanning signal line.

For example, an output from a stage of the shift register 45 is branched out into two systems; one output Qc is inputted into the AND circuit 66c, and the other output Qd is inputted into the AND circuit 66d. Moreover, an inverted signal of the signal OEx is inputted into the AND circuit 66c, and an inverted signal of the signal OEy1 is inputted into the AND circuit 66d. Further, an output of the AND circuit 66c becomes a gate on-pulse signal Gc via the output circuit 46, and this gate on-pulse signal Gc is supplied to the scanning signal line 16c. Meanwhile, an output from the AND circuit 66d becomes a gate on-pulse signal Gd via the output circuit 46, and this gate on-pulse signal Gd is supplied to the scanning signal line 16d.

Similarly, output from another stage of the shift register 45 is branched out into two systems; one output Qa is inputted into a AND circuit 66a, and the other output Qb is inputted to a AND circuit 66b. Moreover, the inverted signal of the signal OEx is inputted into the AND circuit 66a, and the inverted signal of the signal OEy2 is inputted into the AND circuit 66b. Thereafter, an output from the AND circuit 66a becomes a gate on-pulse signal Ga via the output circuit 46, and this gate on-pulse signal Ga is supplied to the scanning signal line 16a. Meanwhile, the output from the AND circuit 66b becomes a gate on-pulse signal Gb via the output circuit 46, and this gate on-pulse signal Gb is supplied to the scanning signal line 16b.

Figure 21:
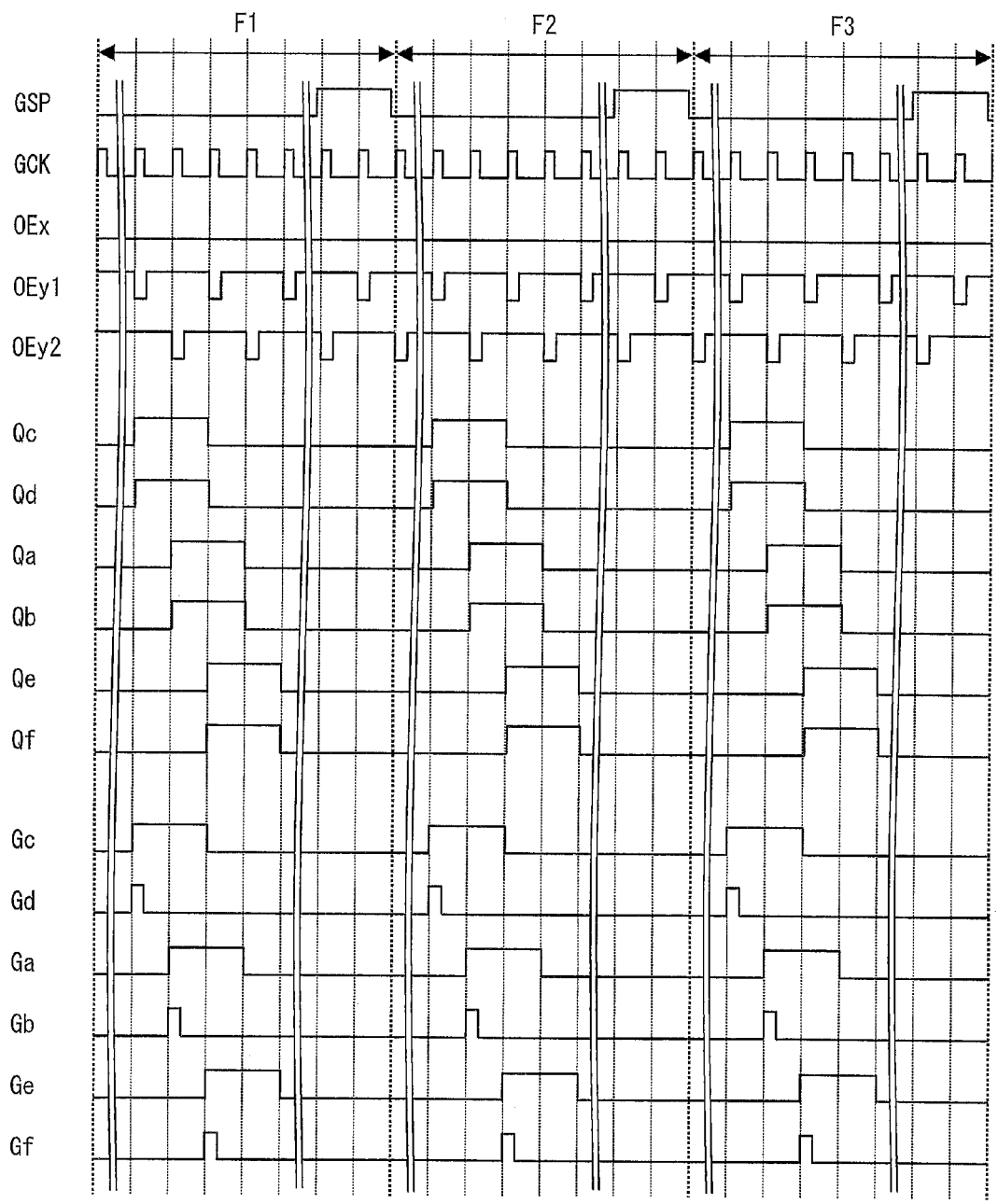
FIG. 21 is a timing chart of a driving method of the gate driver of FIG. 20.

FIG. 21 is a timing chart illustrating an operation of the gate driver illustrated in FIG. 20. As illustrated in FIG. 21, for example, the signal OEx is always "L" in each frame. Note that the signal OEx need not be always "L". For example, in a case where falling of a waveform of the gate on-pulse slows and overlaps a next horizontal scanning period, the signal OEx can be "L" in a latter part of each of the horizontal scanning periods. Each of the signals OEy1 and OEy2 has a cycle of 2 horizontal scanning periods (2H); each of the signals OEy1 and OEy2 becomes "L" in a former part of one of the 2 horizontal scanning periods and becomes "H" (active) in a remaining part of the one of the 2 horizontal scanning periods, whereas each of the signals OEy1 and OEy2 becomes "H" (active) in the other one of the 2 horizontal scanning periods. The signals OEy1 and OEy2 are shifted from each other by 1H. As the output Q of the shift register 45, signals which become "H" for 2 horizontal scanning periods are sequentially outputted from the respective stages. As a result, a drive as illustrated in FIG. 19 is achieved.

(Driving Method 4)

Figure 22:
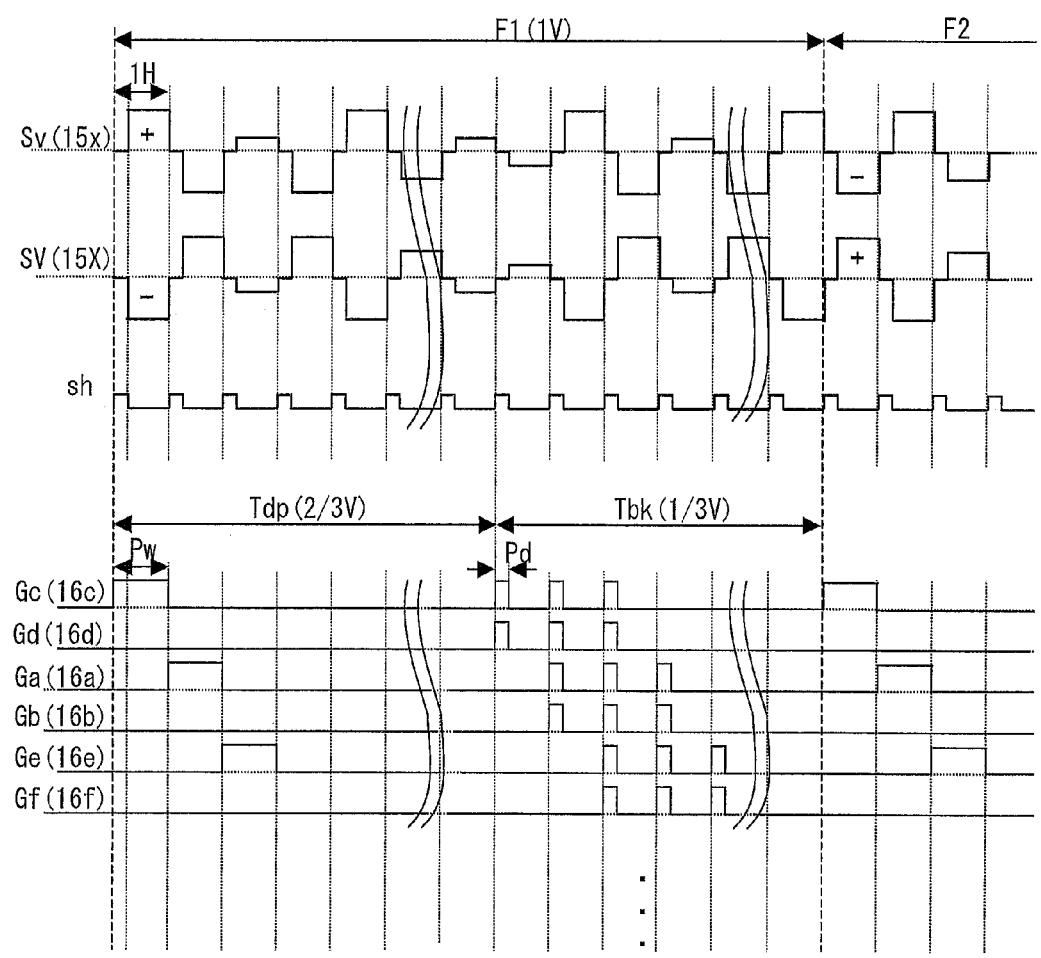
FIG. 22 is a timing chart showing another method for driving a liquid crystal display device including the liquid crystal panel 5a or 5b.

FIG. 22 is a timing chart showing another method for driving the present liquid crystal display device. The reference numerals shown in FIG. 22 are similar to the reference numerals shown in FIG. 10. Also in this driving method, as illustrated in FIG. 10, a polarity of a signal electric potential to be supplied to the data signal line is inverted per one horizontal scanning period (1H), and a polarity of a signal electric potential that is supplied to each of horizontal scanning periods having an identical ordinal number in the respective frames is inverted per 1 frame. Further, signal electric potentials of opposite polarities are supplied to two adjacent data signal lines in the one identical horizontal scanning period, respectively, and charge sharing is carried out at the beginning of each of the horizontal scanning periods.

In the present driving method, after elapse of a predetermined period (e.g., approximately two thirds of 1 vertical scanning period (1V) (i.e., ⅔V)) from writing of a regular signal electric potential to a pixel electrode (pixel electrode 17a, 17c, 17e, 17A, 17C or 17E in FIG. 1), a signal electric potential (Vcom) for discharging (refreshing) an electric charge is supplied to the pixel electrode (17a, 17c, 17e, 17A, 17C or 17E) and to a capacitively coupled electrode (pixel electrode 17b, 17d, 17f, 17B, 17D or 17F) capacitively coupled to the pixel electrode (17a, 17c, 17e, 17A, 17C or 17E). This makes it possible to insert a period of black display for each display line. As a result, it is possible to produce an effect of reducing a trailing afterimage by making display into impulses, in addition to the effect of discharging an electric charge accumulated in the capacitively coupled electrode.

More specifically, in F1, during the ⅔V period, one of two upper and lower scanning signal lines that are associated with a pixel is sequentially selected (for example, scanning signal line 16c→scanning signal line 16a→scanning signal line 16e (see FIG. 1)). To one of two adjacent data signal lines (e.g., data signal line 15x), a signal electric potential of a positive polarity is supplied in a first horizontal scanning period (e.g., including a write-in period of the pixel electrodes 17c and 17d), a signal electric potential of a negative polarity is supplied in a second horizontal scanning period (e.g., including a write-in period of the pixel electrodes 17a and 17b), and a signal electric potential of a positive polarity is supplied in a third horizontal scanning period (e.g., including a write-in period of the pixel electrodes 17e and 17f). To the other one of the two data signal lines (e.g., data signal line 15X), a signal electric potential of a negative polarity is supplied in the first horizontal scanning period (e.g., including a write-in period of the pixel electrodes 17C and 17D), a signal electric potential of a positive polarity is supplied in the second horizontal scanning period (e.g., including a write-in period of the pixel electrodes 17A and 17B), and a signal electric potential of a negative polarity is supplied in the third horizontal scanning period (e.g., including a write-in period of the pixel electrodes 17E and 17F). Note that a charge sharing electric potential (Vcom) is supplied at the beginning of each of the horizontal scanning periods.

During the remaining ⅓ V period, at the beginning of each of the horizontal scanning period, two upper and lower scanning signal lines that are associated with a pixel are sequentially selected (for example, scanning signal lines 16c and 16d→scanning signal lines 16a and 16b→scanning signal lines 16e and 16f (see FIG. 1)) and Vcom is supplied to corresponding data signal lines (e.g., data signal lines 15x and 15X).

As to the pixel 101, for example, in the pixel electrode 17a, while the transistor 12a is being turned ON by a pixel data write-in pulse Pw contained in the gate on-pulse signal Ga, an electric potential of the data signal line 15x connected to a source terminal of the transistor 12a is supplied to the pixel electrode 17a via the transistor 12a. Thus, a data signal Sv as a voltage of the data signal line 15x is written into the pixel electrode 17a. Then, after elapse of an image display period Tdp, a black voltage application pulse Pb is supplied to a gate terminal of each of the transistors 12a and 12b. Thus, while the transistors 12a and 12b are in an ON state, the pixel electrode 17a is connected to the data signal line 15x via the transistor 12a, and the pixel electrode 17b is connected to the data signal line 15x via the transistor 12b. As a result, a state is obtained in which an electric charge accumulated in a pixel capacitor of the pixel electrode 17b is discharged and a black voltage (Vcom) is being applied to the pixel capacitors of the pixel electrodes 17a and 17b.

Accordingly, in the pixel 101, during the image display period Tdp, a display pixel based on a digital image signal is formed by causing the pixel capacitors to preserve a voltage corresponding to the electric potential of the data signal line 15x which is supplied to the pixel electrode 17a via the transistor 12a. Meanwhile, during a period Tbk from when the black voltage application pulse Pb appears in the gate on-pulse signals Ga and Gb respectively given to gate terminals of the transistors 12a and 12b until when a next pixel data write-in pulse Pw appears in the gate on-pulse signal Ga (period obtained by excluding the image display period Tdp from 1 frame (1V) period), a black pixel is formed by causing the pixel capacitors to preserve a black voltage (Vcom).

Since a pulse width of the black voltage application pulse Pb is short, at least two, preferably three or more black voltage application pulses Pb are consecutively applied to the scanning signal line at intervals of 1 horizontal scanning period (1H) in each frame period so that the pixel capacitors surely preserve the black voltage. In FIG. 22, three black voltage application pulses Pb consecutively appear at intervals of 1 horizontal scanning period (1H) in 1 frame period (1V).

According to the present driving method, since a period of black display is inserted for each display line, it is possible to make display into impulses while preventing a driving circuit etc. from becoming complicated and suppressing an increase in operation frequency. As a result, in addition to the effect of discharging an electric charge, it is possible to suppress an trailing afterimage in a moving image, thereby improving performance in moving image display.

Each of the above driving methods employs a charge sharing method. However, the present embodiment is not limited to this. Another arrangement is also possible in which a period in which all transistors are turned ON is provided in 1 frame period and Vcom is supplied to all data signal lines in this ON period, for example.

A specific configuration of a source driver for achieving the charge sharing method in the present driving method is described later along with configurations of "liquid crystal display unit and liquid crystal display device".

(Specific Example 1-4 of Liquid Crystal Panel)

Figure 23:
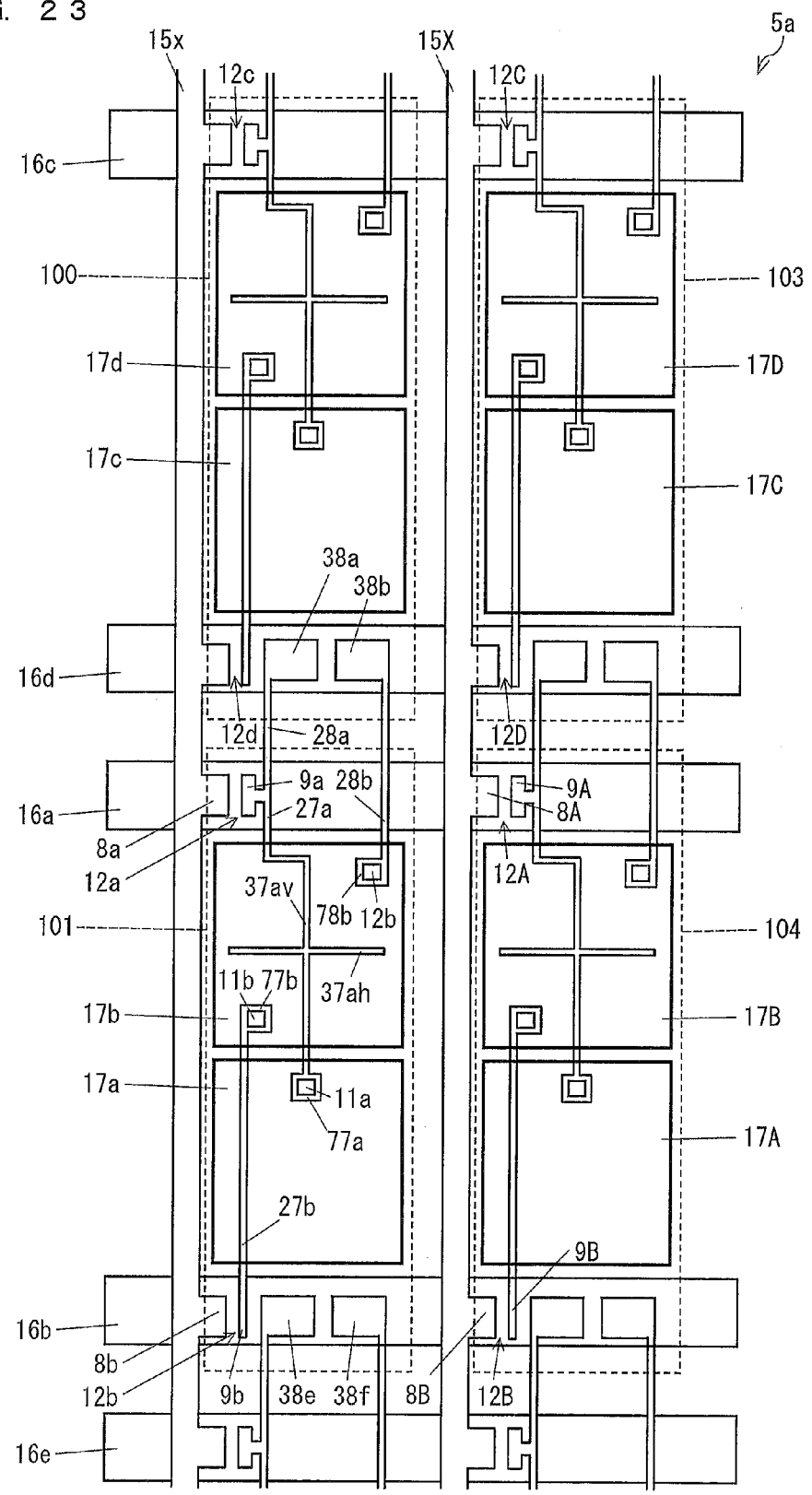

In each of the above liquid crystal panels, one of two pixel electrodes in a pixel which one is close to a transistor is connected to the transistor. However, the present embodiment is not limited to this. It is also possible that one of two pixel electrodes in a pixel which one is farther away from a transistor is connected to the transistor as shown in FIG. 23. In a liquid crystal panel 5a of FIG. 23, a data signal line 15x is provided along a pixel 100 and a pixel 101, and a data signal line 15X is provided along a pixel 103 and a pixel 104, as in the liquid crystal panel of FIG. 2.

A scanning signal line 16c is disposed so as to overlap one of two edge sections of the pixel 100, which two edge sections run along the row direction, and a scanning signal line 16d is disposed so as to overlap the other one of these two edge sections of the pixel 100. From a plan view, pixel electrodes 17d and 17c are aligned in a column direction, between the scanning signal lines 16c and 16d. The scanning signal line 16c also overlaps one of two edge sections of the pixel 103, which two edge sections run along the row direction, and the scanning signal line 16d overlaps the other one of these two edge sections of the pixel 103. From a plan view, the pixel electrodes 17D and 17C are aligned in the column direction, between the scanning signal lines 16c and 16d.

A scanning signal line 16a is disposed so as to overlap one of two edge sections of the pixel 101, which two edge sections run along the row direction, and a scanning signal line 16b is disposed so as to overlap the other one of these two edge sections of the pixel 101. From a plan view, pixel electrodes 17b and 17a are aligned in the column direction, between the scanning signal lines 16a and 16b. The scanning signal line 16a also overlaps one of two edge sections of the pixel 104, which two edge sections run along the row direction, and the scanning signal line 16b overlaps the other one of these two edge sections of the pixel 104. From a plan view, pixel electrodes 17B and 17A are aligned in the column direction, between the scanning signal lines 16a and 16b.

In the pixel 101, a source electrode 8a of a transistor 12a and a drain electrode 9a of the transistor 12a are provided on the scanning signal line 16a, and a source electrode 8b of a transistor 12b and a drain electrode 9b of the transistor 12b are provided on the scanning signal line 16b. The source electrode 8a is connected to the data signal line 15x. The drain electrode 9a is connected to a drain draw-out wire 27a. The drain draw-out wire 27a is connected to capacitively coupled electrodes 37av and 37ah and a contact electrode 77a. The contact electrode 77a is connected to the pixel electrode 17a via a contact hole 11a. The coupling capacitor electrodes 37av and 37ah overlap the pixel electrode 17b via an interlayer insulating film. As a result, a coupling capacitor C101 (see FIG. 1) between the pixel electrodes 17a and 17b is formed. Note that the coupling capacitor electrodes 37av and 37ah are disposed so as to overlap a cross-shaped dark line appearing at a boundary between liquid crystal domains separated from each other, as in the liquid crystal panel 5a of FIG. 8. Moreover, the drain electrode 9a is connected to a drain draw-out wire 28a. The drain draw-out wire 28a is connected to a storage capacitor electrode 38a that is formed in an identical layer to a coupling capacitor electrode 37a. The storage capacitor electrode 38a overlaps the scanning signal line 16d via a gate insulating film. As a result, storage capacitance Cha (see FIG. 1) is formed.

The source electrode 8b of the transistor 12b is connected to the data signal line 15x. The drain electrode 9b is connected to a drain draw-out wire 27b. The drain draw-out wire 27b is connected to a contact electrode 77b. The contact electrode 77b is connected to the pixel electrode 17b via a contact hole 11b. A storage capacitor electrode 38b that is formed in an identical layer to the storage capacitor electrode 38a overlaps the scanning signal line 16d via the gate insulating film and is connected to a draw-out wire 28b. The draw-out wire 28b is connected to a contact electrode 78b. The contact electrode 78b is connected to the pixel electrode 17b via a contact hole 12b. As a result, storage capacitance Chb (see FIG. 1) is formed. Note that the other pixels each have a configuration (shape and arrangement of members and their connection relationship) identical to that of the pixel 101.

According to the arrangement, a sub-pixel including the pixel electrode 17a becomes "bright", and a sub-pixel including the pixel electrode 17b becomes "dark".

Figure 24:
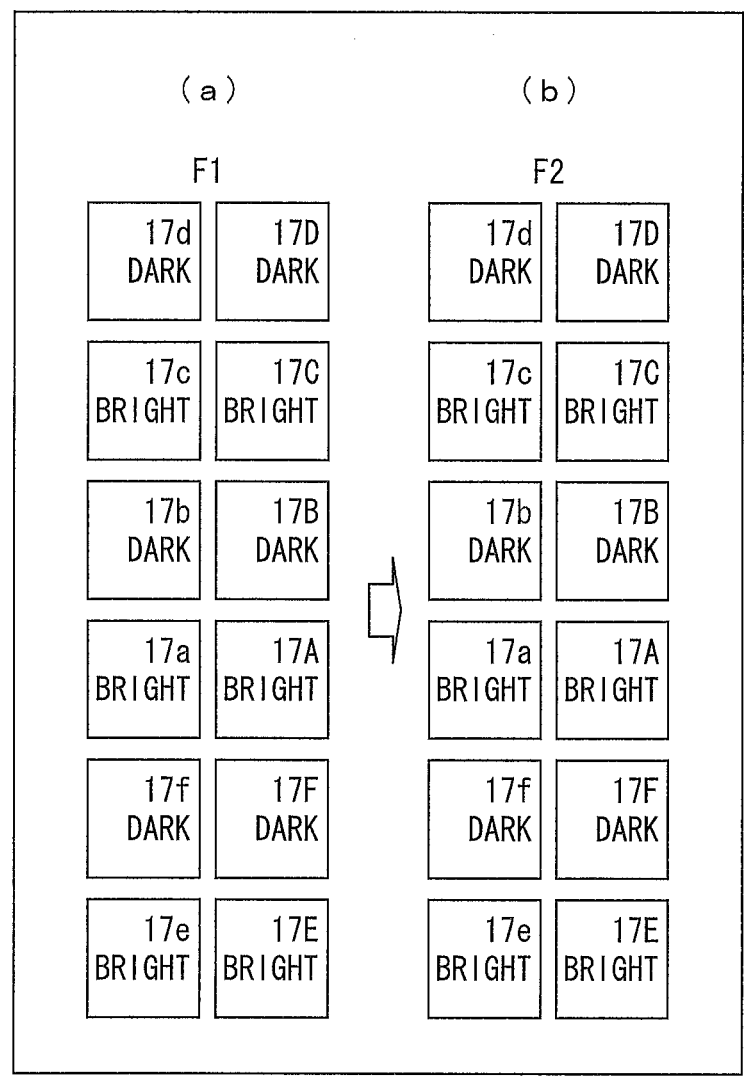
FIG. 24 is a diagram schematically showing a display state of each frame in a case where the driving method of FIG. 10 is used in the liquid crystal panel 5a of FIG. 23.

In a liquid crystal display device including the liquid crystal panel of FIG. 23, in a case where the data signal lines 15x and 15X are driven for example as shown in FIG. 10, the sub-pixels become as illustrated in (a) of FIG. 24 in the frame F1 as a whole, and become as illustrated in (b) of FIG. 24 in the frame F2 as a whole. In the subsequent frames F3 and F4, the operations in F1 and F2 are repeated.

(Specific Example 1-5 of Liquid Crystal Panel)

Figure 25:
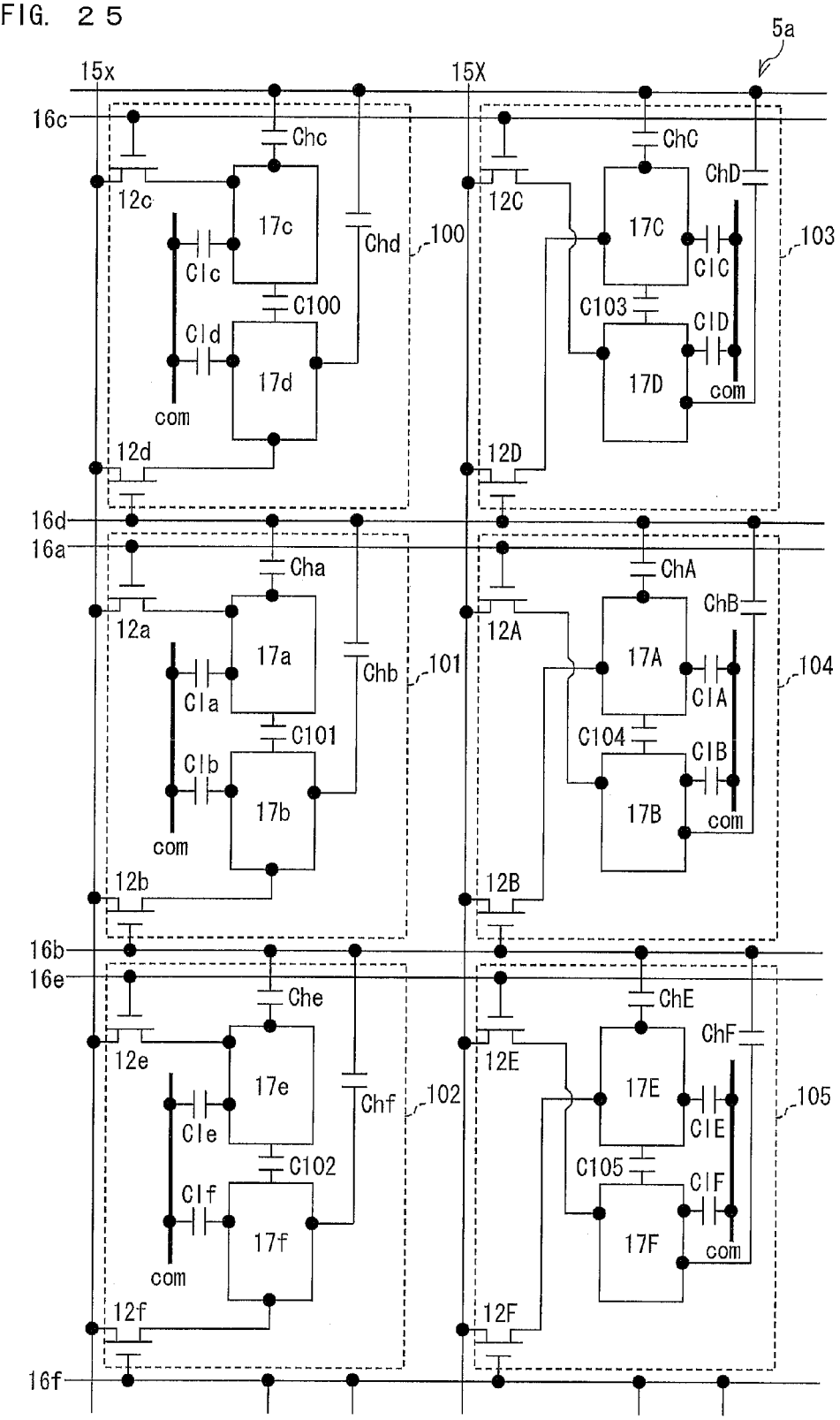
Figure 26:
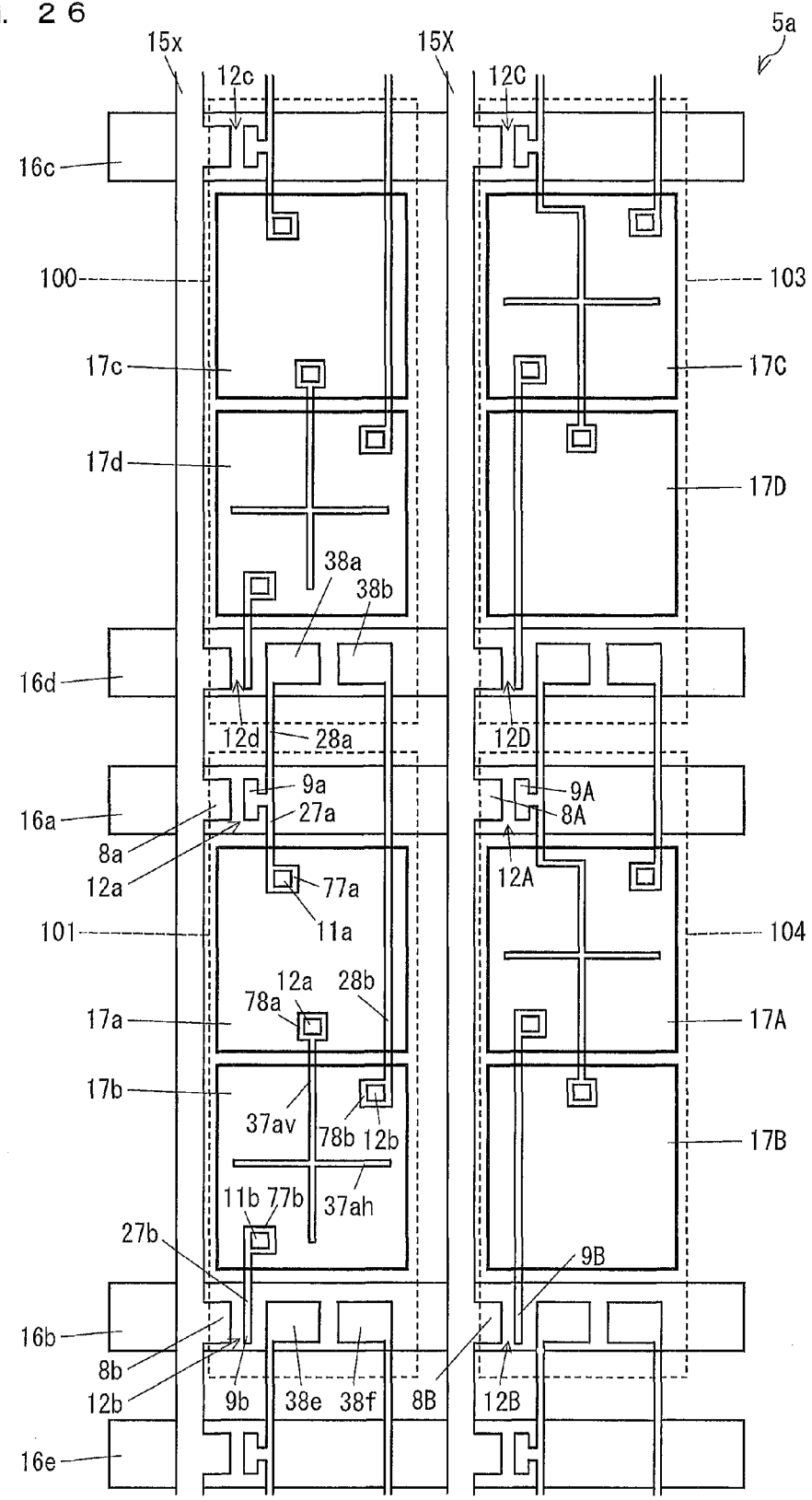

The liquid crystal panel of FIG. 1 may be configured as shown in FIG. 25. In a liquid crystal panel 5a of FIG. 25, in one of two adjacent pixels in a row direction, a pixel electrode that is close to a transistor is connected to the transistor, and in the other one of the two adjacent pixels, a pixel electrode that is farther away from a transistor is connected to the transistor. FIG. 26 illustrates a specific example of the liquid crystal panel 5a of FIG. 25.

Figure 27:
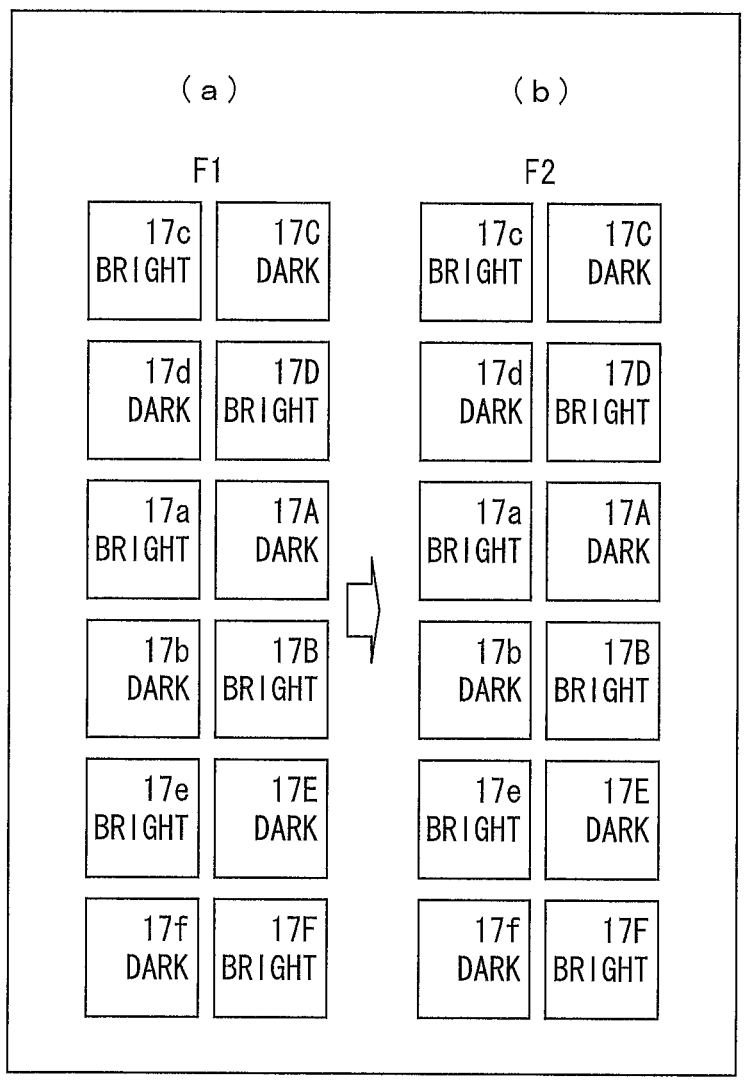
FIG. 27 is a diagram schematically showing a display state of each frame in a case where the driving method of FIG. 10 is used in the liquid crystal panel 5a of FIG. 26.

In a liquid crystal display device including the liquid crystal panel 5a of FIG. 26, in a case where the data signal lines 15x and 15X are driven as shown in FIG. 10, the sub-pixels become as illustrated in (a) of FIG. 27 in the frame F1 as a whole, and become as illustrated in (b) of FIG. 27 in the frame F2 as a whole. In the subsequent frames F3 and F4, the operations in F1 and F2 are repeated.

According to the liquid crystal panel of FIG. 26, bright sub-pixels are not adjacent in the row direction and dark sub-pixels are not adjacent in the row direction. This allows a reduction in stripe unevenness in the row direction.

(Specific Example 1-6 of Liquid Crystal Panel)

Figure 28:
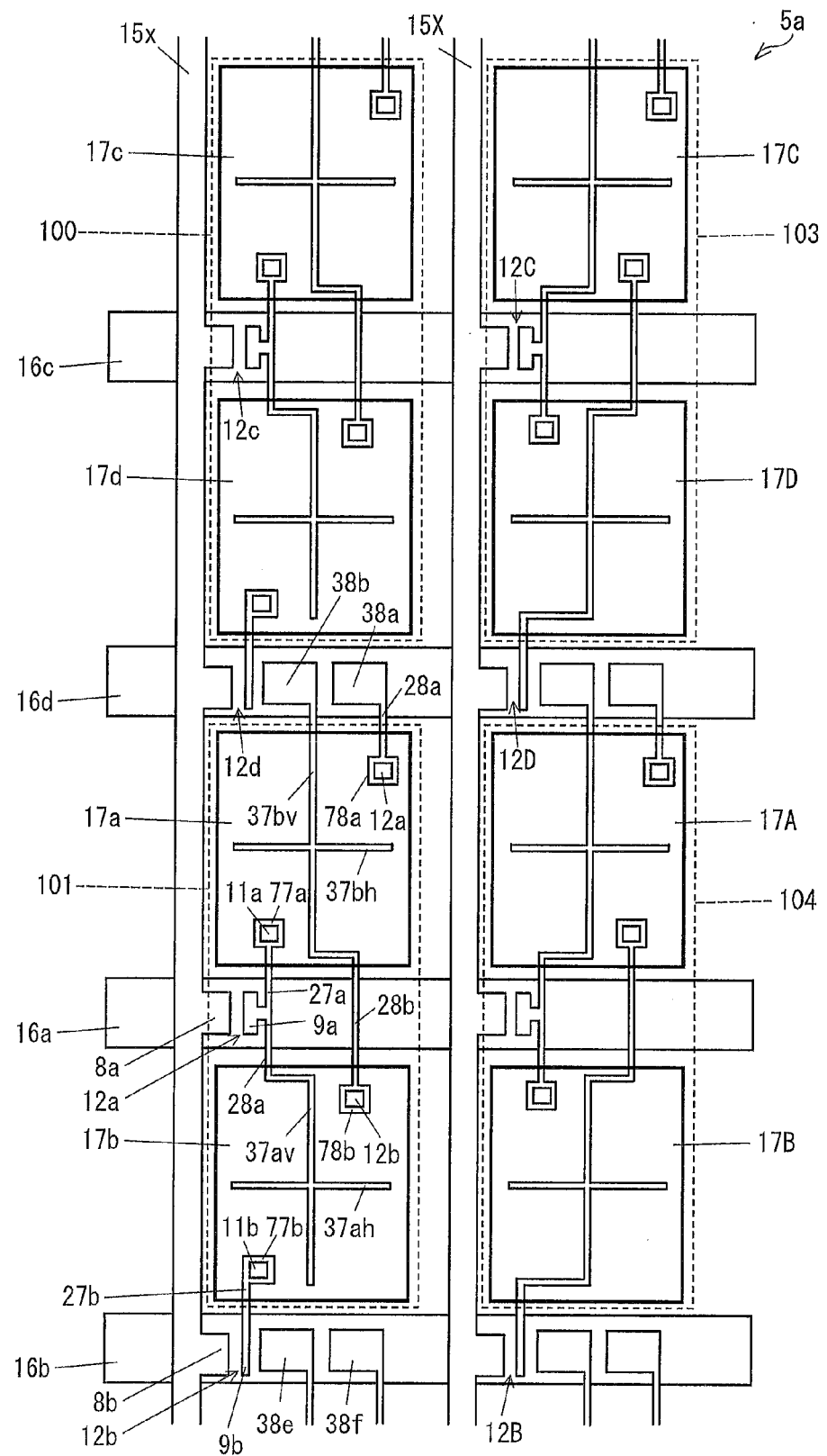

The liquid crystal panel of FIG. 26 may be configured as shown in FIG. 28. In a liquid crystal panel of FIG. 28, in one of two adjacent pixels in a row direction, a pixel electrode that is close to a transistor is connected to the transistor, and in the other one of the two adjacent pixels, a pixel electrode that is farther away from a transistor is connected to the transistor, as in the liquid crystal panel of FIG. 26. Moreover, in the liquid crystal panel of FIG. 28, a scanning signal line 16c traverses centers of the pixels 100 and 103 which are centers in the column direction, and a scanning signal line 16a traverses centers of the pixels 101 and 104 which are centers in the column direction. In the pixel 100, pixel electrodes 17c and 17d are aligned in the column direction so as to sandwich the scanning signal line 16c. In the pixel 101, pixel electrodes 17a and 17b are aligned in the column direction so as to sandwich the scanning signal line 16a. In the pixel 103, pixel electrodes 17C and 17D are aligned in the column direction so as to sandwich the scanning signal line 16c. In the pixel 104, pixel electrodes 17A and 17B are aligned in the column direction so as to sandwich the scanning signal line 16a.

In the pixel 101, a source electrode 8a of a transistor 12a and a drain electrode 9a of the transistor 12a are provided on the scanning signal line 16a, and a source electrode 8b of the transistor 12b and a drain electrode 9b of the transistor 12b are provided on the scanning signal line 16b. The source electrode 8a is connected to the data signal line 15x. The drain electrode 9a is connected to a drain draw-out wire 27a. The drain draw-out wire 27a is connected to a contact electrode 77a. The contact electrode 77a is connected to the pixel electrode 17a via a contact hole 11a. Moreover, the drain electrode 9a is connected to a drain draw-out wire 28a. The drain draw-out wire 28a is connected to coupling capacitor electrodes 37av and 37ah. The coupling capacitor electrodes 37av and 37ah overlap the pixel electrode 17b via an interlayer insulating film. As a result, a coupling capacitor C101 (see FIG. 25) between the pixel electrodes 17a and 17b is formed. Moreover, a storage capacitor electrode 38a overlaps the scanning signal line 16d via a gate insulating film, and is connected to a draw-out wire 28a. The draw-out wire 28a is connected to a contact electrode 78a. The contact electrode 78a is connected to the pixel electrode 17a via a contact hole 12a. As a result, storage capacitance Cha (see FIG. 25) is formed.

The source electrode 8b of the transistor 12b is connected to the data signal line 15x. The drain electrode 9b is connected to a drain draw-out wire 27b. The drain draw-out wire 27b is connected to a contact electrode 77b. The contact electrode 77b is connected to the pixel electrode 17b via a contact hole 11b. A storage capacitor electrode 38b that is formed in an identical layer to the storage capacitor electrode 38a overlaps the scanning signal line 16d via the gate insulating film and is connected to coupling capacitor electrodes 37bv and 37bh. The coupling capacitor electrodes 37bv and 37bh are connected to a draw-out wire 28b. The draw-out wire 28b is connected to a contact electrode 78b. The contact electrode 78b is connected to the pixel electrode 17b via a contact hole 12b. As a result, a coupling capacitor C101 (see FIG. 25) and storage capacitance Chb (see FIG. 25) are formed. Note that the coupling capacitor electrodes 37av and 37ah and the coupling capacitor electrodes 37bv and 37bh are disposed so as to overlap a cross-shaped dark line appearing at a boundary between liquid crystal domains separated from each other, as in the liquid crystal panel 5a of FIG. 8.

According to the liquid crystal panel 5a of FIG. 28, bright sub-pixels are not adjacent in the row direction and dark sub-pixels are not adjacent in the row direction, as in the liquid crystal panel 5a of FIG. 26. This allows a reduction in stripe unevenness in the row direction.

Figure 29:
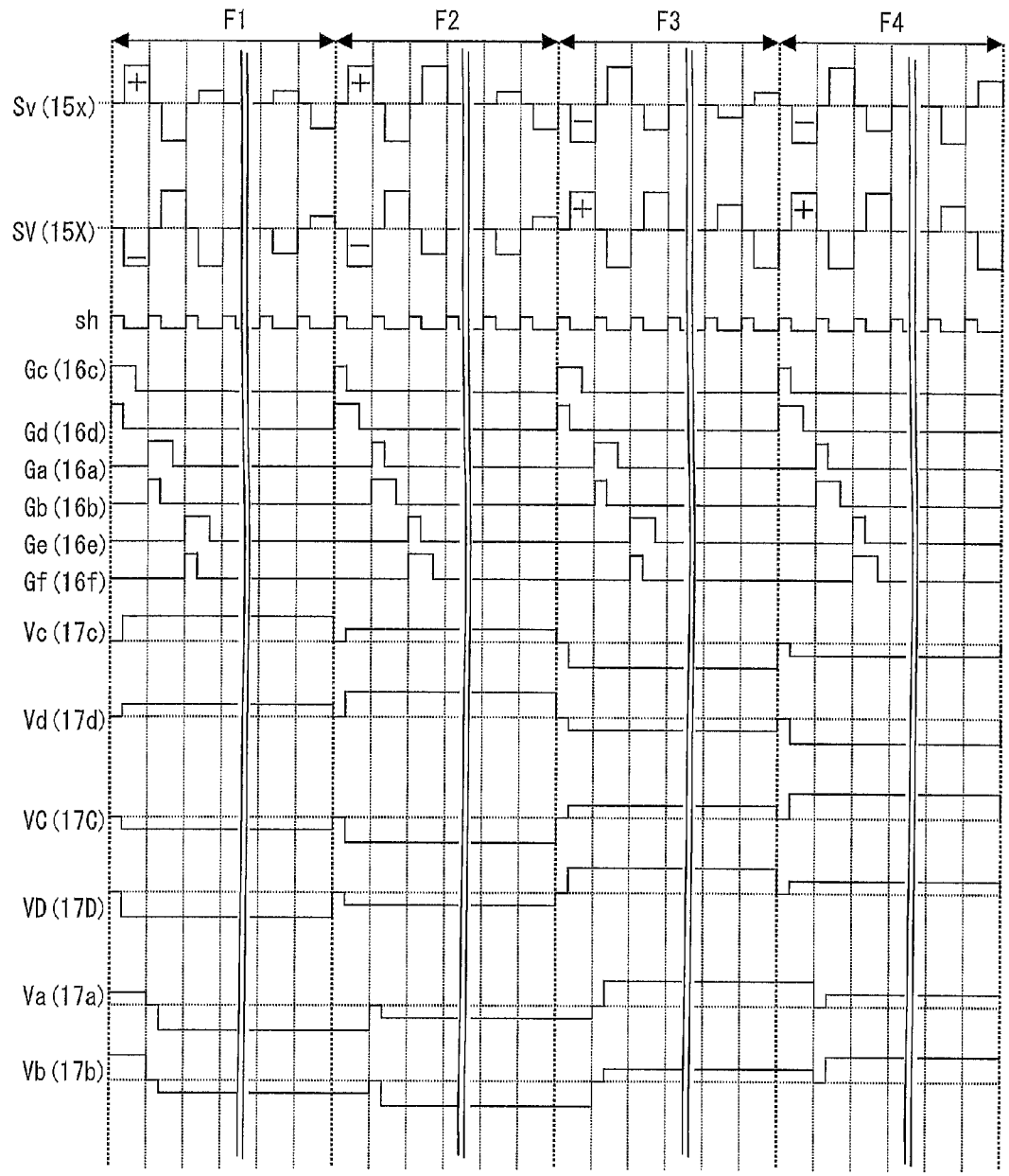
FIG. 29 is a timing chart showing another method for driving a liquid crystal display device including the liquid crystal panel 5a or 5b.
Figure 30:
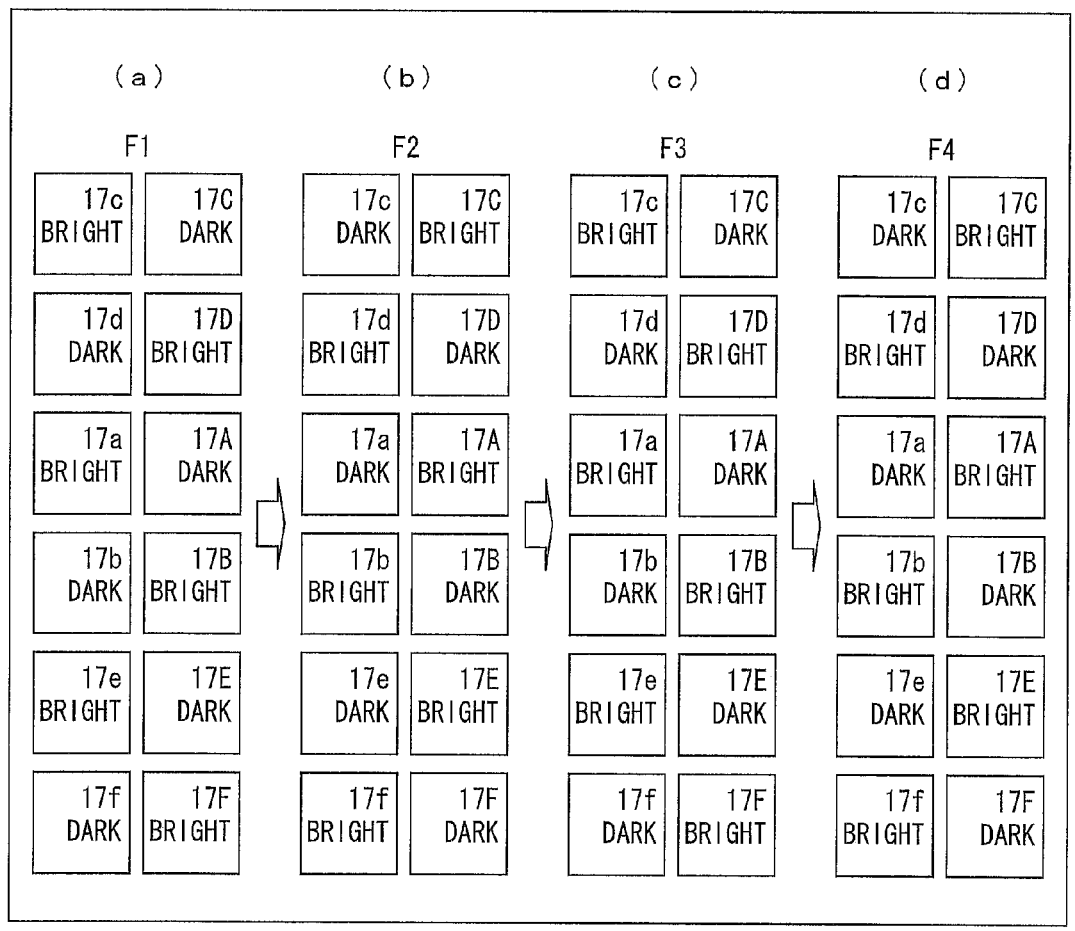
FIG. 30 is a diagram schematically showing a display state of each frame in a case where the driving method of FIG. 29 is used in the liquid crystal panel 5a of FIG. 26 or 28.

In a liquid crystal display device including the liquid crystal panel of FIG. 16 or the liquid crystal panel of FIG. 28, a driving method of FIG. 29 may be adopted. FIG. 29 is a timing chart showing a driving method of the present liquid crystal display device (liquid crystal display device of a normally black mode) that includes the liquid crystal panel illustrated in FIG. 26. SV and sv are signal electric potentials supplied to two adjacent data signal lines (for example, 15x and 15X), respectively; Ga to Gf are gate on-pulse signals to be supplied to the scanning signal lines 16a to 16f; Vc, Vd, Va, Vb, VC, and VD are electric potentials of respective pixel electrodes 17c, 17d, 17a, 17b, 17C, and 17D; and sh is a charge sharing signal. During a period in which the charge sharing signal is active ("H"), charge sharing occurs caused by having all of the data signal lines be short-circuited to each other, or by having an identical electric potential be supplied to all of the data signal lines from outside.

As shown in FIG. 29, in a frame F1, in one horizontal scanning period, while Vcom is being supplied to two pixel electrodes (e.g., first and second pixel electrodes) provided in a pixel, a transistor connected to the second pixel electrode is turned OFF, and then a signal electric potential is written into the first pixel electrode. In a frame F2, in one horizontal scanning period, while Vcom is being supplied to the first and second pixel electrodes, a transistor connected to the first pixel electrode is turned OFF, and then a signal electric potential is written into the second pixel electrode. For example, in the frame F1, the scanning signal line 16b is turned ON/OFF in a charge sharing period at the beginning of a horizontal scanning period of the scanning signal line 16a, and in the frame F2, the scanning signal line 16a is turned ON/OFF in a charge sharing period at the beginning of the horizontal scanning period of the scanning signal line 16a. In the subsequent frames F3 and F4, the operations in F1 and F2 are repeated. In the present driving method, a polarity of a signal electric potential to be supplied to the data signal line is inverted per one horizontal scanning period (1H), and a polarity of a signal electric potential that is supplied to each of horizontal scanning periods having an identical ordinal number in the respective frames is inverted by units of two frames. Further, signal electric potentials of opposite polarities are supplied to two adjacent data signal lines in the one identical horizontal scanning period, respectively, and charge sharing is carried out at the beginning of each of the horizontal scanning periods.

More specifically, in a case of consecutive frames F1 to F4, in F1, first, two upper and lower scanning signal lines (see FIG. 25) that are associated with a pixel are selected, and while Vcom is being supplied to two adjacent data signal lines, a transistor (e.g., transistor 12d, 12D, 12b or 12B) connected to one pixel electrode (e.g., pixel electrode 17d, 17C, 17b or 17A) is turned OFF, and then a signal electric potential is written into the other pixel electrode (e.g., pixel electrode 17c, 17D, 17a or 17B). To one of the two adjacent data signal lines (e.g., data signal line 15x), a signal electric potential of a positive polarity is supplied in a first horizontal scanning period (e.g., including a write-in period of the pixel electrode 17c), a signal electric potential of a negative polarity is supplied in a second horizontal scanning period (e.g., including a write-in period of the pixel electrode 17a), and a signal electric potential of a positive polarity is supplied in a third horizontal scanning period (e.g., including a write-in period of the pixel electrode 17e). To the other one of the two data signal lines (e.g., data signal line 15X), a signal electric potential of a negative polarity is supplied in the first horizontal scanning period (e.g., including a write-in period of pixel electrode 17D), a signal electric potential of a positive polarity is supplied in the second horizontal scanning period (e.g., including a write-in period of the pixel electrode 17B), and a signal electric potential of a negative polarity is supplied in the third horizontal scanning period (e.g., including a write-in period of the pixel electrode 17F). As a result, a sub-pixel including the pixel electrode 17c (positive polarity) becomes "bright", a sub-pixel including the pixel electrode 17d (positive polarity) becomes "dark", a sub-pixel including the pixel electrode 17C (negative polarity) becomes "dark", a sub-pixel including the pixel electrode 17D (negative polarity) becomes "bright", a sub-pixel including the pixel electrode 17a (negative polarity) becomes "bright", and a sub-pixel including the pixel electrode 17b (negative polarity) becomes "dark". As a whole, the sub-pixels become as illustrated in (a) of FIG. 30.

In F2, first, two upper and lower scanning signal lines that are associated with a pixel are selected, and while Vcom is being supplied to two adjacent data signal lines, a transistor (transistor 12c, 12C, 12a or 12A) connected to one pixel electrode (pixel electrode 17c, 17D, 17a or 17B) is turned OFF, and then a signal electric potential is written into the other pixel electrode (pixel electrode 17d, 17C, 17b or 17A). To one of the two adjacent data signal lines (data signal line 15x), a signal electric potential of a positive polarity is supplied in a first horizontal scanning period (e.g., including a write-in period of the pixel electrode 17d), a signal electric potential of a negative polarity is supplied in a second horizontal scanning period (e.g., including a write-in period of the pixel electrode 17b), and a signal electric potential of a positive polarity is supplied in a third horizontal scanning period (e.g., including a write-in period of the pixel electrode 17f). To the other one of the two data signal lines (e.g., data signal line 15X), a signal electric potential of a negative polarity is supplied in the first horizontal scanning period (e.g., including a write-in period of pixel electrode 17C), a signal electric potential of a positive polarity is supplied in the second horizontal scanning period (e.g., including a write-in period of the pixel electrode 17A), and a signal electric potential of a negative polarity is supplied in the third horizontal scanning period (e.g., including a write-in period of the pixel electrode 17E). As a result, a sub-pixel including the pixel electrode 17c (positive polarity) becomes "dark", a sub-pixel including the pixel electrode 17d (positive polarity) becomes "bright", a sub-pixel including the pixel electrode 17C (negative polarity) becomes "bright", a sub-pixel including the pixel electrode 17D (negative polarity) becomes "dark", a sub-pixel including the pixel electrode 17a (negative polarity) becomes "dark", and a sub-pixel including the pixel electrode 17b (negative polarity) becomes "bright". As a whole, the sub-pixels become as illustrated in (b) of FIG. 30.

In F3, first, two upper and lower scanning signal lines that are associated with a pixel are selected, and while Vcom is being supplied to two adjacent data signal lines, a transistor (e.g., transistor 12d, 12D, 12b or 12B) connected to one pixel electrode (e.g., pixel electrode 17d, 17C, 17b or 17A) is turned OFF, and then a signal electric potential is written into the other pixel electrode (e.g., pixel electrode 17c, 17D, 17a or 17B). To one of the two adjacent data signal lines (e.g., data signal line 15x), a signal electric potential of a negative polarity is supplied in a first horizontal scanning period (e.g., including a write-in period of the pixel electrode 17c), a signal electric potential of a positive polarity is supplied in a second horizontal scanning period (e.g., including a write-in period of the pixel electrode 17a), and a signal electric potential of a negative polarity is supplied in a third horizontal scanning period (e.g., including a write-in period of the pixel electrode 17e). To the other one of the two data signal lines (e.g., data signal line 15X), a signal electric potential of a positive polarity is supplied in the first horizontal scanning period (e.g., including a write-in period of pixel electrode 17D), a signal electric potential of a negative polarity is supplied in the second horizontal scanning period (e.g., including a write-in period of the pixel electrode 17B), and a signal electric potential of a positive polarity is supplied in the third horizontal scanning period (e.g., including a write-in period of the pixel electrode 17F). As a result, a sub-pixel including the pixel electrode 17c (negative polarity) becomes "bright", a sub-pixel including the pixel electrode 17d (negative polarity) becomes "dark", a sub-pixel including the pixel electrode 17C (positive polarity) becomes "dark", a sub-pixel including the pixel electrode 17D (positive polarity) becomes "bright", a sub-pixel including the pixel electrode 17a (positive polarity) becomes "bright", and a sub-pixel including the pixel electrode 17b (positive polarity) becomes "dark". As a whole, the sub-pixels become as illustrated in (c) of FIG. 30.

In F4, first, two upper and lower scanning signal lines that are associated with a pixel are selected, and while Vcom is being supplied to two adjacent data signal lines, a transistor (transistor 12c, 12C, 12a or 12A) connected to one pixel electrode (pixel electrode 17c, 17D, 17a or 17B) is turned OFF, and then a signal electric potential is written into the other pixel electrode (pixel electrode 17d, 17C, 17b or 17A). To one of the two adjacent data signal lines (e.g., data signal line 15x), a signal electric potential of a negative polarity is supplied in a first horizontal scanning period (e.g., including a write-in period of the pixel electrode 17d), a signal electric potential of a positive polarity is supplied in a second horizontal scanning period (e.g., including a write-in period of the pixel electrode 17b), and a signal electric potential of a negative polarity is supplied in a third horizontal scanning period (e.g., including a write-in period of the pixel electrode 17f). To the other one of the two data signal lines (e.g., data signal line 15X), a signal electric potential of a positive polarity is supplied in the first horizontal scanning period (e.g., including a write-in period of pixel electrode 17C), a signal electric potential of a negative polarity is supplied in the second horizontal scanning period (e.g., including a write-in period of the pixel electrode 17A), and a signal electric potential of a positive polarity is supplied in the third horizontal scanning period (e.g., including a write-in period of the pixel electrode 17E). As a result, a sub-pixel including the pixel electrode 17c (negative polarity) becomes "dark", a sub-pixel including the pixel electrode 17d (negative polarity) becomes "bright", a sub-pixel including the pixel electrode 17C (positive polarity) becomes "bright", a sub-pixel including the pixel electrode 17D (positive polarity) becomes "dark", a sub-pixel including the pixel electrode 17a (positive polarity) becomes "dark", and a sub-pixel including the pixel electrode 17b (positive polarity) becomes "bright". As a whole, the sub-pixels become as illustrated in (d) of FIG. 30.

According to this driving method, in a charge sharing period, the transistor 12b connected to the pixel electrode 17b can be turned OFF while a common electrode electric potential is being supplied to the pixel electrodes 17a and 17b, and the pixel electrode 17b can be discharged at this moment. That is, in 1 horizontal scanning period, first, the pixel electrode 17b can be discharged, and then a signal electric potential can be written into the pixel electrode 17a. This allows an electric potential of the pixel electrode 17b (i.e., luminance of a dark sub-pixel) to be, after the scanning signal line 16a is turned OFF, a desired value which is not affected by a signal electric potential written into the pixel electrode 17b 1 frame before. Further, according to the present driving method, bright sub-pixels and dark sub-pixels are disposed to form a checkered pattern in each frame, and the bright sub-pixels and dark sub-pixels are alternated at units of one frame. Hence, it is possible to improve display quality.

According to the driving method, one of two scanning signal lines which is selected when a signal electric potential is written is altered per one frame (e.g., the scanning signal line 16a in the frames F1 and F3, and the scanning signal line 16b in the frames F2 and F4), and a polarity of a signal electric potential corresponding to the same pixel is inverted per two frames (e.g., positive polarity in the frames F1 and F2, and negative polarity in the frames F3 and F4). However, present driving method is not limited to this. It is also possible that one of two scanning signal lines which is selected when a signal electric potential is written is altered per two frames (e.g., the scanning signal line 16a is selected in the frames F1 and F2, and the scanning signal line 16b is selected in the frames F3 and F4), and a polarity of a signal electric potential corresponding to the same pixel is inverted per one frame (e.g., positive polarity in the frames F1 and F3, and negative polarity in the frames F2 and F4).

In the liquid crystal panels 5a of FIGS. 26 and 28, it is preferable that an area where the storage capacitor electrode 38a overlaps the scanning signal line 16d is equal in size to an area where the storage capacitor electrode 38b overlaps the scanning signal line 16d. In a case where the driving method of FIG. 29 is employed in this arrangement, fluctuation in storage capacitance formed in each pixel electrode can be suppressed in each frame. For example, storage capacitance in the pixel electrode 17a which becomes a bright sub-pixel in the frame F1 can be caused to match (made equal to) storage capacitance in the pixel electrode 17b which becomes a bright sub-pixel in the frame F2, and storage capacitance in the pixel electrode 17b which becomes a dark sub-pixel in the frame F1 can be caused to match (made equal to) storage capacitance in the pixel electrode 17a which becomes a dark sub-pixel in the frame F2. Consequently, electric potentials of the pixel electrodes 17a and 17b can be normally controlled.

[Embodiment 2]

Figure 31:
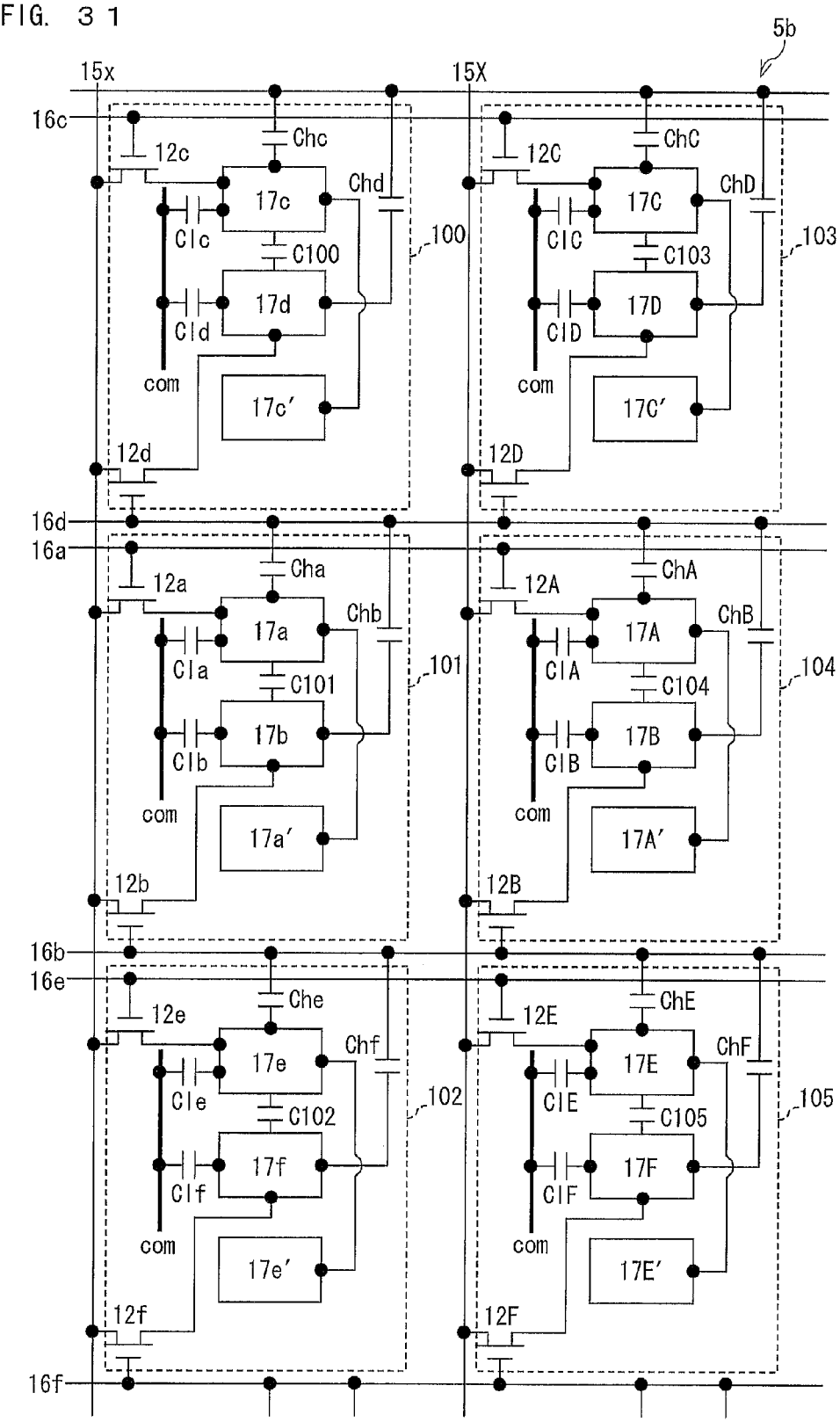
FIG. 31 is a circuit diagram illustrating a configuration of a liquid crystal panel 5b.

FIG. 31 is an equivalent circuit diagram illustrating part of the present liquid crystal panel of the present Embodiment 2. As shown in FIG. 31, a liquid crystal panel 5b includes data signal lines (15x and 15X) that extend in a column direction (top-to-bottom direction of FIG. 31), scanning signal lines (16a to 16f) that extend in a row direction (left-to-right direction of FIG. 31), pixels (100 to 105) that are aligned in the row and column directions, and a common electrode (counter electrode) com. The pixels have an identical configuration. A pixel array including the pixels 100 through 102 and a pixel array including the pixels 103 through 105 are adjacent each other.

In the liquid crystal panel 5b, one pixel is associated with one data signal line and two scanning signal lines. Three pixel electrodes 17c, 17d, and 17C' disposed in the pixel 100, three pixel electrodes 17a, 17b, and 17a' disposed in the pixel 101, and three pixel electrodes 17e, 17f, and 17e' disposed in the pixel 102 are arranged in one line; and three pixel electrodes 17C, 17D, and 17C' disposed in the pixel 103, three pixel electrodes 17A, 17B, and 17A' disposed in the pixel 104, and three pixel electrodes 17E, 17F, and 17E' disposed in the pixel 105 are arranged in one line. The pixel electrodes 17c and 17C are disposed adjacent to each other in the row direction, the pixel electrodes 17d and 17D are disposed adjacent to each other in the row direction, the pixel electrodes 17c' and 17C' are disposed adjacent to each other in the row direction, the pixel electrodes 17a and 17A are disposed adjacent to each other in the row direction, the pixel electrodes 17b and 17B are disposed adjacent to each other in the row direction, the pixel electrodes 17a' and 17A' are disposed adjacent to each other in the row direction, the pixel electrodes 17e and 17E are disposed adjacent to each other in the row direction, the pixel electrodes 17f and 17F are disposed adjacent to each other in the row direction, and the pixel electrodes 17e' and 17E' are disposed adjacent to each other in the row direction.

Since the pixels have an identical configuration, the following description mainly takes the pixel 101 as an example.

In the pixel 101, the pixel electrodes 17a and 17b are connected to each other via a coupling capacitor C101. The pixel electrode 17a is connected to the data signal line 15x via a transistor 12a that is connected to the scanning signal line 16a, and the pixel electrode 17b is connected to the data signal line 15x via a transistor 12b that is connected to the scanning signal line 16b. Storage capacitance Cha is provided between the pixel electrode 17a and the scanning signal line 16d, and storage capacitance Chb is provided between the pixel electrode 17b and the scanning signal line 16d. Liquid crystal capacitance Cla is provided between the pixel electrode 17a and the common electrode com, and liquid crystal capacitance Clb is provided between the pixel electrode 17b and the common electrode com. The pixel electrode 17a' is electrically connected to the pixel electrode 17a.

(Specific Example 2-1 of Liquid Crystal Panel)

Figure 32:
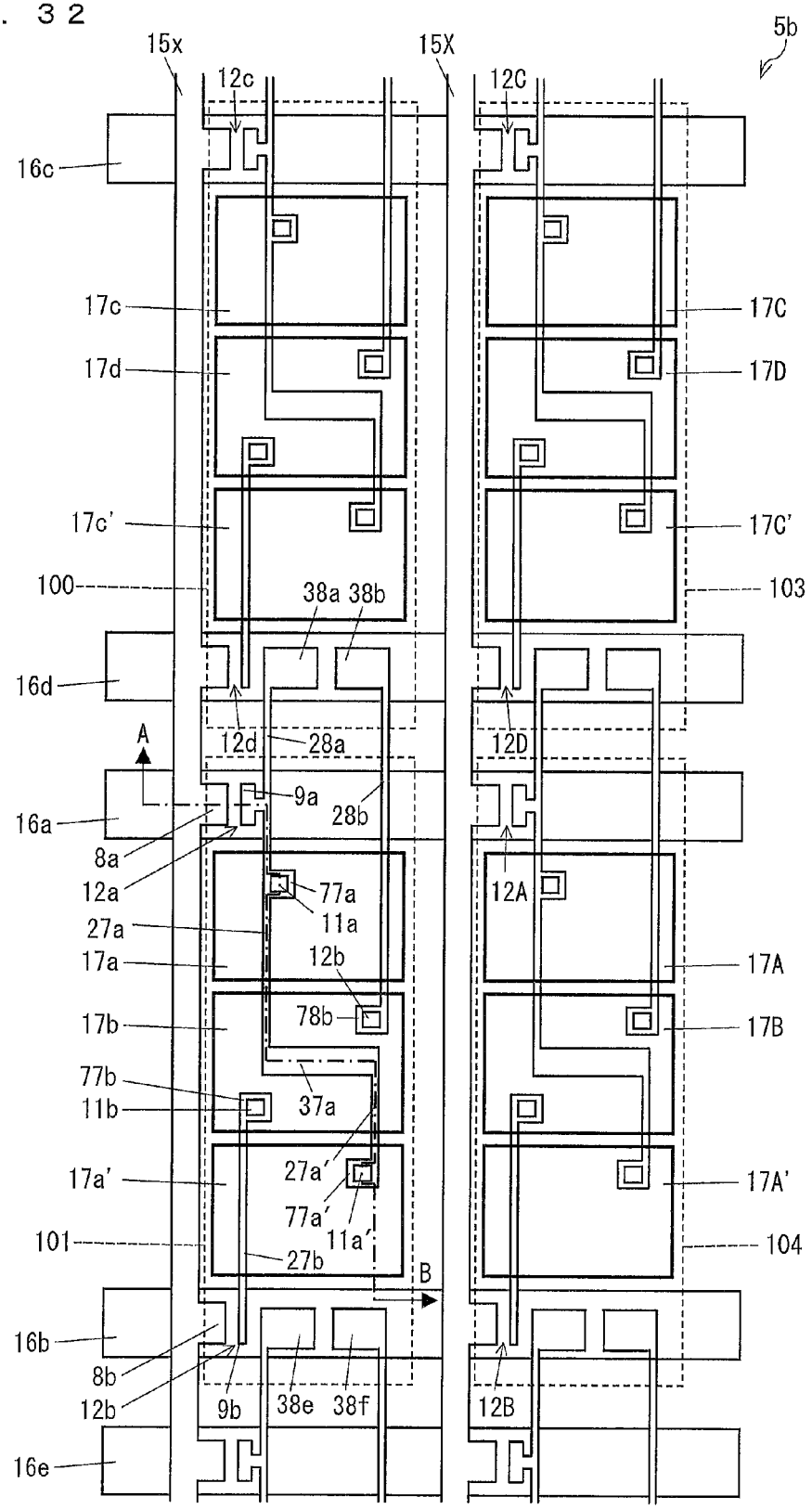
FIG. 32 is a plan view illustrating a configuration (specific example 2-1) of the liquid crystal panel 5b.

FIG. 32 illustrates a specific example 2-1 of the liquid crystal panel 5b. In the liquid crystal panel 5b of FIG. 32, a data signal line 15x is provided along a pixel 100 and a pixel 101, and a data signal line 15X is provided along a pixel 103 and a pixel 104.

A scanning signal line 16c is disposed so as to overlap one of two edge sections of the pixel 100, which two edge sections run along the row direction, and a scanning signal line 16d is disposed so as to overlap the other one of these two edge sections of the pixel 100. From a plan view, pixel electrodes 17c, 17d, and 17c' are aligned in a column direction, between the scanning signal lines 16c and 16d. The scanning signal line 16c also overlaps one of two edge sections of the pixel 103, which two edge sections run along the row direction, and the scanning signal line 16d overlaps the other one of these two edge sections of the pixel 103. From a plan view, pixel electrodes 17C, 17D, and 17C' are aligned in the column direction, between the scanning signal lines 16c and 16d.

A scanning signal line 16a is disposed so as to overlap one of two edge sections of the pixel 101, which two edge sections run along the row direction, and a scanning signal line 16b is disposed so as to overlap the other one of these two edge sections of the pixel 101. From a plan view, the pixel electrodes 17a, 17b, 17a' are aligned in the column direction, between the scanning signal lines 16a and 16b. The scanning signal line 16a also overlaps one of two edge sections of the pixel 104, which two edge sections run along the row direction, and the scanning signal line 16b overlaps the other one of these two edge sections of the pixel 104. From a plan view, pixel electrodes 17A, 17B, and 17A' are aligned in the column direction, between the scanning signal lines 16a and 16b.

In the pixel 101, a source electrode 8a of a transistor 12a and a drain electrode 9a of the transistor 12a are provided on the scanning signal line 16a, and a source electrode 8b of a transistor 12b and a drain electrode 9b of the transistor 12b are provided on the scanning signal line 16b. The source electrode 8a is connected to the data signal line 15x. The drain electrode 9a is connected to a drain draw-out wire 27a. The drain draw-out wire 27a is connected to a contact electrode 77a and a coupling capacitor electrode 37a. The contact electrode 77a is connected to the pixel electrode 17a via a contact hole 11a. The coupling capacitor electrode 37a overlaps the pixel electrode 17b via an interlayer insulating film. As a result, a coupling capacitor C101 (see FIG. 31) between the pixel electrodes 17a and 17b is formed. A draw-out wire 27a' drawn out from the coupling capacitor electrode 37a is connected to a contact electrode 77a'. The contact electrode 77a' is connected to the pixel electrode 17a' via a contact hole 11a'. As a result, the pixel electrode 17a and 17a' are electrically connected to each other. Moreover, the drain electrode 9a is connected to a drain draw-out wire 28a. The drain draw-out wire 28a is connected to a storage capacitor electrode 38a that is formed in an identical layer to the coupling capacitor electrode 37a. The storage capacitor electrode 38a overlaps the scanning signal line 16d via a gate insulating film. As a result, storage capacitance Cha (see FIG. 31) is formed.

The source electrode 8b of the transistor 12b is connected to the data signal line 15x. The drain electrode 9b is connected to a drain draw-out wire 27b. The drain draw-out wire 27b is connected to a contact electrode 77b. The contact electrode 77b is connected to the pixel electrode 17b via a contact hole 11b. A storage capacitor electrode 38b that is formed in an identical layer to the storage capacitor electrode 38a overlaps the scanning signal line 16d via the gate insulating film and is connected to a draw-out wire 28b. The draw-out wire 28b is connected to a contact electrode 78b. The contact electrode 78b is connected to the pixel electrode 17b via a contact hole 12b. As a result, storage capacitance Chb (see FIG. 31) is formed. Note that the other pixels each have a configuration (shape and arrangement of members and their connection relationship) identical to that of the pixel 101.

According to the arrangement, sub-pixels including the pixel electrodes 17a and 17a' become "bright", and a sub-pixel including the pixel electrode 17b becomes "dark".

Figure 33:
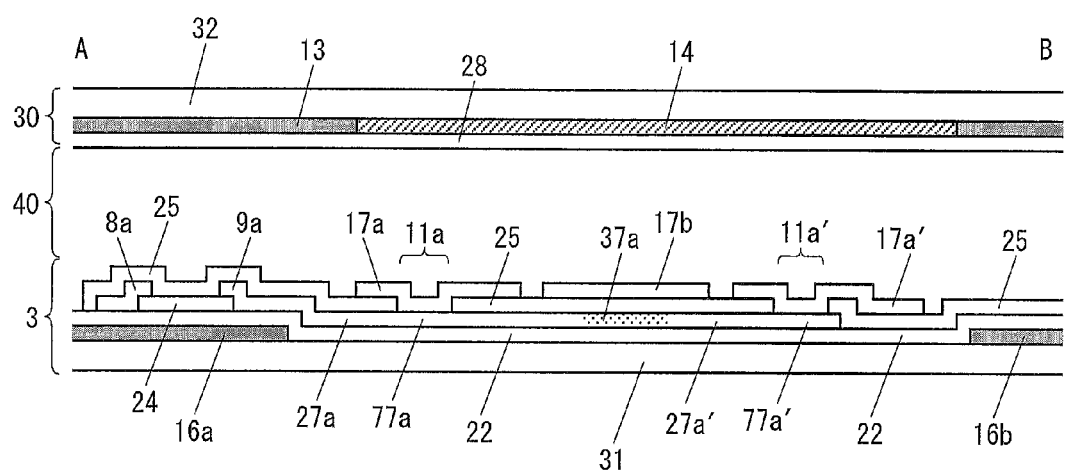
FIG. 33 is a cross-sectional view illustrating a specific example taken along the line A-B of FIG. 32.

FIG. 33 is a cross-sectional view taken along the line A-B of FIG. 32. As shown in FIG. 33, the liquid crystal panel 5b includes an active matrix substrate 3, a color filter substrate 30 facing the active matrix substrate 3, and a liquid crystal layer 40 sandwiched between the two substrates (3 and 30).

As shown in FIG. 33, the active matrix substrate 3 has the scanning signal lines 16a and 16b provided on a glass substrate 31, and on these members, an inorganic gate insulating film 22 is provided so as to cover these members. On the inorganic gate insulating film 22, a semiconductor layer 24 (i layer and n+ layer), the source electrode 8a that is in contact with the n+ layer, the drain electrode 9a, the drain draw-out wires 27a and 27a', the contact electrodes 77a and 77a', and the coupling capacitor electrode 37a are provided. Further, an inorganic interlayer insulating film 25 is formed thereon so as to cover these members. The n+ layer is removed, by etching or the like, from a part (typically, a channel section of a transistor) of the semiconductor layer 24 which part does not overlap the source electrode 8a and the drain electrode 9a, so that the part of the semiconductor layer 24 has only the i layer. The pixel electrodes 17a, 17b, and 17a' are formed on the inorganic interlayer insulating film 25, and further an alignment film (not illustrated) is formed so as to cover these members (pixel electrodes 17a, 17b, and 17a'). In this example, the inorganic interlayer insulating film 25 is hollowed out at the contact holes 11a and 11a', thereby allowing connection of the pixel electrode 17a and the contact electrode 77a and connection of the pixel electrode 17a' and the contact electrode 77a'. Moreover, the coupling capacitor electrode 37a connected to the drain draw-out wire 27a overlaps the pixel electrode 17b via the inorganic interlayer insulating film 25. As a result, the coupling capacitor C101 (see FIG. 31) is formed. The draw-out wire 27a' drawn out from the coupling capacitor electrode 37a is connected to the contact electrode 77a'. The contact electrode 77a' is connected to the pixel electrode 17a' via the contact hole 11a'. Note that the storage capacitance Cha (see FIG. 31) is formed in a part where the storage capacitor electrode 38a overlaps the scanning signal line 16d as shown in FIG. 4, and the storage capacitance Chb (see FIG. 31) is formed in a part where the storage capacitor electrode 38b overlaps the scanning signal line 16d as shown in FIG. 4.

Meanwhile, the color filter substrate 30 includes a black matrix 13 and a colored layer 14 provided on a glass substrate 32. A common electrode (com) 28 is provided on an upper layer of the black matrix 13 and colored layer 14. Further, an alignment film (not illustrated) is formed on the common electrode 28 so as to cover the common electrode (com) 28.

Figure 34:
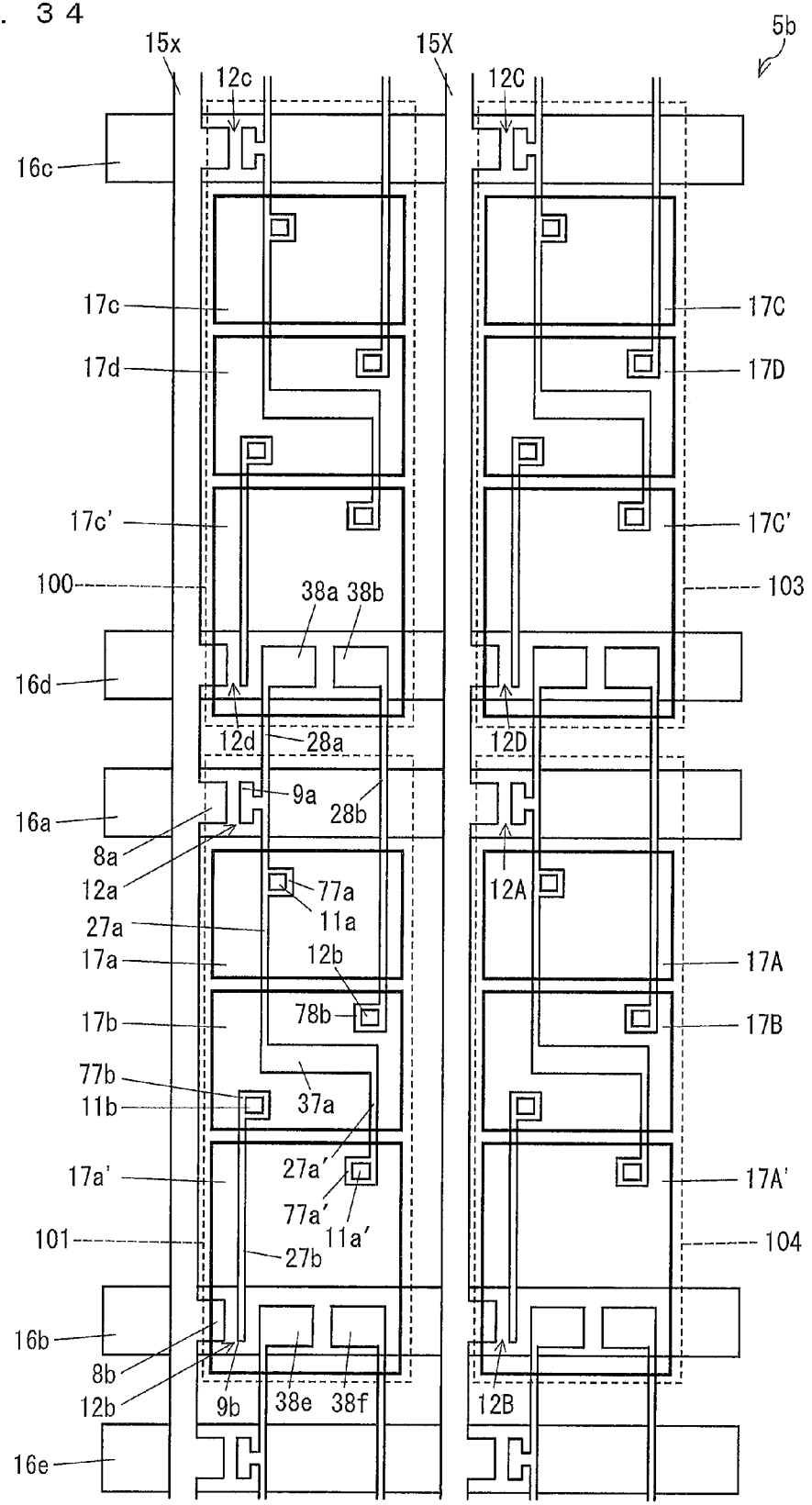
FIG. 34 is a plan view illustrating another configuration of the liquid crystal panel 5a of FIG. 32.

The liquid crystal panel 5b of FIG. 32 may be configured as shown in FIG. 34 in a case where a thin inorganic interlayer insulating film 25 and a thick organic interlayer insulating film 26 are formed in layers below the pixel electrodes as shown in FIG. 5. That is, the pixel electrode 17a' is formed so as to overlap the scanning signal line 16b via the inorganic interlayer insulating film 25 and the thick organic interlayer insulating film 26. This makes it possible to reduce parasitic capacitance between the pixel electrode 17a' and the scanning signal line 16b, thereby, in particular, improving an aperture ratio while suppressing an increase in load on the scanning signal line 16b.

(Specific Example 2-2 of Liquid Crystal Panel)

Figure 35:
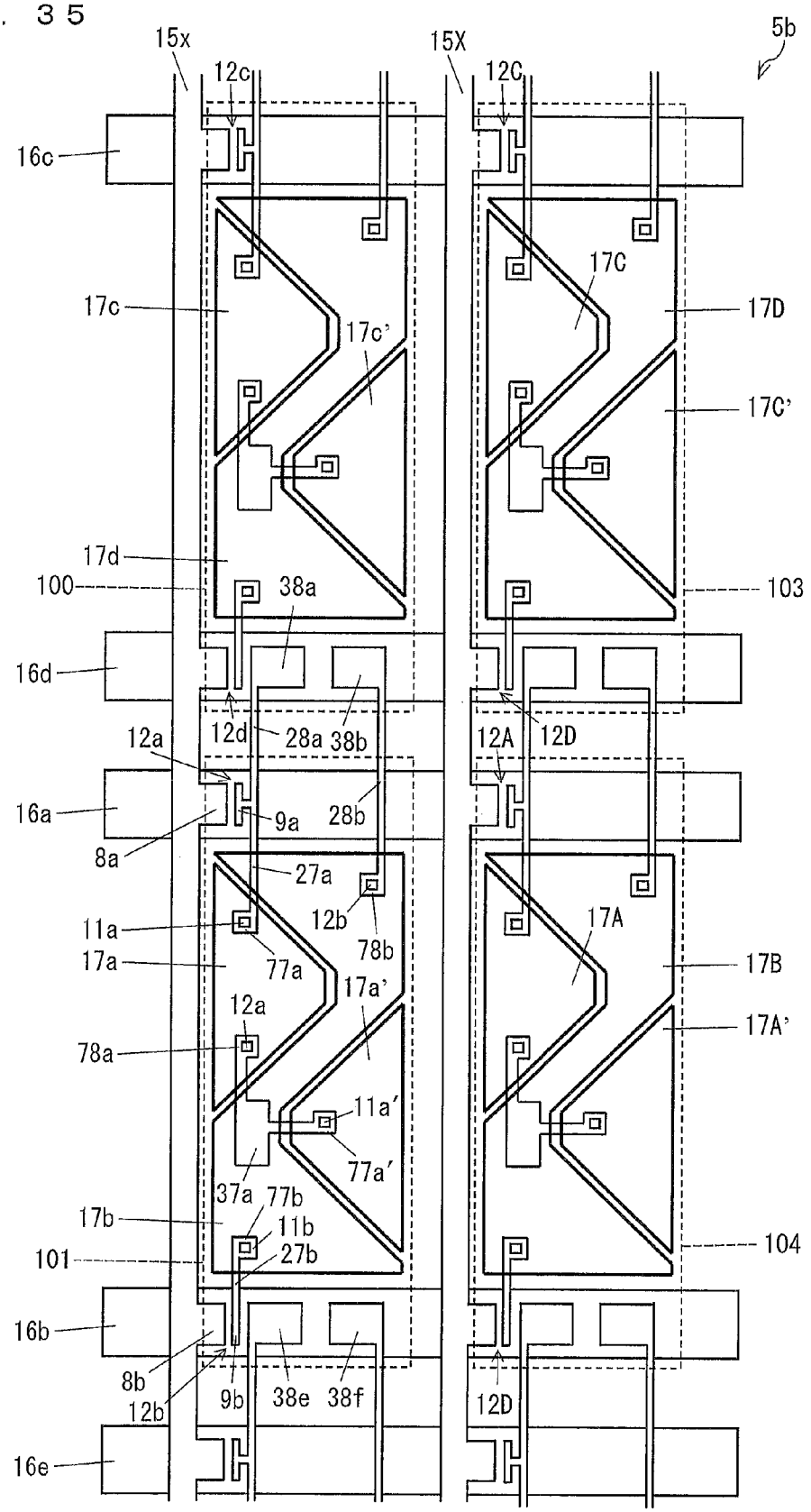
FIG. 35 is a plan view illustrating a configuration (specific example 2-2) of the liquid crystal panel 5b.

A liquid crystal panel of the present invention is not limited to the configuration in which rectangular shaped pixel electrodes are aligned in a column direction, and therefore may be configured as shown in FIG. 35.

In a liquid crystal panel 5b of FIG. 35, as to a pixel 101, a transistor 12a is disposed in the vicinity of an intersection of a data signal line 15x and a scanning signal line 16a. In a pixel region defined by the two signal lines (15x and 16a) and a scanning signal line 16b, the liquid crystal panel 5b has (i) a pixel electrode 17a having a trapezoidal shape and (ii) a pixel electrode 17a' which has a trapezoidal shape substantially the same as a shape of the pixel electrode 17a rotated at 180° and which is located at a position of substantially 315° from the pixel electrode 17a with respect to the row direction of the scanning signal line 16a. In the pixel region excluding the pixel electrodes 17a and 17a', the liquid crystal panel 5b has a pixel electrode 17b that is disposed so as to mesh with (be engaged with) the shapes of the pixel electrodes 17a and 17a'.

With such a configuration, the pixel electrode 17a, 17b, and 17a' are disposed so that a part of the pixel electrode 17a is close to the scanning signal line 16a, a part of the pixel electrode 17a' is close to the scanning signal line 16b, one end of the pixel electrode 17b is close to the scanning signal line 16a, and the other end of the pixel electrode 17b is close to the scanning signal line 16b. In other words, at least parts of the pixel electrodes 17a and 17a' are disposed so as to be close to the scanning signal lines 16a and 16b, respectively, and the pixel electrode 17b extends in the column direction so as to connect the scanning signal lines 16a and 16b.

In the pixel 101, a source electrode 8a of the transistor 12a and a drain electrode 9a of the transistor 12a are provided on the scanning signal line 16a, and a source electrode 8b of a transistor 12b and a drain electrode 9b of the transistor 12b are provided on the scanning signal line 16b. The source electrode 8a is connected to the data signal line 15x. The drain electrode 9a is connected to a drain draw-out wire 27a. The drain draw-out wire 27a is connected to a contact electrode 77a. The contact electrode 77a is connected to the pixel electrode 17a via a contact hole 11a. Moreover, the drain electrode 9a is connected to a drain draw-out wire 28a. The drain draw-out wire 28a is connected to a storage capacitor electrode 38a. The storage capacitor electrode 38a overlaps the scanning signal line 16d via a gate insulating film. As a result, storage capacitance Cha (see FIG. 31) is formed. A coupling capacitor electrode 37a overlaps the pixel electrode 17b via an interlayer insulating film. One end of the coupling capacitor electrode 37a is connected to a contact electrode 78a. The contact electrode 78a is connected to the pixel electrode 17a via a contact hole 12a. The other end of the coupling capacitor electrode 37a is connected to a contact electrode 77a'. The contact electrode 77a' is connected to the pixel electrode 17a' via a contact hole 11a'. As a result, a coupling capacitor C101 (see FIG. 31) between the pixel electrodes 17a and 17b is formed, and the pixel electrodes 17a and 17a' are electrically connected to each other.

The source electrode 8b of the transistor 12b is connected to the data signal line 15x. The drain electrode 9b is connected to a drain draw-out wire 27b. The drain draw-out wire 27b is connected to a contact electrode 77b. The contact electrode 77b is connected to the pixel electrode 17b via a contact hole 11b. A storage capacitor electrode 38b that is formed in an identical layer to the storage capacitor electrode 38a overlaps the scanning signal line 16d via the gate insulating film and is connected to a draw-out wire 28b. The draw-out wire 28b is connected to a contact electrode 78b. The contact electrode 78b is connected to the pixel electrode 17b via a contact hole 12b. As a result, storage capacitance Chb (see FIG. 31) is formed. Note that the other pixels each have a configuration (shape and arrangement of members and their connection relationship) identical to that of the pixel 101.

According to the arrangement, sub-pixels including the pixel electrodes 17a and 17a' become "bright", and a sub-pixel including the pixel electrode 17b becomes "dark".

(Specific Example 2-3 of Liquid Crystal Panel)

Figure 36:
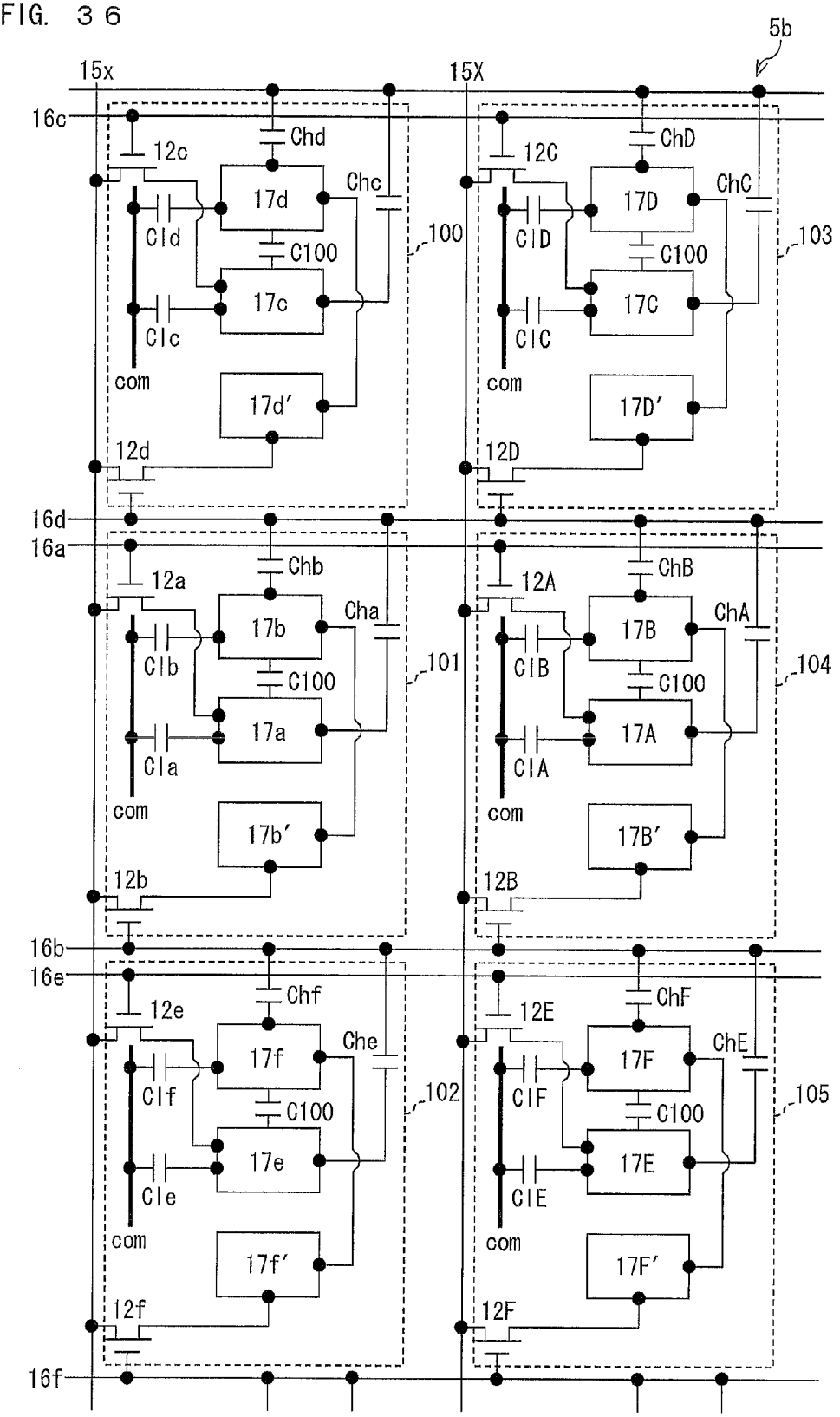
FIG. 36 is a circuit diagram illustrating another configuration of the liquid crystal panel 5b.
Figure 37:
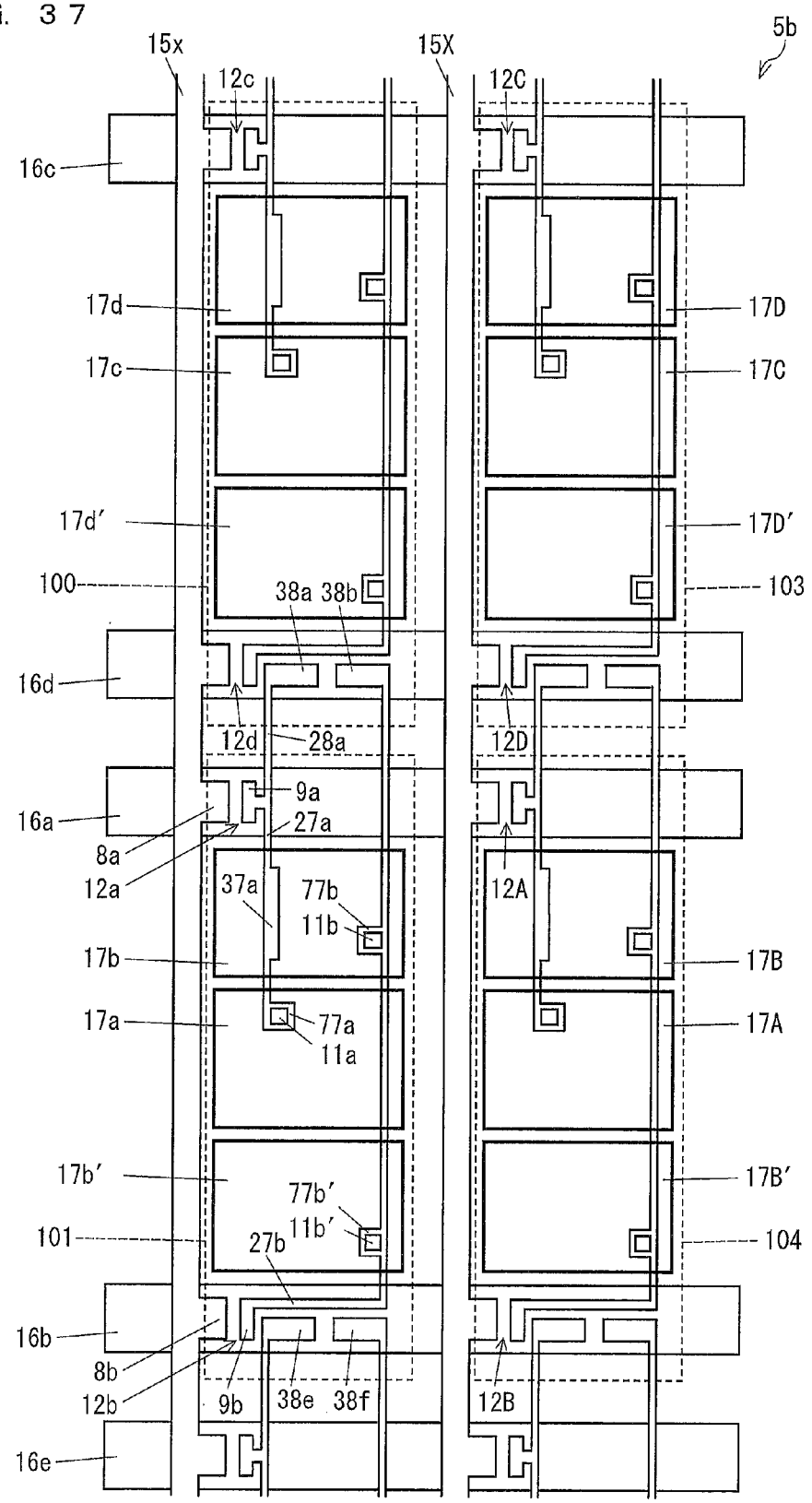
FIG. 37 is a plan view illustrating a configuration (specific example 2-3) of the liquid crystal panel 5b.

FIG. 36 is an equivalent circuit diagram corresponding to the specific example 2-3 of the liquid crystal panel 5b. FIG. 37 illustrates the specific example 2-3 of the liquid crystal panel 5b. In a liquid crystal panel 5b of FIG. 36, three pixel electrodes are formed in each pixel region. The liquid crystal panel 5b includes data signal lines (15x and 15X) that extend in a column direction (top-to-bottom direction of FIG. 36), scanning signal lines (16a to 16f) that extend in a row direction (left-to-right direction of FIG. 36), pixels (100 to 105) that are aligned in the row and column directions, and a common electrode (counter electrode) com, as in the liquid crystal panel of FIG. 31. The pixels have an identical configuration. A pixel array including the pixels 100 through 102 and a pixel array including the pixels 103 through 105 are adjacent each other.

A scanning signal line 16c is disposed so as to overlap one of two edge sections of the pixel 100, which two edge sections run along the row direction, and a scanning signal line 16d is disposed so as to overlap the other one of these two edge sections of the pixel 100. From a plan view, pixel electrodes 17d, 17c, and 17d' are aligned in a column direction, between the scanning signal lines 16c and 16d. The scanning signal line 16c also overlaps one of two edge sections of the pixel 103, which two edge sections run along the row direction, and the scanning signal line 16d overlaps the other one of these two edge sections of the pixel 103. From a plan view, pixel electrodes 17D, 17C, and 17D' are aligned in the column direction, between the scanning signal lines 16c and 16d.

A scanning signal line 16a is disposed so as to overlap one of two edge sections of the pixel 101, which two edge sections run along the row direction, and a scanning signal line 16b is disposed so as to overlap the other one of these two edge sections of the pixel 101. From a plan view, pixel electrodes 17b, 17a, and 17b' are aligned in the column direction, between the scanning signal lines 16a and 16b. The scanning signal line 16a also overlaps one of two edge sections of the pixel 104, which two edge sections run along the row direction, and the scanning signal line 16b overlaps the other one of these two edge sections of the pixel 104. From a plan view, pixel electrodes 17B, 17A, and 17B' are aligned in the column direction, between the scanning signal lines 16a and 16b.

In the pixel 101, a source electrode 8a of a transistor 12a and a drain electrode 9a of the transistor 12a are provided on the scanning signal line 16a, and a source electrode 8b of a transistor 12b and a drain electrode 9b of the transistor 12b are provided on the scanning signal line 16b. The source electrode 8a is connected to the data signal line 15x. The drain electrode 9a is connected to a drain draw-out wire 27a. The drain draw-out wire 27a is connected to a contact electrode 77a and a coupling capacitor electrode 37a. The contact electrode 77a is connected to the pixel electrode 17a via a contact hole 11a. The coupling capacitor electrode 37a overlaps the pixel electrode 17b via an interlayer insulating film. As a result, a coupling capacitor C101 (see FIG. 36) between the pixel electrodes 17a and 17b is formed. Moreover, the drain electrode 9a is connected to a drain draw-out wire 28a. The drain draw-out wire 28a is connected to a storage capacitor electrode 38a that is formed in an identical layer to the coupling capacitor electrode 37a. The storage capacitor electrode 38a overlaps the scanning signal line 16d via a gate insulating film. As a result, storage capacitance Cha (see FIG. 36) is formed.

The source electrode 8b of the transistor 12b is connected to the data signal line 15x. The drain electrode 9b is connected to a drain draw-out wire 27b. The drain draw-out wire 27b is connected to contact electrodes 77b and 77b' and to a storage capacitor electrode 38b. The contact electrode 77b is connected to the pixel electrode 17b via a contact hole 11b. The contact electrode 77b' is connected to the pixel electrode 17b' via a contact hole 11b'. Thus, the pixel electrodes 17b and 17b' are electrically connected to each other. The storage capacitor electrode 38b that is formed in an identical layer to the storage capacitor electrode 38a overlaps the scanning signal line 16d via the gate insulating film. As a result, storage capacitance Chb (see FIG. 36) is formed. Note that the other pixels each have a configuration (shape and arrangement of members and their connection relationship) identical to that of the pixel 101.

According to the arrangement, a sub-pixel including the pixel electrode 17a becomes "bright", and sub-pixels including the pixel electrodes 17b and 17b' become "dark".

(Specific Example 2-4 of Liquid Crystal Panel)

Figure 38:
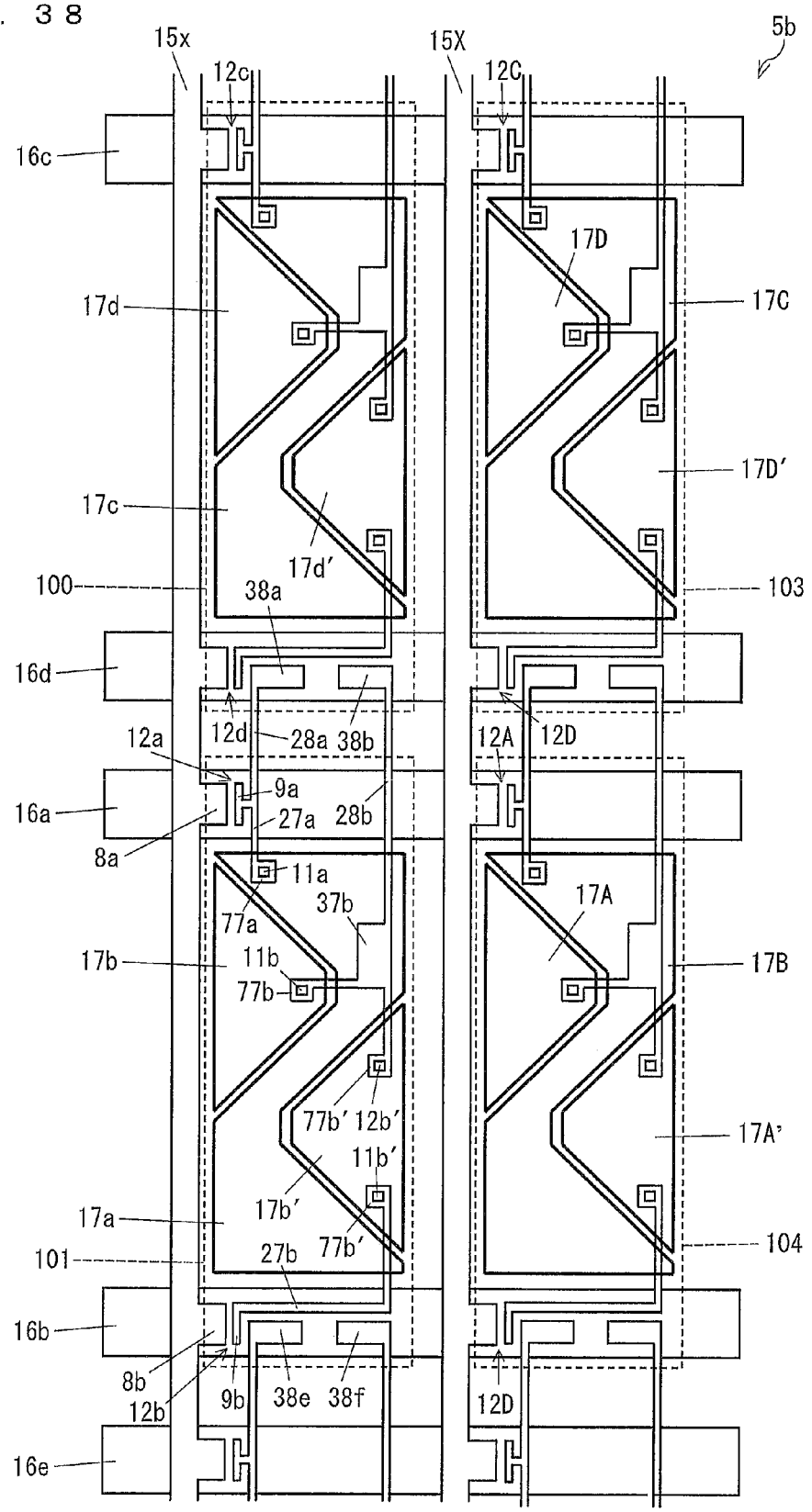
FIG. 38 is a plan view illustrating a configuration (specific example 2-4) of the liquid crystal panel 5b.

A liquid crystal panel of the present invention is not limited to the configuration in which rectangular shaped pixel electrodes are aligned in a column direction, and therefore may be configured as shown in FIG. 38.

In a liquid crystal panel 5b of FIG. 38, as to a pixel 101, a transistor 12a is disposed in the vicinity of an intersection of a data signal line 15x and a scanning signal line 16a. In a pixel region defined by the two signal lines (15x and 16a) and a scanning signal line 16b, the liquid crystal panel 5b has (i) a pixel electrode 17b having a trapezoidal shape and (ii) a pixel electrode 17b' which has a trapezoidal shape substantially the same as a shape of the pixel electrode 17b rotated at 180° and which is located at a position of substantially 315° from the pixel electrode 17b with respect to the row direction of the scanning signal line 16a. In the pixel region excluding the pixel electrodes 17b and 17b', the liquid crystal panel 5b has a pixel electrode 17a that is disposed so as to mesh with (be engaged with) the shapes of the pixel electrodes 17b and 17b'.

With such a configuration, the pixel electrode 17b, 17a, and 17b' are disposed so that a part of the pixel electrode 17b is close to the scanning signal line 16a, a part of the pixel electrode 17b' is close to the scanning signal line 16b, one end of the pixel electrode 17a is close to the scanning signal line 16a, and the other end of the pixel electrode 17a is close to the scanning signal line 16b. In other words, at least parts of the pixel electrodes 17b and 17b' are disposed so as to be close to the scanning signal lines 16a and 16b, respectively, and the pixel electrode 17a extends in the column direction so as to connect the scanning signal lines 16a and 16b.

In the pixel 101, a source electrode 8a of the transistor 12a and a drain electrode 9a of the transistor 12a are provided on the scanning signal line 16a, and a source electrode 8b of a transistor 12b and a drain electrode 9b of the transistor 12b are provided on the scanning signal line 16b. The source electrode 8a is connected to the data signal line 15x. The drain electrode 9a is connected to a drain draw-out wire 27a. The drain draw-out wire 27a is connected to a contact electrode 77a. The contact electrode 77a is connected to the pixel electrode 17a via a contact hole 11a. Moreover, the drain electrode 9a is connected to a drain draw-out wire 28a. The drain draw-out wire 28a is connected to a storage capacitor electrode 38a. The storage capacitor electrode 38a overlaps the scanning signal line 16d via a gate insulating film. As a result, storage capacitance Cha (see FIG. 36) is formed.

The source electrode 8b of the transistor 12b is connected to the data signal line 15x. The drain electrode 9b is connected to a drain draw-out wire 27b. The drain draw-out wire 27b is connected to a contact electrode 77b'. The contact electrode 77b' is connected to the pixel electrode 17b' via a contact hole 11b'. A coupling capacitor electrode 37b overlaps the pixel electrode 17a via an interlayer insulating film. One end of the coupling capacitor electrode 37b is connected to the contact electrode 77b'. The contact electrode 77b' is connected to the pixel electrode 17b' via a contact hole 12b'. The other end of the coupling capacitor electrode 37b is connected to a contact electrode 77b. The contact electrode 77b is connected to the pixel electrode 17b via a contact hole 11b. As a result, a coupling capacitor C101 (see FIG. 36) between the pixel electrodes 17a and 17b is formed, and the pixel electrodes 17b and 17b' are electrically connected to each other. Moreover, a draw-out wire 28b drawn out from the coupling capacitor electrode 37b is connected to a storage capacitor electrode 38b. The storage capacitor electrode 38b overlaps the scanning signal line 16d via a gate insulating film. As a result, storage capacitance Chb (see FIG. 36) is formed. Note that the other pixels each have a configuration (shape and arrangement of members and their connection relationship) identical to that of the pixel 101.

According to the arrangement, a sub-pixel including the pixel electrode 17a becomes "bright", and sub-pixels including the pixel electrodes 17b and 17b' become "dark". Needless to say, each of the driving methods described in Embodiment 1 can be applied as a driving method of the liquid crystal display device including the liquid crystal panel 5b of the present Embodiment 2.

Figure 39:
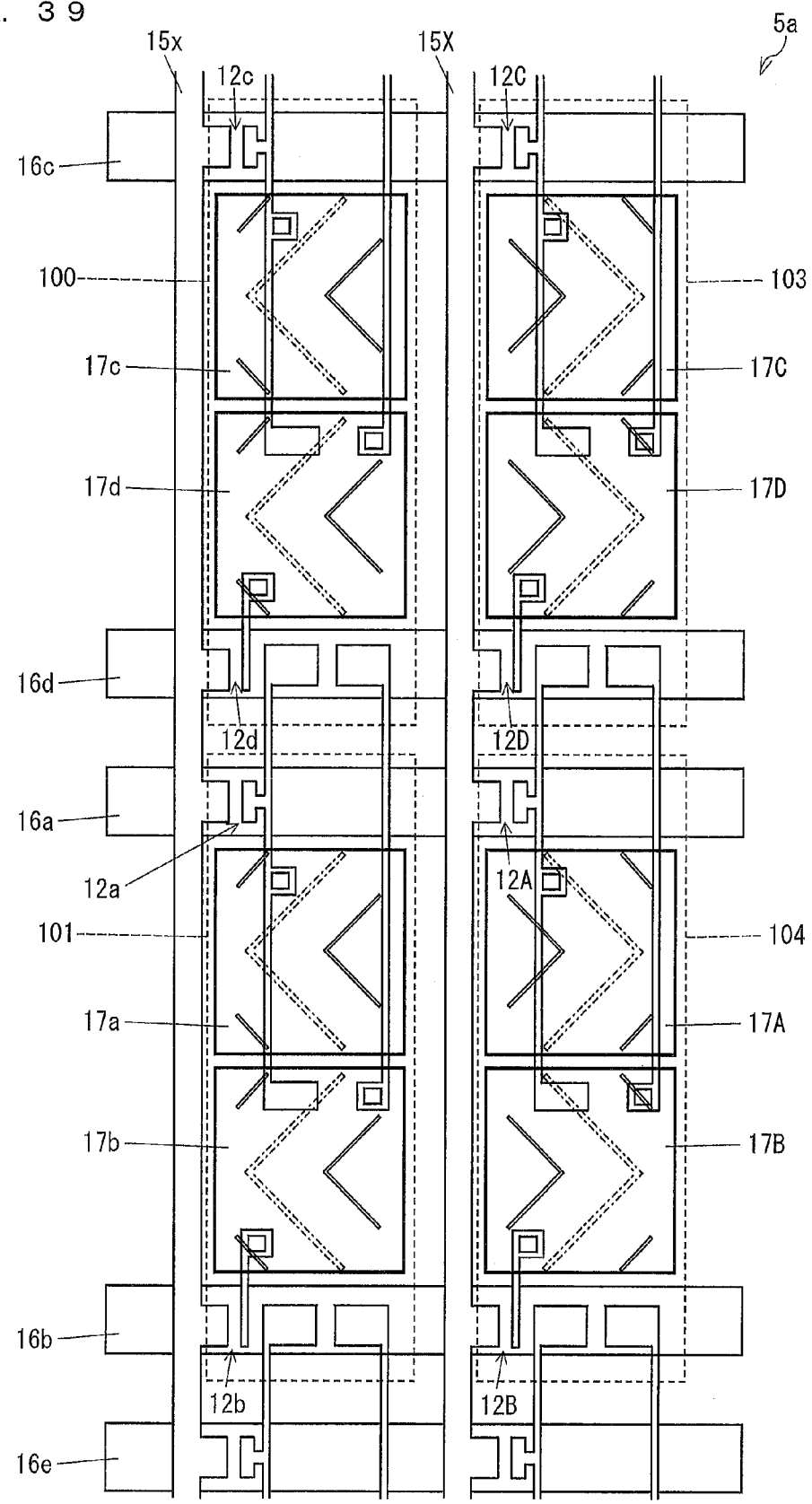
FIG. 39 is a plan view illustrating a configuration of a liquid crystal panel 5a having an MVA structure.
Figure 40:
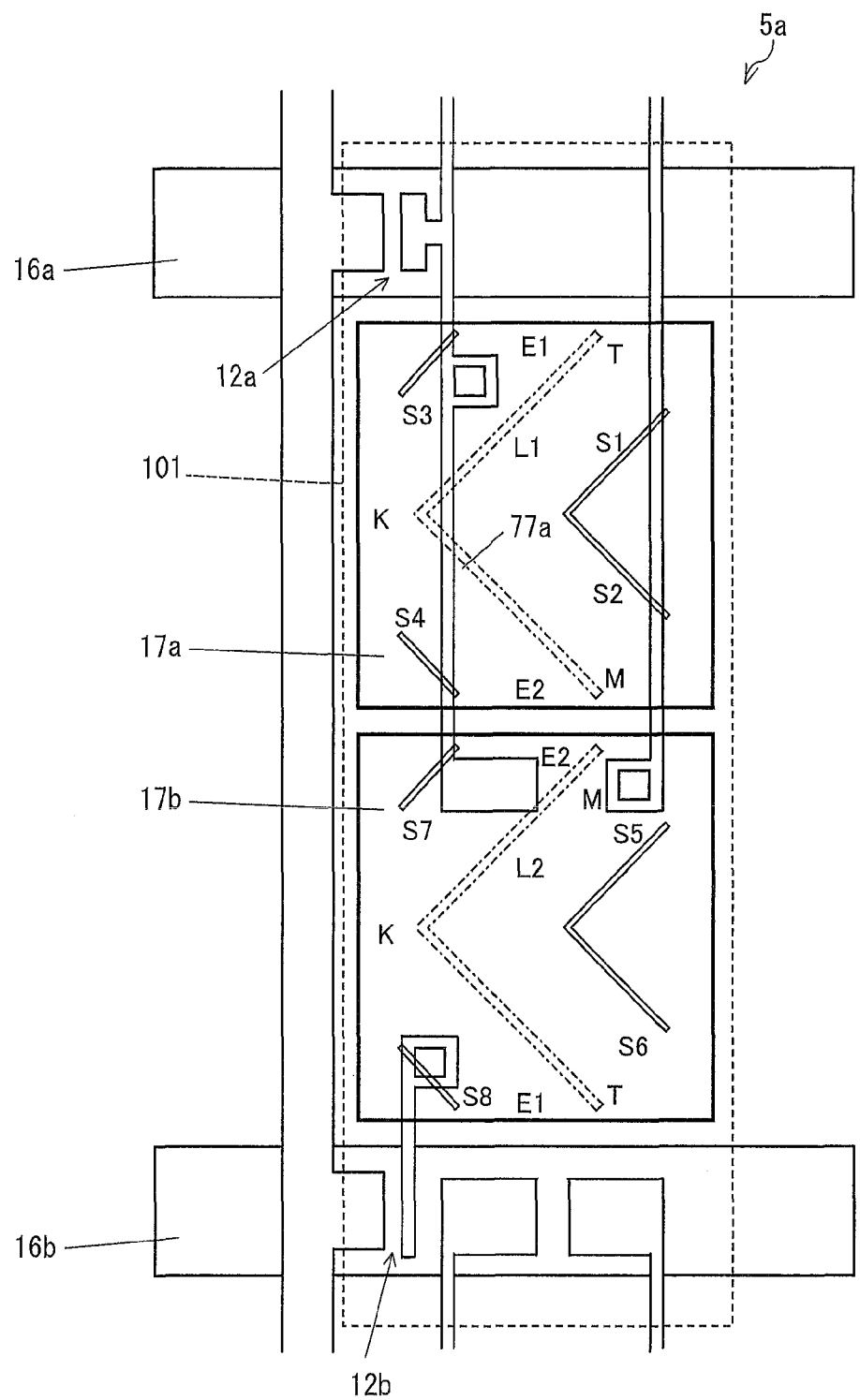
FIG. 40 is an enlarged plan view of a part of the liquid crystal panel 5a of FIG. 39.
Figure 41:
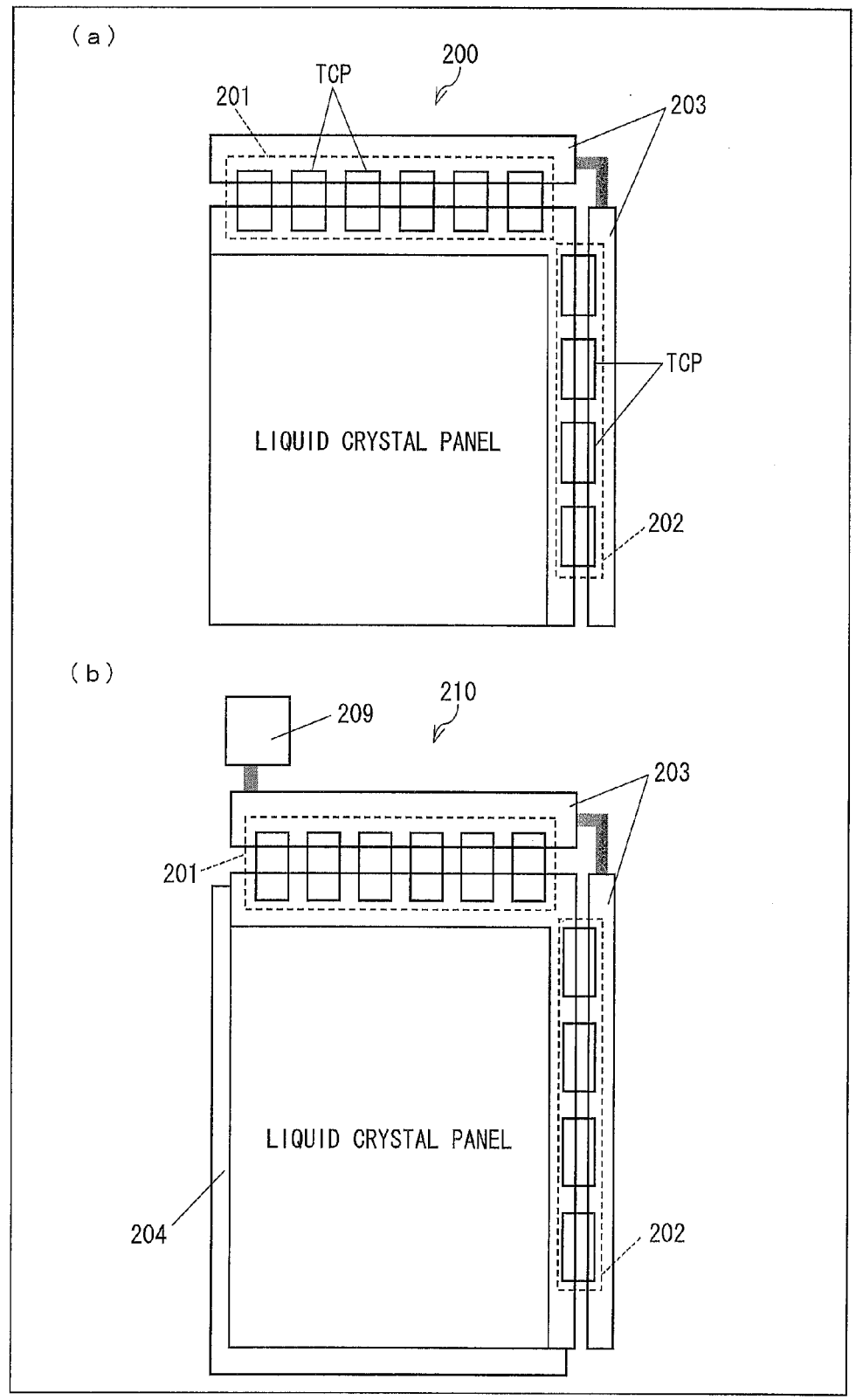
FIG. 41 is a diagram schematically illustrating configurations of the present liquid crystal display unit and the present liquid crystal display device, (a) of FIG. 41 illustrates the configuration of the present liquid crystal display unit, and (b) of FIG. 41 illustrates the configuration of the present liquid crystal display device.

Moreover, each of the liquid crystal panels 5a and 5b described in Embodiments 1 and 2 can be combined with a known configuration, and can have, for example, an MVA (Multidomain Vertical Alignment) structure as shown in FIG. 39. FIG. 39 illustrates how the liquid crystal panel 5a shown in FIG. 2 is configured in a case where the liquid crystal panel 5a has an MVA structure. Note that although the present liquid crystal panel 5a includes an active matrix substrate, a liquid crystal layer, and a color filter substrate, the liquid crystal layer is not illustrated and, as for the color filter substrate, only ribs are illustrated in FIG. 39. FIG. 40 is an enlarged plan view of part of FIG. 39. The following description takes a pixel 101 as an example.

As shown in FIG. 40, the pixel 101 includes a sub-pixel (hereinafter referred to as "first sub-pixel") including a pixel electrode 17a and a sub-pixel (hereinafter referred to as "second sub-pixel") including a pixel electrode 17b. In the first sub-pixel, a first alignment controlling structure constituted by a first rib L1 and slits (pixel electrode slits) S1 to S4 is provided. In the second sub-pixel, a second alignment controlling structure constituted by a second rib L2 and slits (pixel electrode slits) S5 to S8 is provided.

In the pixel 101, the first sub-pixel located on a scanning signal line 16a side has an end E1 which runs along the scanning signal line 16a and an end E2 opposite to the end E1, and the second sub-pixel located on a scanning signal line 16b side has an end E1 which runs along the scanning signal line 16b and an end E2 opposite to the end E1. In a part of the color filter substrate which part corresponds to the first sub-pixel, the first rib L1 having a V-shape when viewed in the row direction (left-to-right direction of FIG. 40) is provided so that a start point T is located at the end E1 and an end point M is located at the end E2. Similarly, in a part of the color filter substrate which part corresponds to the second sub-pixel, the second rib L2 having a V-shape when viewed in the row direction (left-to-right direction of FIG. 40) is provided so that a start point T is located at the end E1 and an end point M is located at the end E2. That is, the first rib L1 and the second rib L2 face the same direction.

Moreover, the pixel electrode 17a has the slits S1 to S4 corresponding to the first rib L1, and the pixel electrode 17b has the slits S5 to S8 corresponding to the second rib L2. The slits S1 and S3 are provided on respective sides of the first rib L1 so as to be substantially parallel to a part of the first rib L1 from the start point T to a bend point K. The slits S2 and S4 are provided on respective sides of the first rib L1 so as to be substantially parallel to a part of the first rib L1 from the bend point K to the end point M. The slits S6 and S8 are provided on respective sides of the second rib L2 so as to be substantially parallel to a part of the second rib L2 from the start point T to a bend point K. The slits S5 and S7 are provided on respective sides of the second rib L2 so as to be substantially parallel to a part of the second rib L2 from the bend point K to the end point M. Shapes of the slits S5 to S8 and positions of the slits S5 to S8 with respect to the second rib L2 are similar to shapes of the slits S1 to S4 and positions of the slits S1 to S4 with respect to the first rib L1, respectively. In each of the first and second ribs L1 and L2, an angle (∠TKM) formed by the start point T, the bend point K, and the end point M is approximately 90°.

Accordingly, the slit S1, one side (TK part) of the first rib L1, and the slit S3 are parallel to each other, and extend diagonally (at approximately −135°) with respect to the scanning signal line 16a. The slit S2, one side (KM part) of the first rib L1, and the slit S4 are parallel to each other, and extend diagonally (at approximately −45°) with respect to the scanning signal line 16a. A part of the one side (TK part) of the first rib L1 and a part of the slit S3 are located at the end E1 (part which runs along the scanning signal line 16a) of the first sub-pixel. Meanwhile, the slit S6, one side (TK part) of the second rib L2, and the slit S8 are parallel to each other, and extend diagonally (at approximately 135°) with respect to the scanning signal line 16b. The slit S5, one side (KM part) of the second rib L2, and the slit S7 are parallel to each other, and extend diagonally (at approximately 45°) with respect to the scanning signal line 16b. A part of the one side (TK part) of the second rib L2 and a part of the slit S8 are located at the end E1 (part which runs along the scanning signal line 16b) of the second sub-pixel.

According to a liquid crystal display device using the present liquid crystal panel 5a, it is possible to achieve a wide viewing angle. Moreover, according to the present liquid crystal panel 5a, the ribs L1 and L2 in one pixel (e.g., the pixel 101) face the opposite direction to those in another pixel (e.g., the pixel 104) which is adjacent to the one pixel in the column direction as shown in FIG. 39. This makes it possible to prevent liquid crystals from concentrating in a specific alignment region, thereby eliminating an influence of alignment disorder. Consequently, it is possible to provide a liquid crystal display device having excellent viewing angle characteristics.

The present liquid crystal panel is configured such that ribs are provided on a color filter substrate, but is not limited to this. Slits may be provided instead of the ribs provided on the color filter substrate.

The present liquid crystal panel is configured such that storage capacitance (Cha and Chb) is formed between at least one of the first and second pixel electrodes (17a and 17b) provided in one pixel region (pixel 101) and the second scanning signal line (16d) corresponding to another pixel region (pixel 100) of a previous stage provided previously to the one pixel region (pixel 101), but is not limited to this. Alternatively, the storage capacitance (Cha and Chb) may be formed between at least one of the first and second pixel electrodes (17a and 17b) and the first scanning signal line (16c) corresponding to the pixel region (pixel 100) of the previous stage provided previously to the one pixel region (pixel 101). That is, the present liquid crystal panel is configured such that the storage capacitance (Cha and Chb) is formed between at least one of the first and second pixel electrodes (17a and 17b) provided in one pixel region (pixel 101) and at least one of the first and second scanning signal lines (16c and 16d) corresponding to another pixel region (pixel 100) of a previous stage provided previously to the one pixel region (pixel 101).

(Configurations of Liquid Crystal Display Unit and Liquid Crystal Display Device)

Finally, examples of configurations of a liquid crystal display unit and a liquid crystal display device of the present invention are described. In each of the embodiments, the present liquid crystal display unit and liquid crystal display device are configured as follows. Specifically, two polarizing plates A and B are attached to both surfaces of a liquid crystal panel (5a or 5b) so that a polarization axis of the polarizing plate A and a polarization axis of the polarizing plate B cross at right angles. Note that an optical compensation film etc. may be stacked on the polarizing plates as necessary. Next, drivers (a gate driver 202 and a source driver 201) are connected to the liquid crystal panel as shown in (a) of FIG. 41. The following description deals with an example in which the drivers are connected to the liquid crystal panel by a TCP (Tape Career Package) method. First, an ACF (Anisotropic Conductive Film) is provisionally compressed to a terminal section of the liquid crystal panel. Next, TCPs on which the drivers are disposed are punched out from a carrier tape; the TCPs are aligned with a panel terminal electrode, and thereafter the TCPs are heated and firmly compressed. Thereafter, a circuit substrate 203 (PWB: Printed Wiring Board) for linking the driver TCPs together and input terminals of the TCPs are connected by the ACF. This obtains a liquid crystal display unit 200. Thereafter, as illustrated in (b) of FIG. 41, the drivers (201 and 202) of the liquid crystal display unit are connected to a display control circuit 209 via the circuit substrate 203, to integrate the drivers with a lighting device (backlight unit) 204. This obtains a liquid crystal display device 210.

Figure 42:
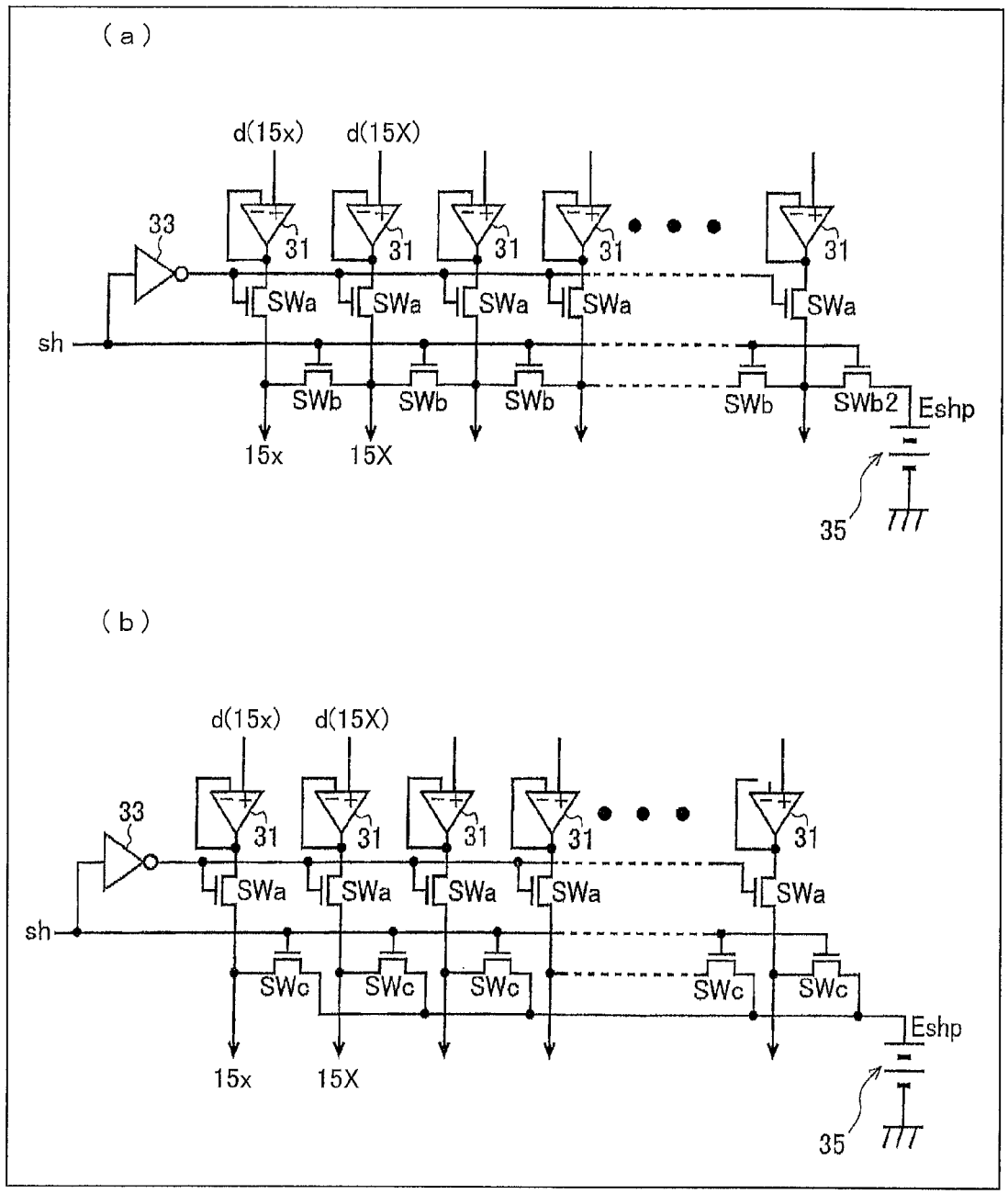
FIG. 42 is a circuit diagram illustrating another configuration of a source driver.

(a) of FIG. 42 illustrates a configuration of a source driver in the present liquid crystal display device in a case where a refreshing period is provided. As illustrated in (a) of FIG. 42, the source driver in this case includes, for each data signal line, a buffer 31, a data output switch SWa, and a refreshing switch SWb. The buffer 31 receives corresponding data d, and an output of the buffer 31 is connected to an output terminal of the data signal line via the data output switch SWa. Moreover, output terminals of two adjacent data signal lines are connected to each other via the refreshing switch SWb. That is to say, the refreshing switches SWb are connected in series, and one of ends of a circuit made up of the serially-connected refreshing switches SWb is connected to a refreshing electric potential supply source 35 (Vcom). In the embodiment, a gate terminal of the data output switch SWa receives a charge sharing signal (sh) via the inverter 33, and the gate terminal of the refreshing switch SWb receives a charge sharing signal sh.

The source driver illustrated in (a) of FIG. 42 may also be configured as illustrated in (b) of FIG. 42. Namely, each of refreshing switches SWc is connected to just the corresponding data signal line and the refreshing electric potential supply source 35 (Vcom), and the refreshing switches SWc are not serially connected to each other. This allows prompt supply of the refreshing electric potential to the data signal lines.

Figure 43:
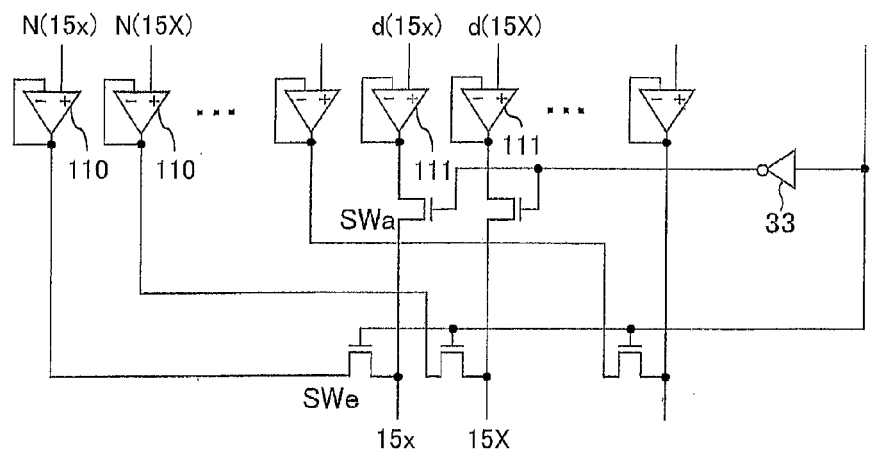
FIG. 43 is a circuit diagram illustrating still another configuration of a source driver.

In the embodiment, the foregoing configuration of the source driver has the refreshing electric potential as Vcom. However, the present invention is not limited to this. For example, an appropriate refreshing electric potential can be calculated based on (i) a level of a signal electric potential supplied to the same data signal line in one previous horizontal scanning period and (ii) a signal electric potential to be supplied to the current horizontal scanning period, and this calculated refreshing electric potential may be supplied to the data signal line. A configuration of the source driver in this case is as illustrated in FIG. 43. In the configuration, each of a data output buffer 110, a refreshing buffer 111, a data output switch SWa, and a refreshing switch SWe are provided per respective data signal line. Corresponding data d is inputted into the data output buffer 110, and an output of the data output buffer 110 is connected to an output terminal of the data signal line via the data output switch SWa. To the refreshing buffer 111, corresponding non-image data N (data corresponding to an optimum refreshing electric potential determined based on (i) a level of a signal electric potential supplied in one previous horizontal scanning period and (ii) a signal electric potential to be supplied in a current horizontal scanning period) is inputted, and an output of the refreshing buffer 111 is connected to an output terminal of the data signal line via the refreshing switch SWe.

The "polarity of an electric potential" in the present application denotes high (positive) and low (negative) with respect to a standard electric potential. The standard electric potential in the present embodiment may be Vcom (common electric potential) which is an electric potential of a common electrode (counter electrode) or may be any other arbitrary electric potential.

Figure 44:
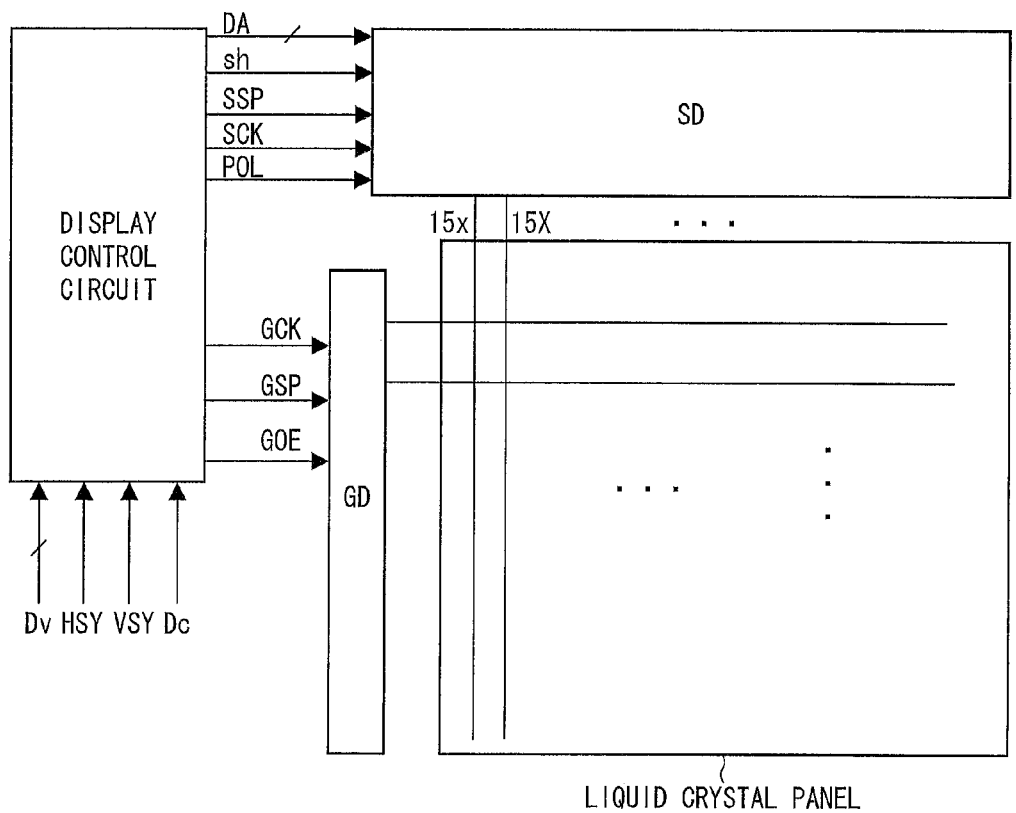
FIG. 44 is a block diagram explaining an overall configuration of the present liquid crystal display device.

FIG. 44 is a block diagram illustrating a configuration of the present liquid crystal display device. As illustrated in FIG. 44, the present liquid crystal display device includes a display section (liquid crystal panel), a source driver (SD), a gate driver (GD), and a display control circuit. The source driver drives data signal lines, the gate driver drives scanning signal lines, and the display control circuit controls the source driver and the gate driver.

The display control circuit receives, from an external signal source (e.g., a tuner), a digital video signal Dv representing an image to be displayed, a horizontal sync signal HSY and vertical sync signal VSY corresponding to the digital video signal Dv, and a control signal Dc for controlling a display operation. Moreover, based on these received signals Dv, HSY, VSY, and Dc, the display control circuit generates, as signals for displaying on the display section the image represented by the digital video signal Dv, a data start pulse signal SSP, data clock signal SCK, charge sharing signal sh, digital image signal DA (signal corresponding to the video signal Dv) representing the image to be displayed, gate start pulse signal GSP, gate clock signal GCK, and gate driver output control signal (scanning signal output control signal) GOE. The display control circuit then outputs these signals.

More specifically, the display control circuit (i) outputs the video signal Dv as the digital image signal DA, after carrying out timing adjustment and the like of the video signal Dv by use of an inner memory as necessary, (ii) generates the data clock signal SCK as a signal made up of a pulse corresponding to pixels in the image that the digital image signal DA represents, (iii) generates the data start pulse signal SSP as a signal that, based on the horizontal sync signal HSY, becomes a high-level (H level) for just a predetermined time per horizontal scanning period, (iv) generates a gate start pulse signal GSP as a signal that, based on the vertical sync signal VSY, becomes a H level for just a predetermined time per frame period (one vertical scanning period), (v) generates a gate clock signal GCK based on the horizontal sync signal HSY, and (vi) generates a charge sharing signal sh and a gate driver output control signal GOE based on the horizontal sync signal HSY and control signal Dc.

Among the signals that are generated in the display control circuit as aforementioned, the digital image signal DA, the charge sharing signal sh, a signal POL that controls a polarity of the signal electric potential (data signal electric potential), the data start pulse signal SSP, and the data clock signal SCK are inputted into the source driver; whereas the gate start pulse signal GSP, gate clock signal GCK, and gate driver output control signal GOE are inputted into the gate driver.

The source driver successively generates, per one horizontal scanning period, an analog electric potential (signal electric potential) that is equivalent to a pixel value in the scanning signal lines of the image represented by the digital image signal DA, based on the digital image signal DA, data clock signal SCK, charge sharing signal sh, data start pulse signal SSP, and polarity inversion signal POL. The source driver then outputs these data signals to the data signal lines (e.g., 15x and 15X).

The gate driver generates a gate on-pulse signal based on the gate start pulse signal GSP, gate clock signal GCK, and gate driver output control signal GOE, and outputs this generated signal to the scanning signal line. This causes the scanning signal lines to be selectively driven.

By driving the data signal lines and scanning signal lines of the display section (liquid crystal panel) by the source driver and gate driver as described above, a signal electric potential is written into a pixel electrode from the data signal lines via a transistor (TFT) connected to the selected scanning signal line. As a result, a voltage is applied to a liquid crystal layer of the sub-pixels, which controls the amount of light transmitted from the backlight. This causes the image represented by the digital video signal Dv to be displayed on the sub-pixels.

Figure 45:
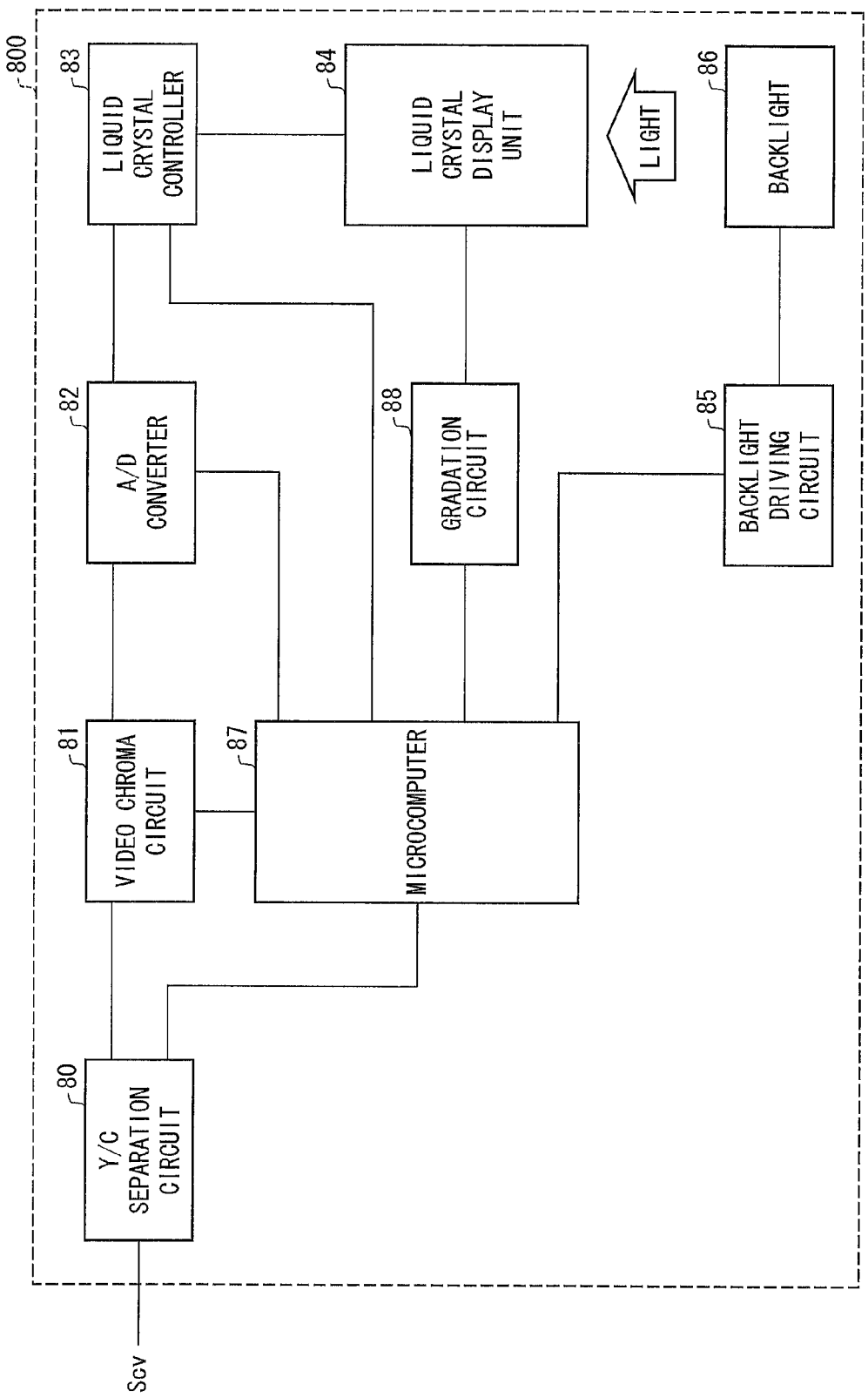
FIG. 45 is a block diagram explaining functions of the present liquid crystal display device.

The following description explains one configuration example of the present liquid crystal display device in a case where the liquid crystal display device is applied to a television receiver. FIG. 45 is a block diagram illustrating a configuration of a liquid crystal display device 800 for use in a television receiver. The liquid crystal display device 800 includes: a liquid crystal display unit 84; a Y/C separation circuit 80, video chroma circuit 81; a A/D converter 82; a liquid crystal controller 83; a backlight driving circuit 85; a backlight 86; a microcomputer (microcomputer) 87; and a gradation circuit 88. The liquid crystal display unit 84 includes a liquid crystal panel, and a source driver and gate driver for driving the liquid crystal panel.

In the liquid crystal display device 800 of this configuration, first, a composite color video signal Scv as a television signal is inputted into the Y/C separation circuit 80 from outside, and the composite color video signal Scv is divided into a brightness signal and a color signal. The brightness signal and color signal are converted by the video chroma circuit 81 into analog RGB signals that correspond to the light's three principle colors, and further the analog RGB signals are converted by the A/D converter 82 into digital RGB signals. The digital RGB signals are inputted into the liquid crystal controller 83. Moreover, in the Y/C separation circuit 80, horizontal and vertical sync signals are also retrieved from the composite color video signal Scv inputted from the outside. These sync signals also are inputted into the liquid crystal controller 83 via the microcomputer 87.

In the liquid crystal display unit 84, the digital RGB signals are inputted from the liquid crystal controller 83 at a predetermined timing, together with a timing signal based on the sync signal. Moreover, in the gradation circuit 88, gradation electric potentials are generated for each of the three principle colors of color display R, G, B. These gradation electric potentials are also supplied to the liquid crystal display unit 84. In the liquid crystal display unit 84, a driving signal (data signal=signal electric potential, scanning signal etc.) is generated by the source driver, gate driver and the like provided inside, based on the RGB signals, timing signals, and gradation electric potentials, and a color image is displayed on the inner liquid crystal panel based on the driving signal. In order to display an image by the liquid crystal display unit 84, the liquid crystal panel needs to be irradiated with light from a rear side of the liquid crystal panel inside of the liquid crystal display unit. With the liquid crystal display device 800, a backside of the liquid crystal panel is irradiated with light by having the backlight driving circuit 85 drive the backlight 86 under control of the microcomputer 87. Control of the entire system including the foregoing processes is carried out by the microcomputer 87. Video signals inputted from the outside (composite color video signal) may be not just video signals based on television broadcast, but may also be video signals captured by a camera and video signals supplied via Internet connection. With use of the liquid crystal display device 800, it is possible to perform image display based on various video signals.

Figure 46:
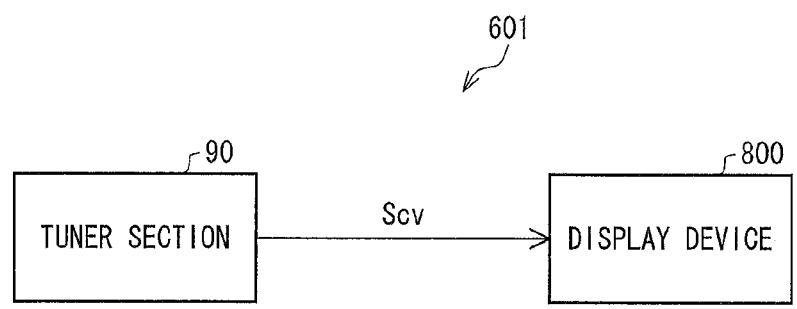
FIG. 46 is a block diagram explaining functions of the present television receiver.

In a case where an image based on television broadcast is displayed by the liquid crystal display device 800, a tuner section 90 is connected to the liquid crystal display device 800 as illustrated in FIG. 46, thus configuring the present television receiver 601. The tuner section 90 extracts signals of channels to be received among waves (high frequency signals) that are received by an antenna (not illustrated), and converts them to an intermediate frequency signal. By detecting this intermediate frequency signal, composite color video signals Scv as a television signal are taken out. The composite color video signal Scv is, as already described, inputted into the liquid crystal display device 800, and an image based on this composite color video signal Scv is displayed on the liquid crystal display device 800.

Figure 47:
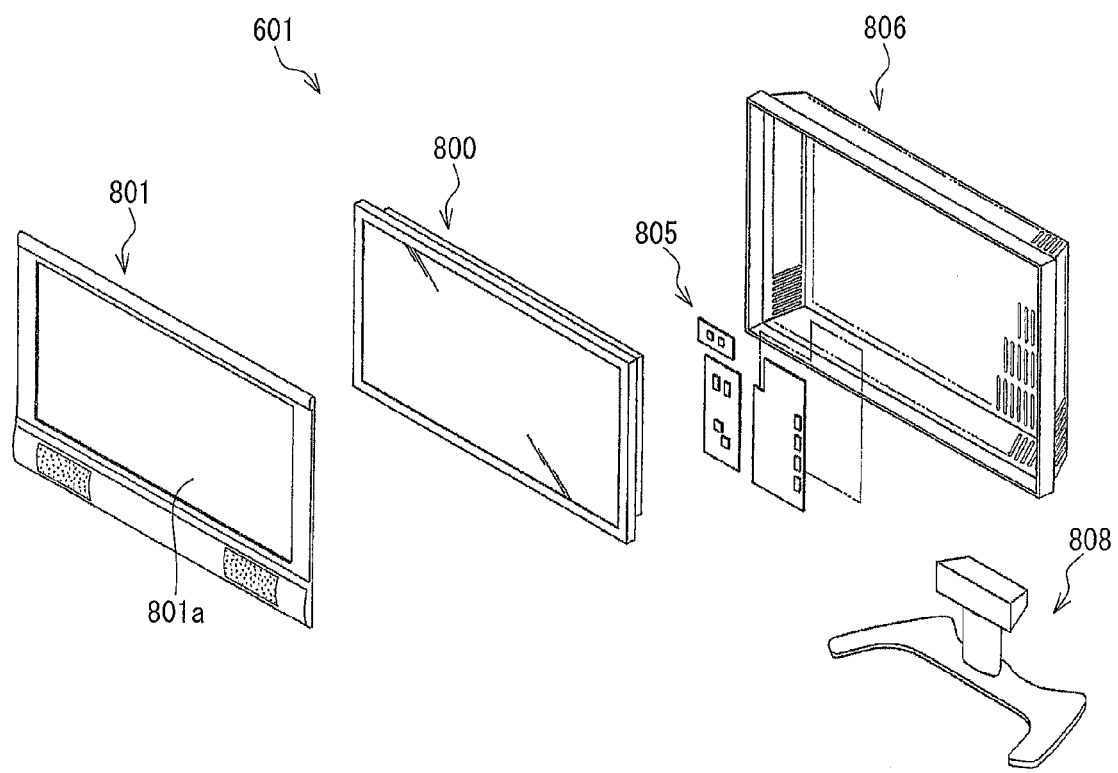
FIG. 47 is an exploded perspective view illustrating a configuration of the present television receiver.
Figure 48:
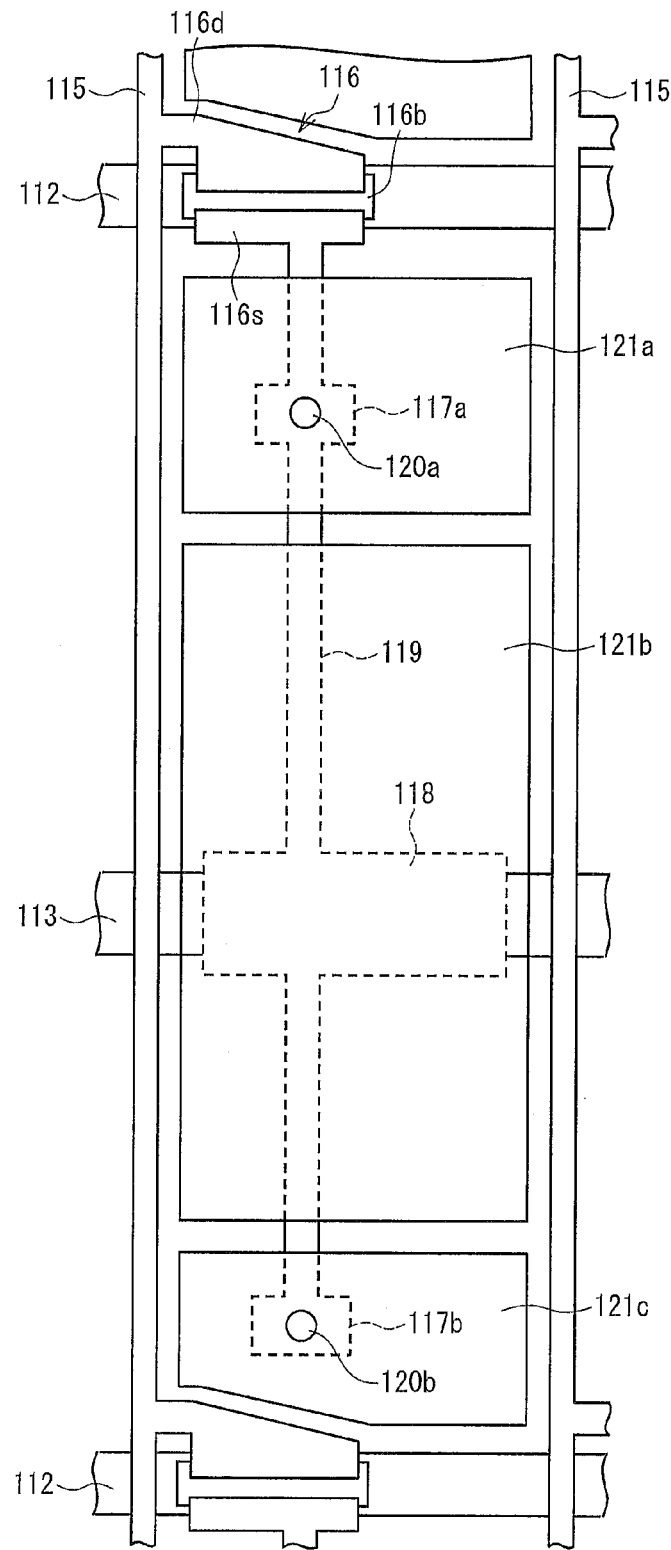
FIG. 48 is a plan view illustrating a configuration of a conventional liquid crystal panel.
Figure 49:
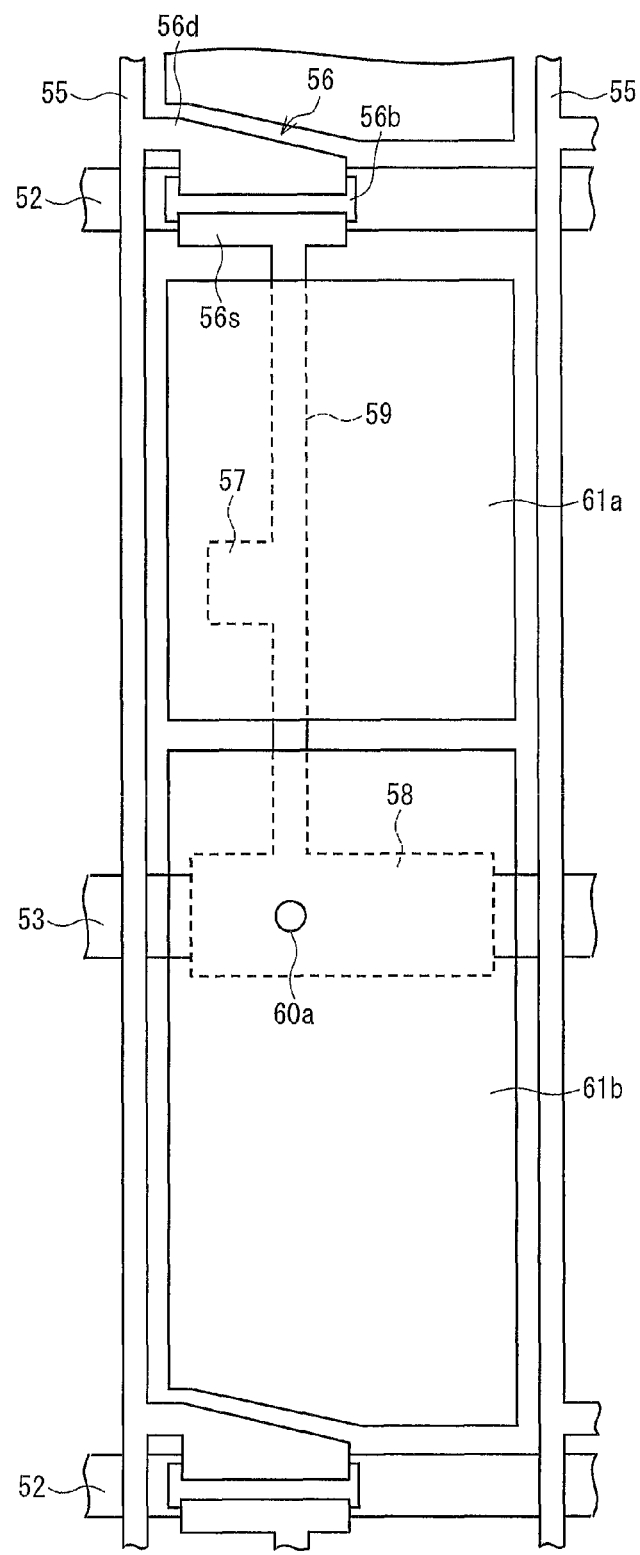
FIG. 49 is a plan view of a configuration of a conventional liquid crystal panel.
Figure 50:
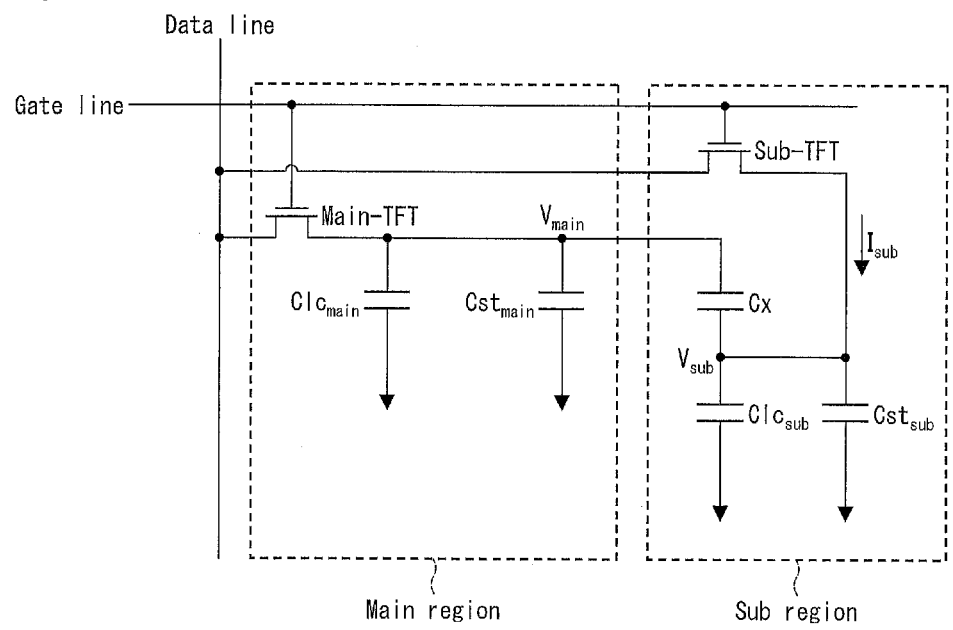
FIG. 50 is a circuit diagram illustrating a configuration of a conventional liquid crystal panel.

FIG. 47 is an exploded perspective view of an example illustrating one configuration of the present television receiver. As illustrated in FIG. 47, the present television receiver 601 includes, as its constituents, the liquid crystal display device 800, a first housing 801 and a second housing 806. The first housing 801 and second housing 806 sandwich the liquid crystal display device 800 so that the liquid crystal display device 800 is surrounded by the two housings. The first housing 801 has an opening 801a that transmits an image displayed on the liquid crystal display device 800. Moreover, the second housing 806 covers a rear side of the liquid crystal display device 800, and includes an operation circuit 805 for operating the display device 800. Further, the second housing 806 has a supporting member 808 disposed to its lower side.

The active matrix substrate includes: first and second pixel electrodes provided in a pixel region; a data signal line; first and second scanning signal lines; a first transistor connected to the data signal line and the first scanning signal line; and a second transistor connected to the data signal line and the second scanning signal line, the data signal line, the first and second scanning signal lines, the first transistor, and the second transistor being associated with the pixel region, the first pixel electrode being connected to the data signal line via the first transistor, the second pixel electrode being connected to the first pixel electrode via a capacitor and being connected to the data signal line via the second transistor, and storage capacitance being formed between at least one of the first and second pixel electrodes provided in the pixel region and at least one of the first and second scanning signal lines that are associated with a pixel region of a previous stage provided previously to the pixel region.

In a liquid crystal display device using the present active matrix substrate, pixel electrodes provided in a pixel region are connected to a data signal line via respective transistors connected to different scanning signal lines. This makes it possible to supply signal electric potentials to the pixel electrodes at different timings. Accordingly, before a signal electric potential for regular writing is supplied to one pixel electrode, a signal electric potential (e.g., Vcom) can be supplied to the other pixel electrode capacitively coupled to the one pixel electrode by causing the other pixel electrode to be electrically connected to the data signal line via the transistor.

Before regular writing is carried out, a signal electric potential can be thus supplied, not via a capacitor, from the data signal line to a pixel electrode (capacitively coupled electrode) capacitively coupled to a pixel electrode that is connected to the data signal line via a transistor. This allows an electric charge accumulated in the capacitively coupled electrode to be discharged (refreshed). It is therefore possible to suppress occurrence of image sticking of a sub-pixel including this pixel electrode. Further, according to the configuration, it is unnecessary to adjust channel W/L ratios of transistors, and an active matrix substrate can be configured such that transistors have an identical channel size. Consequently, it is possible to suppress a decline in display quality caused by variation in transistor characteristics and to make liquid crystal panels uniform.

Moreover, according to the configuration, storage capacitance is formed between a pixel electrode provided in a pixel region and a scanning signal line (at least one of the first and second scanning signal lines) associated with a pixel region of a previous stage that has already been scanned. This makes it possible to increase a value of the storage capacitance and to suppress fluctuation in value of the storage capacitance, thereby allowing an improvement in display quality.

The present active matrix substrate may be configured such that in the pixel region, a first gate on-pulse signal for supplying, to the first pixel electrode, a signal electric potential of a data signal to be displayed is supplied to the first scanning signal line, and a second gate on-pulse signal for supplying a common electrode electric potential to the second pixel electrode is supplied to the second scanning signal line, and the storage capacitance is formed between said at least one of the first and second pixel electrodes provided in the pixel region and the second scanning signal line associated with the pixel region of the previous stage.

The present active matrix substrate may be configured such that a channel W/L ratio (ratio of a channel width W to a channel length L) of the first transistor is equal to a channel W/L ratio (ratio of a channel width W to a channel length L) of the second transistor.

The present active matrix substrate may be configured to further include a coupling capacitor electrode that is electrically connected to one of the first and second pixel electrodes, the coupling capacitor electrode overlapping the other one of the first and second pixel electrodes via an insulating film.

The present active matrix substrate may be configured to further include: a first storage capacitor electrode electrically connected to the first pixel electrode; and a second storage capacitor electrode electrically connected to the second pixel electrode, the first storage capacitor electrode and the second storage capacitor electrode that are associated with the pixel region overlapping, via an insulating film, at least one of the first and second scanning signal lines that are associated with the pixel region of the previous stage.

The present active matrix substrate may be configured to further include: a coupling capacitor electrode; and first and second storage capacitor electrodes, the coupling capacitor electrode and the first and second storage capacitor electrodes being formed in an identical layer to conductive electrodes of the first and second transistors, the coupling capacitor electrode being electrically connected to one of the first and second pixel electrodes and overlapping the other one of the first and second pixel electrodes via an interlayer insulating film, the first storage capacitor electrode associated with the pixel region being electrically connected to the first pixel electrode and overlapping, via a gate insulating film, at least one of the first and second scanning signal lines that are associated with the pixel region of the previous stage, and the second storage capacitor electrode associated with the pixel region being electrically connected to the second pixel electrode and overlapping, via the gate insulating film, at least one of the first and second scanning signal lines that are associated with the pixel region of the previous stage.

The present active matrix substrate may be configured to further include: a coupling capacitor electrode which overlaps the second pixel electrode of the pixel region via an interlayer insulating film; and first and second storage capacitor electrodes each of which overlaps, via a gate insulating film, at least one of the first and second scanning signal lines that are associated with the pixel region of the previous stage, the coupling capacitor electrode being connected, in an identical layer, to a first draw-out wire drawn out from a conductive electrode of the first transistor, the first draw-out wire being connected to the first pixel electrode via a contact hole, and the first draw-out wire being connected, in an identical layer, to the first storage capacitor electrode, the second pixel electrode being connected, via a contact hole, to a second draw-out wire drawn out from a conductive electrode of the second transistor, and the second pixel electrode being connected, via a contact hole, to a third draw-out wire drawn out from the second storage capacitor electrode.

The present active matrix substrate may be configured to further include: a coupling capacitor electrode which overlaps the second pixel electrode of the pixel region via an interlayer insulating film; and first and second storage capacitor electrodes each of which overlaps, via a gate insulating film, at least one of the first and second scanning signal lines that are associated with the pixel region of the previous stage, the first pixel electrode being connected, via a contact hole, to a first draw-out wire drawn out from a conductive electrode of the first transistor, and the first draw-out wire being connected, in an identical layer, to the first storage capacitor electrode, the second pixel electrode being connected, via a contact hole, to a second draw-out wire drawn out from a conductive electrode of the second transistor, the coupling capacitor electrode being connected, in an identical layer, to a third draw-out wire drawn out from the second storage capacitor electrode, and the third draw-out wire being connected to the second pixel electrode via a contact hole.

The present active matrix substrate may be configured to further include: a second coupling capacitor electrode which overlaps the first pixel electrode of the pixel region via an interlayer insulating film; a first coupling capacitor electrode which overlaps the second pixel electrode of the pixel region via an interlayer insulating film; and first and second storage capacitor electrodes each of which overlaps, via a gate insulating film, at least one of the first and second scanning signal lines that are associated with the pixel region of the previous stage, the first coupling capacitor electrode being connected, in an identical layer, to a first draw-out wire drawn out from a conductive electrode of the first transistor, the first draw-out wire being connected to the first pixel electrode via a contact hole, and the first pixel electrode being connected, via a contact hole, to a second draw-out wire drawn out from the first storage capacitor electrode, and the second pixel electrode being connected, via a contact hole, to a third draw-out wire drawn out from a conductive electrode of the second transistor, the second coupling capacitor electrode being connected, in an identical layer, to a fourth draw-out wire drawn out from the second storage capacitor electrode, and the fourth draw-out wire being connected to the second pixel electrode via a contact hole.

The present active matrix substrate may be configured such that two scanning signal lines are associated with two pixel regions aligned in a row direction, and each of the two pixel regions including two pixel electrodes aligned in a column direction, where the row direction is a direction in which the scanning signal lines extend, and a transistor which is connected to one of two pixel electrodes that are disposed adjacent to each other in the row direction is connected to one of the two scanning signal lines, and a transistor which is connected to the other one of the two pixel electrodes that are disposed adjacent to each other in the row direction is connected to the other one of the two scanning signal lines.

The present active matrix substrate may be configured such that an area where the first storage capacitor electrode provided in the pixel region overlaps at least one of the first and second scanning signal lines that are associated with the pixel region of the previous stage is equal in size to an area where the second storage capacitor electrode provided in the pixel region overlaps at least one of the first and second scanning signal lines that are associated with the pixel region of the previous stage.

The present active matrix substrate may be configured such that the pixel region includes sub-pixel regions corresponding to respective pixel electrodes, each of the sub-pixel regions has first through fourth regions respectively corresponding to (i) a first liquid crystal domain in which liquid crystal molecules are tilted in a first predetermined direction in a case where a voltage is applied to a liquid crystal layer, (ii) a second liquid crystal domain in which the liquid crystal molecules are tilted in a second predetermined direction in a case where a voltage is applied to the liquid crystal layer, (iii) a third liquid crystal domain in which the liquid crystal molecules are tilted in a third predetermined direction in a case where a voltage is applied to the liquid crystal layer, and (iv) a fourth liquid crystal domain in which the liquid crystal molecules are tilted in a fourth predetermined direction in a case where a voltage is applied to the liquid crystal layer, and the coupling capacitor electrode overlaps a boundary between adjacent regions of the first through fourth regions.

The present active matrix substrate may be configured such that the pixel region is divided into two parts by the first scanning signal line traversing the pixel region, and the first pixel electrode is disposed in one of the two parts, and the second pixel electrode is disposed in the other one of the two parts.

The present active matrix substrate may be configured to further include a third pixel electrode provided in the pixel region, the third pixel electrode being electrically connected to the first pixel electrode.

The present active matrix substrate may be configured to further include a third pixel electrode provided in the pixel region, the third pixel electrode being connected to the first pixel electrode via a capacitor and being electrically connected to the second pixel electrode.

The present active matrix substrate may be configured such that the first pixel electrode, the second pixel electrode, and the third pixel electrode are disposed so that (i) at least a part of the first pixel electrode is close to the first scanning signal line, (ii) at least a part of the third pixel electrode is close to the second scanning signal line, (iii) one end of the second pixel electrode is close to the first scanning signal line, and (iv) the other end of the second pixel electrode is close to the second scanning signal line.

The present active matrix substrate may be configured such that the first pixel electrode, the second pixel electrode, and the third pixel electrode are disposed so that (i) at least a part of the second pixel electrode is close to the first scanning signal line, (ii) at least a part of the third pixel electrode is close to the second scanning signal line, (iii) one end of the first pixel electrode is close to the first scanning signal line, and (iv) the other end of the first pixel electrode is close to the second scanning signal line.

The present active matrix substrate may be configured such that in a case where the active matrix substrate is applied to a liquid crystal display device, a sub-pixel including the first pixel electrode becomes a bright sub-pixel, and a sub-pixel including the second pixel electrode becomes a dark sub-pixel.

The present active matrix substrate may be configured such that in a case where the active matrix substrate is applied to a liquid crystal display device, a sub-pixel including the first pixel electrode and a sub-pixel including the third pixel electrode become bright sub-pixels, and a sub-pixel including the second pixel electrode becomes a dark sub-pixel.

The present active matrix substrate may be configured such that in a case where the active matrix substrate is applied to a liquid crystal display device, a sub-pixel including the first pixel electrode becomes a bright sub-pixel, and a sub-pixel including the second pixel electrode and a sub-pixel including the third pixel electrode become dark sub-pixels.

The present active matrix substrate may be configured such that the interlayer insulating film is made thin in at least a part of an area where the interlayer insulating film overlaps the coupling capacitor electrode.

The present active matrix substrate may be configured such that the gate insulating film is made thin in at least a part of an area where the gate insulating film overlaps the storage capacitor electrode.

The present active matrix substrate may be configured such that the interlayer insulating film includes an inorganic insulating film and an organic insulating film, and the organic insulating film is removed in at least a part of the area where the interlayer insulating film overlaps the coupling capacitor electrode.

The present active matrix substrate may be configured such that the gate insulating film includes an inorganic insulating film and an organic insulating film, and the organic insulating film is removed in at least a part of the area where the gate insulating film overlaps the storage capacitor electrode.

The present active matrix substrate may be configured such that the organic insulating film contains at least one of acrylic resin, epoxy resin, polyimide resin, polyurethane resin, novolac resin, and siloxane resin.

The present liquid crystal display device includes any of the active matrix substrates, the second scanning signal line being selected at least once during display.

Accordingly, the second pixel electrode capacitively coupled to the first pixel electrode that is connected to the data signal line via the first transistor can be electrically connected to the data signal line via the second transistor at least once during display. This allows an electric charge accumulated in the second pixel electrode to be discharged (refreshed). Consequently, it is possible to suppress occurrence of image sticking of a sub-pixel including the second pixel electrode and to suppress a decline in display quality.

The present liquid crystal display device may be configured such that a common electrode electric potential is being supplied to the data signal line when the second transistor is turned OFF.

The present liquid crystal display device may be configured such that the first transistor is in an ON state when the second transistor is turned OFF or the first transistor is turned OFF at a same time as the second transistor is turned OFF.

The present liquid crystal display device may be configured such that electric potentials of the first and second pixel electrodes are substantially set to the common electrode electric potential when the second transistor is turned OFF.

The present liquid crystal display device may be configured such that a first gate on-pulse signal supplied to the first scanning signal line and a second gate on-pulse signal supplied to the second scanning signal line become active in an identical horizontal scanning period, and the second gate on-pulse signal has a pulse width smaller than a pulse width of the first gate on-pulse signal, and becomes non-active before the first gate on-pulse signal becomes non-active.

The present liquid crystal display device may be configured such that a first gate on-pulse signal supplied to the first scanning signal line and a second gate on-pulse signal supplied to the second scanning signal line become active 1 horizontal scanning period before a period in which the signal electric potential of the data signal to be displayed is supplied to the first pixel electrode, and the second gate on-pulse signal becomes non-active while the first gate on-pulse signal is being active.

The present liquid crystal display device may be configured such that in each frame, the common electrode electric potential is supplied to all pixel electrodes in a pixel region at least two times.

The present liquid crystal display device may be configured such that in each frame, the common electrode electric potential is supplied to all the pixel electrodes in the pixel region at least two times after elapse of a ⅔ frame period from when the signal electric potential of the data signal to be displayed is supplied to the first pixel electrode.

The present liquid crystal display device may be configured such that polarities of signal electric potentials of data signals supplied to data signal lines are inverted per horizontal scanning period, when the polarities of the signal electric potentials of the data signals are inverted, supply of the data signals to the data signal lines is shut off for only a predetermined period and the data signal lines are short-circuited to each other, and the first and second transistors are in an ON state in the predetermined period.

The present liquid crystal display device may be configured to further include a scanning signal line driving circuit for driving scanning signal lines, a first gate on-pulse signal supplied to the first scanning signal line and a second gate on-pulse signal supplied to the second scanning signal line are generated by use of an output from a same stage of a shift register provided in the scanning signal line driving circuit.

The present liquid crystal display device may be configured such that the scanning signal line driving circuit includes the shift register, a plurality of logical circuits aligned in the column direction, and an output circuit, and the pulse widths of the first gate on-pulse signal and the second gate on-pulse signal that are outputted from the output circuit are determined based on an output of the shift register and an output control signal for controlling an output of the scanning signal line driving circuit, the output control signal being supplied to the plurality of logical circuits.

The present liquid crystal display device may be configured such that a polarity of a signal electric potential to be supplied to the first pixel electrode is inverted per units of one frame.

The present liquid crystal display device may be configured such that a polarity of a signal electric potential to be supplied to a first data signal line is inverted per horizontal scanning period.

The present liquid crystal display device may be configured such that signal electric potentials of opposite polarities are respectively supplied to a first data signal line and a data signal line adjacent to the first data signal line, in a single horizontal scanning period.

The present liquid crystal display device may be configured to include any of the active matrix substrates, in predetermined frames, one of the first and second scanning signal lines being scanned for writing in a signal electric potential to a pixel electrode being connected to the one of the first and second scanning signal lines, via a transistor, and in other frames other than the predetermined frames, the other one of the first and second scanning signal lines being scanned for writing in a signal electric potential to a pixel electrode being connected to the other one of the first and second scanning signal lines, via a transistor.

The present liquid crystal display device may be configured such that a transistor connected to one of the first and second pixel electrodes disposed in a pixel is turned OFF in a state in which a common electrode electric potential is being supplied to the first and second pixel electrodes provided in a pixel, and thereafter a signal electric potential is written into the other one of the first and second pixel electrodes.

The present liquid crystal display device may be configured such that in one of two successive frames, a transistor connected to the second pixel electrode is turned OFF in a state in which the common electrode electric potential is being supplied to the first and second pixel electrodes, and thereafter a signal electric potential is written into the first pixel electrode, and in the other one of the two successive frames which follows the one, a transistor connected to the first pixel electrode is turned OFF in a state in which the common electrode electric potential is being supplied to the first and second pixel electrodes, and thereafter a signal electric potential is written into the second pixel electrode.

According to the configuration, bright sub-pixels and dark sub-pixels are disposed to form a checkered pattern in each frame, and the bright sub-pixels and dark sub-pixels are alternated at units of one frame. Hence, it is possible to improve display quality.

The present liquid crystal display device may be configured such that of the first and second scanning signal lines, a scanning signal line selected when a signal electric potential is written is alternated per one frame and a polarity of a signal electric potential corresponding to a same pixel is inverted per two frames, or of the first and second scanning signal lines, the scanning signal line selected when the signal electric potential is written is alternated per two consecutive frames and a polarity of a signal electric potential corresponding to a same pixel is inverted per one frame.

The present liquid crystal panel includes the active matrix substrate. The present liquid crystal display unit includes the liquid crystal panel and a driver. The present liquid crystal display device includes the liquid crystal display unit and a light source unit. The present television receiver includes the liquid crystal display device and a tuner section for receiving television broadcast.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

An active matrix substrate of the present invention and a liquid crystal panel including the active matrix substrate are suitably applicable, for example, to a liquid crystal television.

REFERENCE SIGNS LIST 5a, 5b: Liquid crystal panel
11a, 11a', 11b, 11b': Contact hole
12a to 12f, 12A to 12F: Transistor
15x, 15X: Data signal line
16a to 16f: Scanning signal line
17a to 17f: Pixel electrode
17A to 17F: Pixel electrode
17a' to 17f': Pixel electrode
17A' to 17F': Pixel electrode
21: Organic gate insulating film
22: Inorganic gate insulating film
24: Semiconductor layer
25: Inorganic interlayer insulating film
26: Organic interlayer insulating film
37a, 37av, 37ah: Coupling capacitor electrode
37b, 37bv, 37bh: Coupling capacitor electrode
38a, 38b, 38e, 38f: Storage capacitor electrode
77a, 77a', 77b, 77b': Contact electrode
84: Liquid crystal display unit
100 to 105: Pixel
601: Television receiver
800: Liquid crystal display device
C100 to C105: Coupling capacitor

The invention claimed is:
1. A liquid crystal display device, comprising:
an active matrix substrate, including:
    first and second pixel electrodes provided in a pixel region;
    a data signal line;
    first and second scanning signal lines;
    a first transistor connected to the data signal line and the first scanning signal line; and
    a second transistor connected to the data signal line and the second scanning signal line; wherein
the data signal line, the first and second scanning signal lines, the first transistor, and
the second transistor being associated with the pixel region, the first pixel electrode being connected to the data signal line via the first transistor,
the second pixel electrode being connected to the first pixel electrode via a capacitor and being connected to the data signal line via the second transistor,
storage capacitance being formed between at least one of the first and second pixel electrodes provided in the pixel region and at least one of the first and second scanning signal lines that are associated with a pixel region of a previous stage provided previously to the pixel region, in predetermined frames, one of the first and second scanning signal lines being scanned for writing in a signal electric potential to a pixel electrode being connected to the one of the first and second scanning signal lines, via a transistor, in other frames other than the predetermined frames, the other one of the first and second scanning signal lines being scanned for writing in a signal electric potential to a pixel electrode being connected to the other one of the first and second scanning signal lines, via a transistor, a transistor connected to one of the first and second pixel electrodes disposed in a pixel is turned OFF in a state in which a common electrode electric potential is being supplied to the first and second pixel electrodes provided in a pixel, and thereafter a signal electric potential is written into the other one of the first and second pixel electrodes, and in one of two successive frames, a transistor connected to the second pixel electrode is turned OFF in a state in which the common electrode electric potential is being supplied to the first and second pixel electrodes, and thereafter a signal electric potential is written into the first pixel electrode, and in the other one of the two successive frames which follows the one, a transistor connected to the first pixel electrode is turned OFF in a state in which the common electrode electric potential is being supplied to the first and second pixel electrodes, and thereafter a signal electric potential is written into the second pixel electrode.

2. The liquid crystal display device according to claim 1, wherein:
a channel W/L ratio (ratio of a channel width W to a channel length L) of the first transistor is equal to a channel W/L ratio (ratio of a channel width W to a channel length L) of the second transistor.

3. The liquid crystal display device according to claim 1, further comprising a coupling capacitor electrode that is electrically connected to one of the first and second pixel electrodes,
the coupling capacitor electrode overlapping the other one of the first and second pixel electrodes via an insulating film.

4. The liquid crystal display device according to claim 1, further comprising:
a first storage capacitor electrode electrically connected to the first pixel electrode; and
a second storage capacitor electrode electrically connected to the second pixel electrode,
the first storage capacitor electrode and the second storage capacitor electrode that are associated with the pixel region overlapping, via an insulating film, at least one of the first and second scanning signal lines that are associated with the pixel region of the previous stage.

5. The liquid crystal display device according to claim 1, further comprising:
a coupling capacitor electrode; and
first and second storage capacitor electrodes,
the coupling capacitor electrode and the first and second storage capacitor electrodes being formed in an identical layer to conductive electrodes of the first and second transistors,
the coupling capacitor electrode being electrically connected to one of the first and second pixel electrodes and overlapping the other one of the first and second pixel electrodes via an interlayer insulating film,
the first storage capacitor electrode associated with the pixel region being electrically connected to the first pixel electrode and overlapping, via a gate insulating film, at least one of the first and second scanning signal lines that are associated with the pixel region of the previous stage, and
the second storage capacitor electrode associated with the pixel region being electrically connected to the second pixel electrode and overlapping, via the gate insulating film, at least one of the first and second scanning signal lines that are associated with the pixel region of the previous stage.

6. The liquid crystal display device according to claim 1, further comprising:
a coupling capacitor electrode which overlaps the second pixel electrode of the pixel region via an interlayer insulating film; and
first and second storage capacitor electrodes each of which overlaps, via a gate insulating film, at least one of the first and second scanning signal lines that are associated with the pixel region of the previous stage,
the coupling capacitor electrode being connected, in an identical layer, to a first draw-out wire drawn out from a conductive electrode of the first transistor, the first draw-out wire being connected to the first pixel electrode via a contact hole, and the first draw-out wire being connected, in an identical layer, to the first storage capacitor electrode,
the second pixel electrode being connected, via a contact hole, to a second draw-out wire drawn out from a conductive electrode of the second transistor, and the second pixel electrode being connected, via a contact hole, to a third draw-out wire drawn out from the second storage capacitor electrode.

7. The liquid crystal display device according to claim 1, further comprising:
a coupling capacitor electrode which overlaps the second pixel electrode of the pixel region via an interlayer insulating film; and
first and second storage capacitor electrodes each of which overlaps, via a gate insulating film, at least one of the first and second scanning signal lines that are associated with the pixel region of the previous stage,
the first pixel electrode being connected, via a contact hole, to a first draw-out wire drawn out from a conductive electrode of the first transistor, and the first draw-out wire being connected, in an identical layer, to the first storage capacitor electrode,
the second pixel electrode being connected, via a contact hole, to a second draw-out wire drawn out from a conductive electrode of the second transistor, the coupling capacitor electrode being connected, in an identical layer, to a third draw-out wire drawn out from the second storage capacitor electrode, and the third draw-out wire being connected to the second pixel electrode via a contact hole.

8. The liquid crystal display device according to claim 1, further comprising:
a second coupling capacitor electrode which overlaps the first pixel electrode of the pixel region via an interlayer insulating film;
a first coupling capacitor electrode which overlaps the second pixel electrode of the pixel region via an interlayer insulating film; and
first and second storage capacitor electrodes each of which overlaps, via a gate insulating film, at least one of the first and second scanning signal lines that are associated with the pixel region of the previous stage, the first coupling capacitor electrode being connected, in an identical layer, to a first draw-out wire drawn out from a conductive electrode of the first transistor, the first draw-out wire being connected to the first pixel electrode via a contact hole, and the first pixel electrode being connected, via a contact hole, to a second draw-out wire drawn out from the first storage capacitor electrode, and the second pixel electrode being connected, via a contact hole, to a third draw-out wire drawn out from a conductive electrode of the second transistor, the second coupling capacitor electrode being connected, in an identical layer, to a fourth draw-out wire drawn out from the second storage capacitor electrode, and the fourth draw-out wire being connected to the second pixel electrode via a contact hole.

9. The liquid crystal display device according to claim 1, wherein:
two scanning signal lines are associated with two pixel regions aligned in a row direction, and each of the two pixel regions including two pixel electrodes aligned in a column direction, where the row direction is a direction in which the scanning signal lines extend, and
a transistor which is connected to one of two pixel electrodes that are disposed adjacent to each other in the row direction is connected to one of the two scanning signal lines, and a transistor which is connected to the other one of the two pixel electrodes that are disposed adjacent to each other in the row direction is connected to the other one of the two scanning signal lines.

10. The liquid crystal display device according to claim 8, wherein:
an area where the first storage capacitor electrode provided in the pixel region overlaps at least one of the first and second scanning signal lines that are associated with the pixel region of the previous stage is equal in size to an area where the second storage capacitor electrode provided in the pixel region overlaps at least one of the first and second scanning signal lines that are associated with the pixel region of the previous stage.

11. The liquid crystal display device according to claim 3, wherein:
the pixel region includes sub-pixel regions corresponding to respective pixel electrodes,
each of the sub-pixel regions has first through fourth regions respectively corresponding to (i) a first liquid crystal domain in which liquid crystal molecules are tilted in a first predetermined direction in a case where a voltage is applied to a liquid crystal layer, (ii) a second liquid crystal domain in which the liquid crystal molecules are tilted in a second predetermined direction in a case where a voltage is applied to the liquid crystal layer, (iii) a third liquid crystal domain in which the liquid crystal molecules are tilted in a third predetermined direction in a case where a voltage is applied to the liquid crystal layer, and (iv) a fourth liquid crystal domain in which the liquid crystal molecules are tilted in a fourth predetermined direction in a case where a voltage is applied to the liquid crystal layer, and
the coupling capacitor electrode overlaps a boundary between adjacent regions of the first through fourth regions.

12. The liquid crystal display device according to claim 1, wherein:
the pixel region is divided into two parts by the first scanning signal line traversing the pixel region, and the first pixel electrode is disposed in one of the two parts, and the second pixel electrode is disposed in the other one of the two parts.

13. The liquid crystal display device according to claim 1, further comprising a third pixel electrode provided in the pixel region, the third pixel electrode being electrically connected to the first pixel electrode.

14. The liquid crystal display device according to claim 1, further comprising a third pixel electrode provided in the pixel region,
the third pixel electrode being connected to the first pixel electrode via a capacitor and being electrically connected to the second pixel electrode.

15. The liquid crystal display device according to claim 13, wherein:
the first pixel electrode, the second pixel electrode, and the third pixel electrode are disposed so that (i) at least a part of the first pixel electrode is close to the first scanning signal line, (ii) at least a part of the third pixel electrode is close to the second scanning signal line, (iii) one end of the second pixel electrode is close to the first scanning signal line, and (iv) the other end of the second pixel electrode is close to the second scanning signal line.

16. The liquid crystal display device according to claim 14, wherein:
the first pixel electrode, the second pixel electrode, and the third pixel electrode are disposed so that (i) at least a part of the second pixel electrode is close to the first scanning signal line, (ii) at least a part of the third pixel electrode is close to the second scanning signal line, (iii) one end of the first pixel electrode is close to the first scanning signal line, and (iv) the other end of the first pixel electrode is close to the second scanning signal line.

17. The liquid crystal display device according to claim 1, wherein:
in a case where the active matrix substrate is applied to a liquid crystal display device, a sub-pixel including the first pixel electrode becomes a bright sub-pixel, and a sub-pixel including the second pixel electrode becomes a dark sub-pixel.

18. The liquid crystal display device according to claim 13, wherein:
in a case where the active matrix substrate is applied to a liquid crystal display device, a sub-pixel including the first pixel electrode and a sub-pixel including the third pixel electrode become bright sub-pixels, and a sub-pixel including the second pixel electrode becomes a dark sub-pixel.

19. The liquid crystal display device according to claim 14, wherein:
in a case where the active matrix substrate is applied to a liquid crystal display device, a sub-pixel including the first pixel electrode becomes a bright sub-pixel, and a sub-pixel including the second pixel electrode and a sub-pixel including the third pixel electrode become dark sub- pixels.

20. The liquid crystal display device according to claim 5, wherein:
the interlayer insulating film is made thin in at least a part of an area where the interlayer insulating film overlaps the coupling capacitor electrode.

21. The liquid crystal display device according to claim 5, wherein:
the gate insulating film is made thin in at least a part of an area where the gate insulating film overlaps the storage capacitor electrode.

22. The liquid crystal display device according to claim 20, wherein:
the interlayer insulating film includes an inorganic insulating film and an organic insulating film, and the organic insulating film is removed in at least a part of the area where the interlayer insulating film overlaps the coupling capacitor electrode.

23. The liquid crystal display device according to claim 21, wherein:
the gate insulating film includes an inorganic insulating film and an organic insulating film, and the organic insulating film is removed in at least a part of the area where the gate insulating film overlaps the storage capacitor electrode.

24. The liquid crystal display device according to claim 1, the second scanning signal line being selected at least once during display.

25. The liquid crystal display device according to claim 24, wherein:
a common electrode electric potential is being supplied to the data signal line when the second transistor is turned OFF.

26. The liquid crystal display device according to claim 25, wherein:
the first transistor is in an ON state when the second transistor is turned OFF or the first transistor is turned OFF at a same time as the second transistor is turned OFF.

27. The liquid crystal display device according to claim 24, wherein:
electric potentials of the first and second pixel electrodes are substantially set to the common electrode electric potential when the second transistor is turned OFF.

28. The liquid crystal display device according to claim 24, wherein:
a first gate on-pulse signal supplied to the first scanning signal line and a second gate on-pulse signal supplied to the second scanning signal line become active in an identical horizontal scanning period, and
the second gate on-pulse signal has a pulse width smaller than a pulse width of the first gate on-pulse signal, and becomes non-active before the first gate on-pulse signal becomes non-active.

29. The liquid crystal display device according to claim 24, wherein:
a first gate on-pulse signal supplied to the first scanning signal line and a second gate on-pulse signal supplied to the second scanning signal line become active 1 horizontal scanning period before a period in which the signal electric potential of the data signal to be displayed is supplied to the first pixel electrode, and
the second gate on-pulse signal becomes non-active while the first gate on-pulse signal is being active.

30. The liquid crystal display device according to claim 24, wherein:
in each frame, the common electrode electric potential is supplied to all pixel electrodes in a pixel region at least two times.

31. The liquid crystal display device according to claim 30, wherein:
in each frame, the common electrode electric potential is supplied to all the pixel electrodes in the pixel region at least two times after elapse of a $2/3$ frame period from when the signal electric potential of the data signal to be displayed is supplied to the first pixel electrode.

32. The liquid crystal display device according to claim 24, wherein:
polarities of signal electric potentials of data signals supplied to data signal lines are inverted per horizontal scanning period,
when the polarities of the signal electric potentials of the data signals are inverted, supply of the data signals to the data signal lines is shut off for only a predetermined period and the data signal lines are short-circuited to each other, and
the first and second transistors are in an ON state in the predetermined period.

33. The liquid crystal display device according to claim 24, further comprising a scanning signal line driving circuit for driving scanning signal lines,
a first gate on-pulse signal supplied to the first scanning signal line and a second gate on-pulse signal supplied to the second scanning signal line are generated by use of an output from a same stage of a shift register provided in the scanning signal line driving circuit.

34. The liquid crystal display device according to claim 33, wherein:
the scanning signal line driving circuit includes the shift register, a plurality of logical circuits aligned in the column direction, and an output circuit, and
the pulse widths of the first gate on-pulse signal and the second gate on-pulse signal that are outputted from the output circuit are determined based on an output of the shift register and an output control signal for controlling an output of the scanning signal line driving circuit, the output control signal being supplied to the plurality of logical circuits.

35. The liquid crystal display device according to claim 24, wherein:
a polarity of a signal electric potential to be supplied to the first pixel electrode is inverted per units of one frame.

36. The liquid crystal display device according to claim 24, wherein:
a polarity of a signal electric potential to be supplied to a first data signal line is inverted per horizontal scanning period.

37. The liquid crystal display device according to claim 24, wherein:
signal electric potentials of opposite polarities are respectively supplied to a first data signal line and a data signal line adjacent to the first data signal line, in a single horizontal scanning period.

* * * * *